United States Patent [19]

Hoque et al.

[11] Patent Number: 4,685,141

[45] Date of Patent: Aug. 4, 1987

[54] METHOD AND SYSTEM FOR FINDING IMAGE DATA ASSOCIATED WITH THE MONETARY AMOUNT ON FINANCIAL DOCUMENTS

[75] Inventors: Zahirul Hoque; Akihiro Oka, both of Waterloo, Canada

[73] Assignee: NCR Canada Ltd - NCR Canada Ltee, Mississauga, Canada

[21] Appl. No.: 562,785

[22] Filed: Dec. 19, 1983

[51] Int. Cl.[4] .............................................. G06K 9/00
[52] U.S. Cl. .......................................... 382/7; 382/25
[58] Field of Search .......................... 382/7, 25, 26, 16; 235/460

[56] References Cited

U.S. PATENT DOCUMENTS

| | | | |
|---|---|---|---|
| 3,069,654 | 3/1960 | Hough | 340/146.3 |
| 4,087,790 | 5/1978 | Neff | 340/146.3 SQ |
| 4,201,978 | 5/1980 | Nally | 382/7 |
| 4,259,661 | 3/1981 | Todd | 382/27 |
| 4,461,027 | 7/1984 | Ikeda et al. | 382/9 |
| 4,487,306 | 12/1984 | Nao et al. | 382/7 |
| 4,491,960 | 1/1985 | Brown | 382/26 |

FOREIGN PATENT DOCUMENTS

| | | | |
|---|---|---|---|
| 1582807 | 1/1968 | United Kingdom | 382/16 |
| 1334542 | 11/1973 | United Kingdom | 382/16 |
| 1129572 | 1/1981 | United Kingdom | 382/16 |

OTHER PUBLICATIONS

IBM Tech. Discl. Bull., vol. 13, No. 5, Oct. 1970, "Pattern Recognition System", G. L. Clapper, pp. 1206–1207.
IBM Tech. Discl. Bull., vol. 14, No. 4, Sep. 1971, "Scanning Technique Utilizing Matrix", R. H. Luxton, pp. 1138–1139.
IBM Tech. Discl. Bull., vol. 15, No. 10, Mar. 1973, "Blank-Space Detection for Optical Character Recognition", R. J. Baumgartner, p. 3117.

Primary Examiner—David K. Moore
Assistant Examiner—Jacqueline Todd
Attorney, Agent, or Firm—Albert L. Sessler, Jr.; Elmer Wargo

[57] ABSTRACT

A system and method for locating intelligence data like the courtesy or monetary amount on a document. The intelligence data is presented in the form of a matrix of binary data which corresponds to image data associated with a financial document like a check or deposit slip. From the matrix of binary data, an input character located on a predetermined side of the data is examined. If the input character is identified as a clue character, it means, generally, that a portion of the matrix of binary data which is associated with the clue character may be the binary data associated with the monetary amount. In the embodiment described, the clue characters are asterisks (*) and dollar signs ($) of different expected varieties. Having found the binary data associated with the monetary amount, it can be subjected to character recognition techniques to machine-read the monetary amount on the document.

5 Claims, 32 Drawing Figures

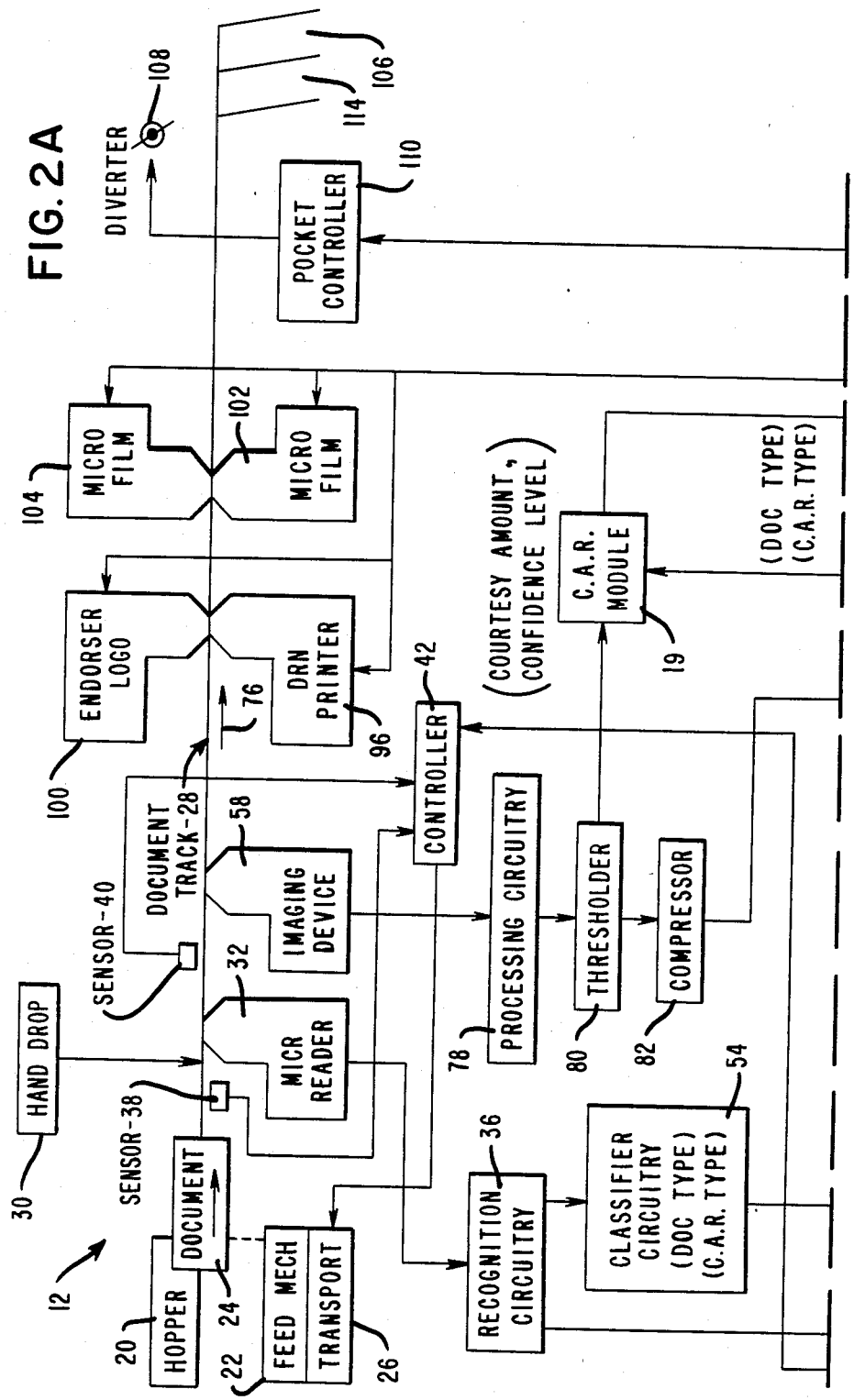

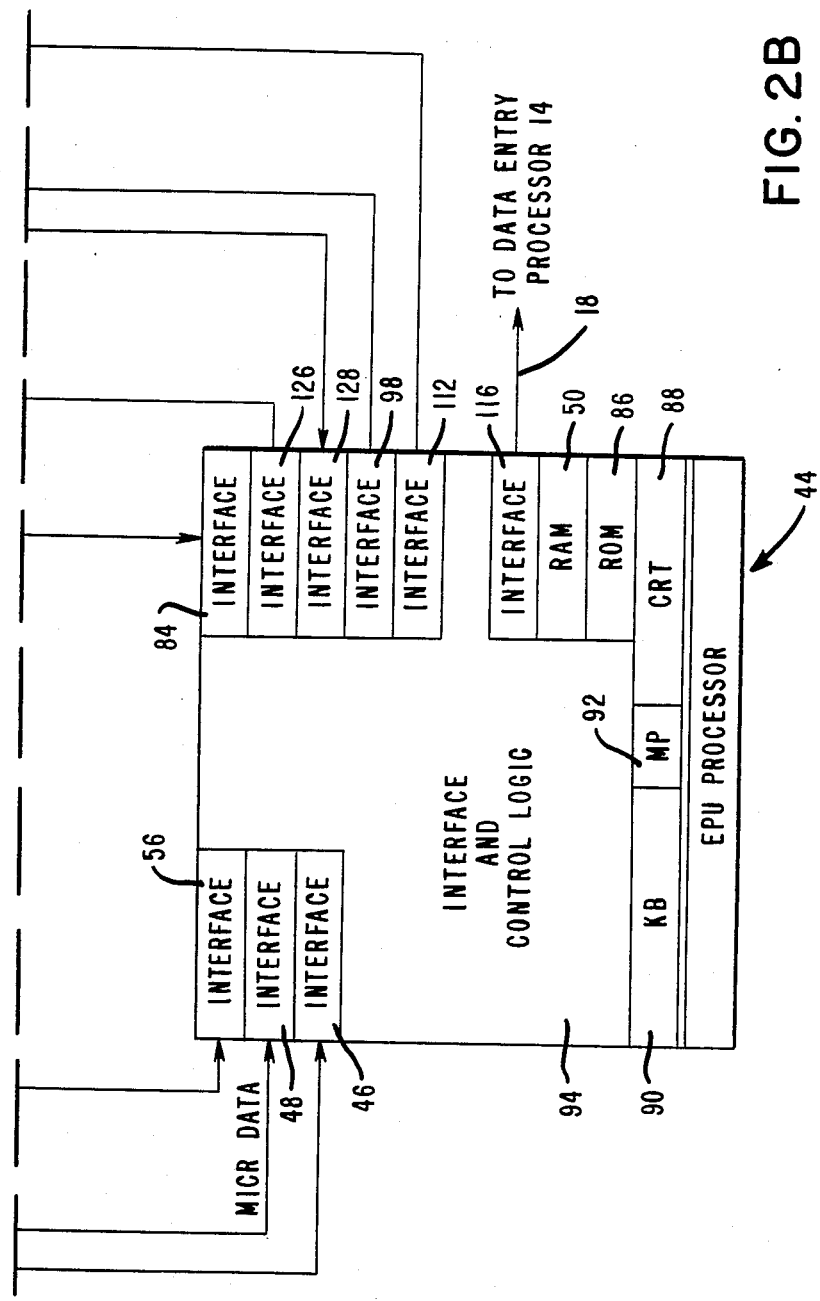

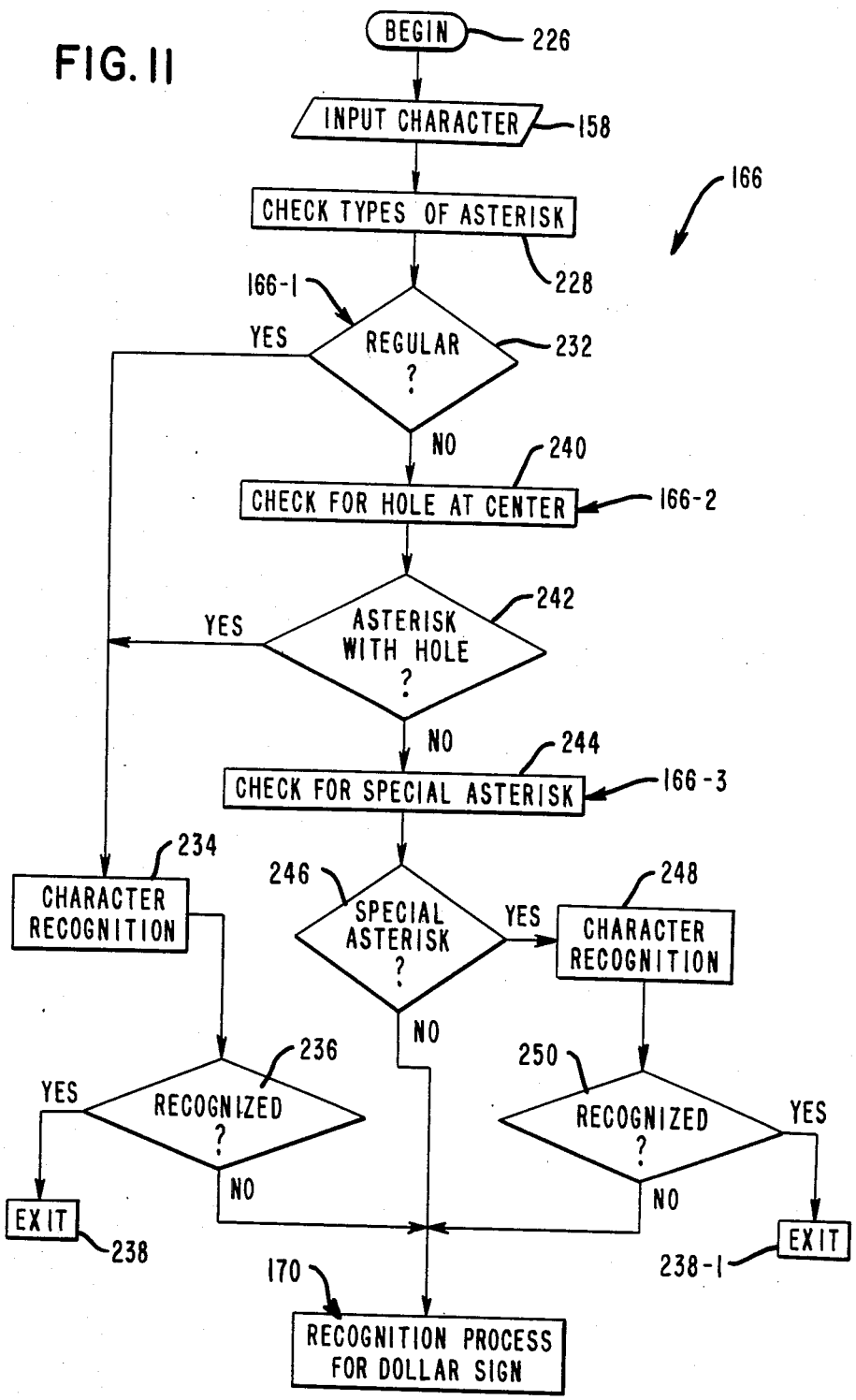

METHOD AND SYSTEM FOR FINDING IMAGE DATA ASSOCIATED WITH THE MONETARY AMOUNT ON FINANCIAL DOCUMENTS

BACKGROUND OF THE INVENTION

This invention relates to a method and system which facilitate the processing of financial documents in banking systems.

In recent years there has been an increased effort towards automating the processing of financial documents in banking systems. Three prior art systems which show various approaches toward automating the processing of financial documents are shown in U.S. Pat. Nos. 3,949,363, 4,205,780, and 4,264,804, for example.

In the processing of financial documents such as checks and deposit slips in a banking system, for example, a point is reached in the processing at which the courtesy or monetary amount on a document is read so as to be inputted into the system.

The present invention relates specifically to a method and system for finding image data associated with the monetary amount on financial documents so as to facilitate the application of machine, character-recognition techniques to the just-found, image data associated with the monetary amount.

The system according to this invention relates to a system for locating intelligence data in the form of characters associated with a document in which the intelligence data is associated with a clue character on the document and in which the intelligence data and clue character are presented to the system in the form of a matrix of binary data corresponding to image data associated with at least a portion of said document on which said intelligence data and clue character are located, comprising: means for receiving and also storing said matrix of binary data; means for withdrawing from said receiving and storing means a portion of said binary data of said matrix corresponding to a character which may be a clue character or a character of said intelligence data, said portion of said binary data being hereinafter referred to as character data; said character data having machine-readable topographical features which are indicative of the character associated therewith; and means for evaluating said topographical features of said character data to determine whether or not said character data is indicative of a clue character.

The method according to this invention relates to a method of locating intelligence data in the form of characters associated with a document in which the intelligence data is associated with a clue character on the document and in which the intelligence data and clue character are presented in the form of a matrix of binary data corresponding to image data associated with at least a portion of said document on which said intelligence data and clue character are located, comprising the steps: (a) receiving and storing said matrix of binary data in a storage; (b) withdrawing from said storage a portion of said binary data of said matrix corresponding to a character which may be a clue character or a character of said intelligence data, said portion of said binary data being hereinafter referred to as character data; said character data having machine-readable topographical features which are indicative of the character associated therewith; and (c) evaluating said topographical features of said character data to determine whether or not said character data is indicative of a clue character.

In a preferred embodiment of this invention, the clue character referred to can be either a dollar sign ($) or an asterisk (*) because the courtesy or monetary amount on financial documents generally follows such a clue character. Suspected clue characters are evaluated with regard to their machine-readable topographical features instead of using "masks".

The present invention is relatively simple to implement and it can identify the several different kinds of asterisks and dollar signs currently in use.

These advantages and others will be more readily understood in connection with the following description, claims and drawing.

BRIEF DESCRIPTION OF THE DRAWING

FIGS. 2A and 2B taken together, form a schematic diagram, in block form, showing more details of the EPU shown in FIG. 1 and the C.A.R. module which contains a preferred embodiment of this invention;

FIG. 11 is a flow chart showing more details of a portion of the recognition process shown in FIG. 7A;

DETAILED DESCRIPTION OF THE INVENTION

Figure 1:
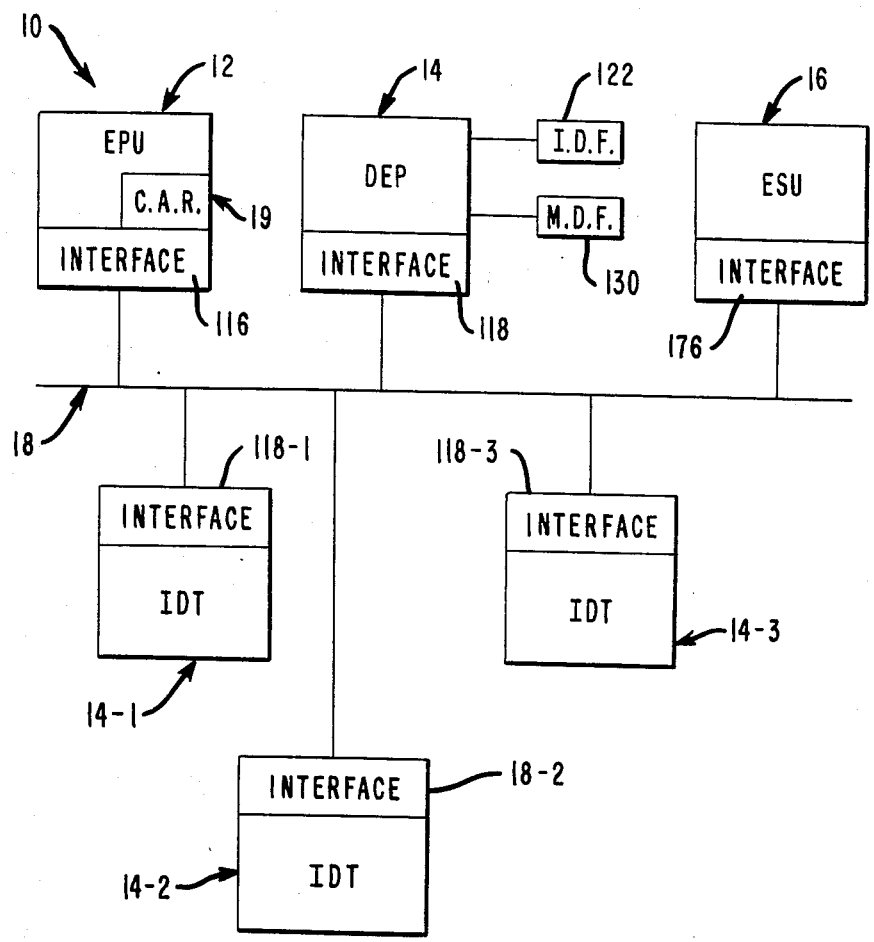
FIG. 1 is a general schematic diagram, in block form, of a banking system, showing an entry processing unit (EPU) including a courtesy amount recognition (C.A.R.) module, data entry processor (DEP) with its associated image display terminals (IDT) and an encode and sort unit (ESU) which are all interconnected by a local area communications network.

FIG. 1 is a general schematic diagram, in block form, of a banking system which is designated generally as system 10. The system 10 includes an entry processing unit (EPU) 12, a data entry processor (DEP) 14 with its associated image display terminals (IDT) 14-1, 14-2, and 14-3, and an encode and sort unit (ESU) 16 which are interconnected by a conventional, local-area communications network 18.

In general, the function of the EPU 12 (FIG. 1) is to receive documents such as checks and deposit slips, for example, and mechanically read certain data from the documents which are processed in batches of about 200–300 documents per batch. The EPU 12 includes a courtesy amount reader (C.A.R.) module 19 in which this invention is incorporated. The DEP 14, along with the IDTs 14-1, 14-2, and 14-3, in general, perform the function of using the output of the EPU 12 to complete data not mechanically read at the EPU 12, correcting mis-read data where necessary, and performing certain banking procedures such as proof and reconciliation, for example.

The ESU 16, in general, receives the completed data for a batch of documents from the DEP 14 and encodes the corresponding courtesy or monetary amount for a document on the associated document such as a check or deposit slip as it moves through the ESU 16. Certain other functions such as stamping, endorsing and microfilming are performed at the ESU 16 prior to having the documents sorted into various sorting pockets according to the bank's sorting instructions.

The EPU 12 is shown in more detail in FIGS. 2A and 2B, and has a general construction which is similar to a reader/sorter which is used to process documents such as checks and deposit slips, for example, in "batches" as previously described herein.

A batch of such documents is placed in a stacker or hopper 20 (FIG. 2A), and a conventional feed mechanism 22 is used to pick a document 24 from the hopper 20, and thereafter, a conventional transport mechanism 26 moves the document 24 along the document track 28 at a constant velocity and at a rate of 200 documents per minute in the embodiment described.

A conventional hand-drop, feed mechanism 30 (FIG. 2A) is provided to enable individual documents 24 to be fed manually into the document track 28, when, for example, a document 24 jumps out of the track 28 accidentally, and has to be fed again into the document track 28.

As each document 24 (FIG. 2A) is moved along the track 28, it is brought into operative, reading relationship with a conventional, magnetic ink character recognition (MICR) reader 32. The MICR reader 32 is positioned along the track 28 so as to read the MICR line 34 (FIG. 3) on the document 24 as the document 24 is moved thereby. The MICR line 34 contains, for example, the identification of the associated bank number (transit routing number), customer's account number, check number, and other coding numbers which provide information as to the type of document i.e., whether it is a check, deposit slip, etc., the size of the document, where the courtesy or monetary amount is located, etc. The output of the MICR reader 32 is fed into conventional recognition circuitry 36 which interprets the data read.

There are sensors such as 38 and 40, for example, which are positioned along the track 28 (FIG. 2A) to check on the status of each of the documents as it is moved along the track 28. The sensors 38 and 40 are coupled to a conventional controller 42 which may include a microprocessor (not shown) to perform the routine tasks associated with moving documents along the track, such tasks as controlling the feed mechanism 22 and the transport mechanism 26, for example. The controller 42 is coupled to the EPU processor 44 (FIG. 2B) via the interface 46.

Continuing with the example being described, when the sensor 38 (FIG. 2A) indicates that a document 24 approaches the MICR reader 32, the EPU processor 44 receives this notification from the controller 42 as just described, and the EPU processor 44 assigns a document reference number (DRN) to the data associated with the document 24 to be read by the MICR reader 32. This DRN is unique for each document and will be used by the system 10 to identify the various data associated with a document 24 and to facilitate the processing of the documents in the system 10. The MICR data from the MICR reader 32 is processed by the recognition circuitry 36. Typical MICR data such as bank number, customer account number, and check number, for example, coming from the recognition circuitry 36 pass through the interface 48 to the random access memory (RAM) 50 of the EPU processor 44 where it is stored according to the now-available DRN.

The document 24 includes additional data on the MICR line 34 (FIG. 3) to facilitate the processing of documents within the system 10. This additional data, determined by the financial institution or bank which supplies the documents 24 and uses the system 10 may include, for example, a document-type number which indicates whether the document is a check, deposit slip, etc.; a size number which indicates the physical size of the document; a courtesy amount recognition (C.A.R.) type number which indicates whether the courtesy or monetary amount on the document is machine printed or hand written; a location number which indicates the location on the document of the courtesy amount which is shown at 52 in FIG. 3; and the height of the document. This additional data is read by the recognition circuitry 36 and arranged or classified by the classifier circuitry 54 which forwards this additional data via the interface 56 to the RAM 50 where it is stored by the associated DRN. As of this moment in the process being explained, the DRN is not printed on the associated document 24.

After a document 24 is read by the MICR reader 32, it is moved into operative relationship with a conventional imaging device 58 (FIG. 2A) which is positioned along the document track 28.

Figure 4:
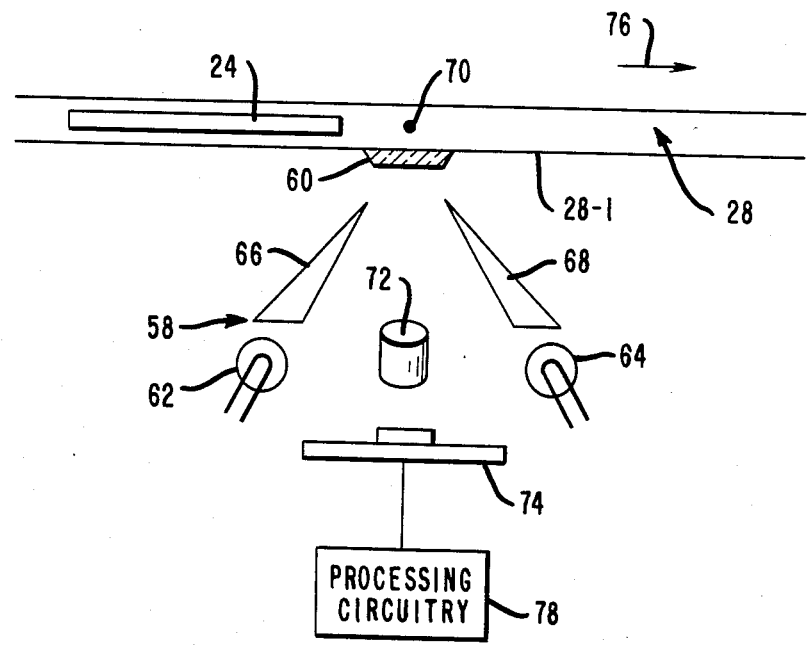
FIG. 4 is a plan view showing more details of the imaging device shown in FIG. 2A.

The imaging device 58 is shown in more detail in FIG. 4. The imaging device 58 includes a transparent, glass window 60 which is positioned on a sidewall 28-1 of the document track 28 to enable light from the light sources 62 and 64 to be directed by the associated light guides 66 and 68, respectively, on to a scanning line 70. The scanning line 70 is shown as a point in FIG. 4, which represents a top or plan view of the track 28, as does FIG. 2A. The top, long edge of the document 24 is viewed in FIG. 4, and in normal operation, the document is moved on its lower, long edge, with the front of the document 24 facing the imaging device 58 as it is moved thereby; the scanning line 70 in this environment is oriented in a vertical direction. As a document 24 is moved past the scanning line 70, the right-most edge of the document 24 (as viewed in FIG. 4) is illuminated by the sources of light 62 and 64, and light reflected therefrom passes through the window 60 and is focused by a suitable lens system 72 on to the imaging sensor array 74. In the embodiment described, the array 74 may be of a type which produces a fixed number of picture elements or pixels along the scanning line 70. One such array 74, such as RL-1024B which is manufactured by Reticon Corporation, for example, produces 1024 pixels along the scanning line 70, although only 640 pixels are utilized to meet the resolution requirements of the embodiment described herein. As the document 24 is moved in the downstream direction shown by arrow 76, a new area of the document is presented to the scanning line 70 which produces a new set of 640 pixels therealong. Each pixel from the sensor array 74 has an associated analog, gray-scale value which is converted or digitized by the processing circuitry 78 (FIG. 2A) to produce, for example, a six bit byte of data for each pixel, thereby recording 64 shades of gray ranging from white to black. As the scans are completed, a stream of bytes of data is issued from the processing circuitry 78. Because this aspect is conventional, it need not be described in any further detail.

The stream of data or pixels from the scanning line 70 (FIG. 4) of the "image" of a document 24 is further processed by having the output of the processing circuitry 78 fed into a thresholder 80 (FIG. 2A), whose output, in turn, is fed into a compressor 82. The thresholder 80 is conventional and is a circuit which is used to convert a multilevel gray scale image into a binary image (black or white) and to clean up or remove isolated pixels which represent noise, most likely. The compressor 82 is a conventional circuit which receives the enhanced data from the thresholder 80 and eliminates that data which is "meaningless" or "redundant" and thereby "compresses" the remaining data to produce compressed, digitized-image data which reduces the amount of transmission time necessary to transmit the data associated with an image of a document 24 and which also reduces memory storage requirements. The output of the compressor 82 is fed via a conventional interface 84 to the RAM 50 of the EPU processor 44 (FIG. 2B) where this image data associated with a document 24 is stored temporarily by its associated DRN. As an optional feature, a second imaging device and associated circuitry (not shown) may be used to image the rear of a document 24 as described herein.

The EPU processor 44 (FIG. 2B) includes the interfaces 48, 56, and 84 already mentioned, a read only memory (ROM) 86, the RAM 50, a display such as a cathode ray tube (CRT) 88, a keyboard (KB) 90, a processor (MP) 92 and interface and control logic 94. The processing routines associated with the EPU processor 44 may reside in the ROM 86; however, the routines are loaded, more typically, in the RAM 50 from disc or tape storage (not shown), for example, as part of a conventional, start-up procedure. The CRT 88 is used to provide communication with an operator who uses the KB 90 to enter data or instructions. The interface and control logic 94 provides the interconnections among the various components of the processor 44 to enable it to function, conventionally, as an "intelligent" application processor. The form of the processor 44 shown in FIG. 2B is utilized to portray the various functions performed thereby, and the actual form of the processor 44 may be different.

Continuing with the movement of a document 24 along the document track 28, after a document 24 passes the imaging device 58 (FIG. 2A), it is moved into operative relationship with a conventional printer 96 which prints the DRN on the front of the associated document. The DRN was assigned earlier by the EPU processor 44 which transmits this DRN to the printer 96 via the interface 98. Various other conventional elements such as an endorser 100, microfilmer 102, and microfilmer 104 are positioned along the track 28 in operative relationship with each document 24 passing thereby. The endorser 100 may be used also to stamp a "logo" on the back of a document. The microfilmer 102 takes a picture of the front of a document for a permanent record, and similarly, microfilmer 104 takes a picture of the rear of a document. The endorser 100, and microfilmers 102 and 104 are optional and are shown as being coupled to the EPU processor 44 via the interface 98 along with the DRN printer 96.

Normally, the documents 24 are processed in a batch, as previously described, and after microfilming at microfilmers 102 and 104, they are diverted, sequentially, into a single pocket 106 by a diverter 108 which is controlled by a pocket controller 110 which is coupled to the EPU processor 44 via the interface 112. If the processor 44 wishes to single out one or more documents 24 (for various processing reasons) at this point, the processor 44 then sends out the appropriate instruction to the pocket controller 110 which causes the affected documents to be diverted into the reject pocket 114. As an optional feature, additional pockets like 106 may be provided to provide additional sorting capability to the EPU 12.

As the documents 24 are moved, sequentially, past the imaging device 58 (FIG. 2A), the associated image data is processed, enhanced, and compressed as previously described, and the compressed, image data for each document is buffered in the RAM 50. The DRN associated with the compressed image data is combined therewith, and this compressed, image data is immediately transferred out of the EPU processor 44 via its interface 116 over the network 18 to the DEP 14 (FIG. 1) via its interface 118. The DEP 14 then immediately transfers the compressed, image data via an interface (not shown) to an image disc file (I.D.F.) 122 (FIG. 1) where it is stored by the associated DRN. Because the documents 24 are processed in batches of about 200–300 per batch, for example, a batch header card may be used to identify each batch of documents being processed. The batch header card is the first document to be processed in the associated batch and a batch number associated with the header card may be used to identify the various document data associated with a batch of documents. In this regard, the compressed, image data in the image disc file 122 may be arranged by DRN within a batch number to facilitate the accessing thereof.

The image data derived from the imaging device 58 (FIG. 2A) is utilized in the performance of machine character recognition to ascertain the courtesy amount 52 on the documents 24 being processed. The image data coming from the thresholder 80 (prior to compression) is fed into a courtesy amount recognition (C.A.R.) module 19 where courtesy amount recognition is performed. It also should be recalled that the classifier circuitry 54 provides certain data about each document, data such as document type, height, and size, location of the courtesy amount, and whether the courtesy amount is machine or handwritten, for example; for ease of discussion, this data shall be referred to hereinafter as C.A.R. type data.

The C.A.R. type data, as developed, was stored in the RAM 50 of the EPU processor 44 (FIG. 2A) along with the DRN which was assigned to the associated document 24. A sensor such as 40, positioned along the document track 28, produces a signal to indicate the start of data for the document 24 approaching the imaging device 58, and this signal is used by the processor 44 to forward the C.A.R. type data along with the DRN to the C.A.R. module 19 via the interface 126.

The C.A.R. module 19 (FIG. 2A) includes, generally, the necessary data buffers to store the data received and the processors and associated circuitry to effect character recognition as will be described hereinafter. It should be recalled that the imaging device 58, in effect, produces a matrix of binary data with 640 pixels of data being included in each scan as the document 24 is moved past the imaging device 58. The C.A.R. type data is used by the C.A.R. module 19 to facilitate the location, for example, of the matrix of data associated with the courtesy amount. The C.A.R. module 19 then reads the courtesy amount using the image data received from the thresholder 80 and outputs the courtesy amount read to the EPU processor 44 via the interface 128 (FIG. 2B) and stores the data momentarily in the RAM 50 by the DRN. For each individual number of the courtesy amount read, there is an associated number developed to indicate the confidence level associated with that number read. For example, a number 9 may be used to indicate a high probability of correctness of reading, while the number 1 may indicate a low probability of correctness. A low probability of correctness may be used in subsequent processing in the system 10 to facilitate the location of errors if errors develop in the usual reconciliation process. Naturally, a very low probability of correctness of reading, or individual numbers of the monetary amount not being read at all would be tagged (with a 0, for example) to indicate the need for data completion at the DEP 14. The MICR data processed by the recognition circuitry 36 and the courtesy amount along with the confidence level of each of the numbers in the courtesy amount are combined by DRN in the EPU processor 44. After combining, this combined data is forwarded via the interface 116 over the network 18 to the DEP 14 (FIG. 1) via its interface 118, and thereafter, this combined data is transferred and stored on a second storage or MICR data disc file (M.D.F.) 130 by DRN within the associated batch number in the embodiment described. This process is repeated for all the documents 24 in a batch of documents being processed.

Figure 3:
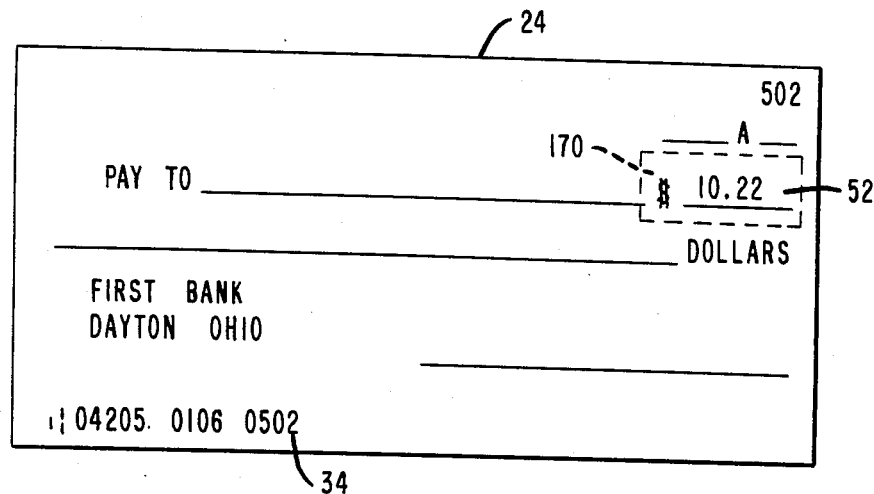
FIG. 3 shows an example of a document which is processed by the system shown in FIG. 1.

As stated earlier herein, the C.A.R. module 19 is utilized to mechanically read the courtesy amount 52 on a document 24 as shown in FIG. 3. If a particular document 24 does not have the C.A.R. type data associated therewith, it becomes, naturally, more difficult to locate the courtesy amount 52.

The present invention provides an apparatus and method for locating the data associated with the courtesy amount 52 at the C.A.R. module 19 so as to facilitate character recognition. The method generally entails looking for a dollar sign ($) or an asterisk (*) as these characters generally precede the courtesy amount 52. The dollar sign and the asterisk will be referred to hereinafter as clue or key characters. After a key character is located and identified, the binary data adjacent to it and relating to the associated courtesy amount 52 is then subjected to conventional character recognition techniques at the C.A.R. module 19.

Figure 5:
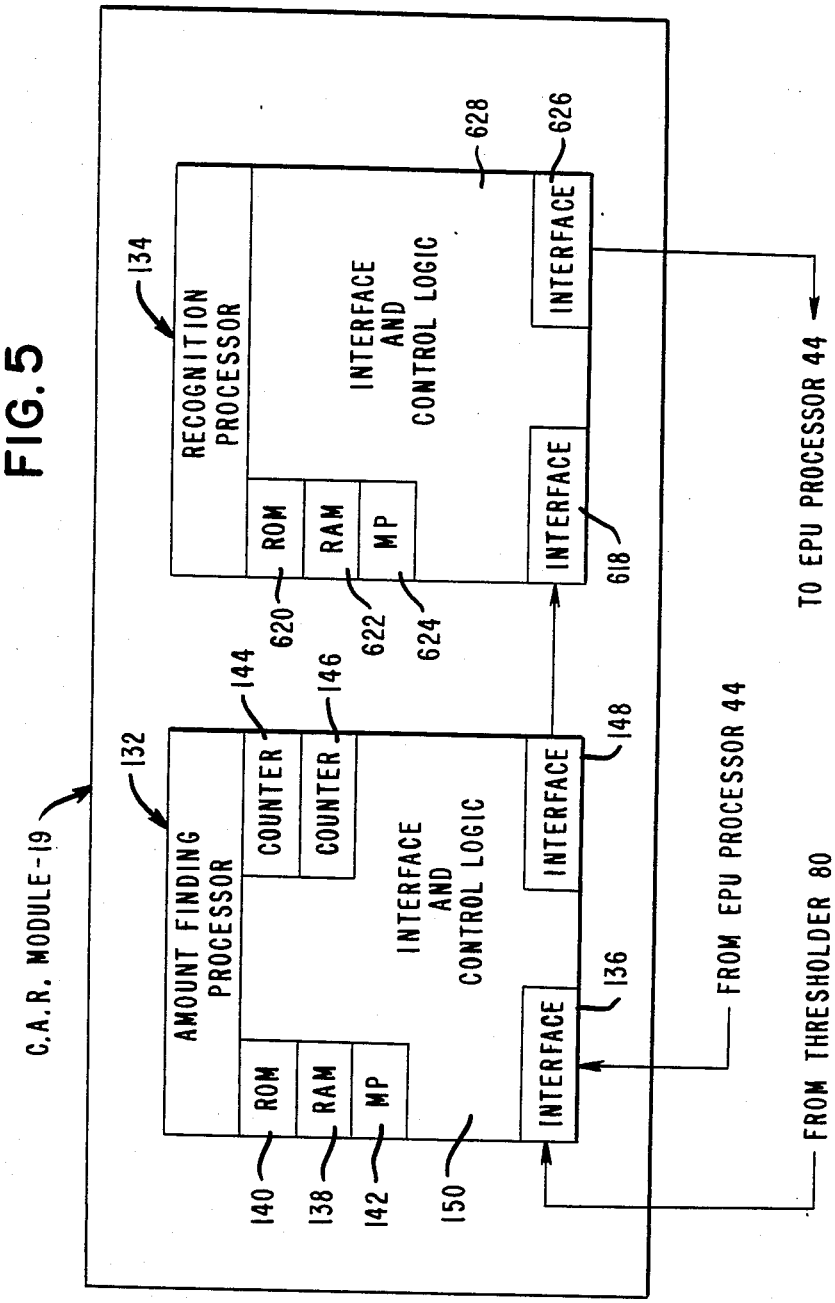
FIG. 5 is a schematic diagram in block form, showing more details of the C.A.R. module shown in FIG. 1.

The C.A.R. module 19 is shown in more detail in FIG. 5, and it includes an amount finding processor 132 and a recognition processor 134. The general function of the amount finding processor 132 is to find the courtesy amount 52 on a document 24, and the general function of the recognition processor 134 is to do the actual character recognition on data associated with the courtesy amount 52 as received from the processor 132. The character data recognized by the recognition processor 134 along with the confidence level associated with each character is then forwarded to the EPU processor 44 from where it is forwarded to the DEP 14 (FIG. 1) for further processing as previously described.

The image data coming from the thresholder 80 is fed through an interface 136 (FIG. 5) of the processor 132 where it is stored in the RAM 138 therein. The processor 132 also includes a ROM 140, MP 142, counters 144 and 146, interface 148, and interface and control logic 150 which provide the interconnections among the various elements shown. The MP 142 is a standard processor like the Motorola 6800, for example, which is manufactured by Motorola. The various operating programs and procedures to be described hereinafter may be stored in the ROM 140, or more typically, they are loaded into the RAM 138 from tape or disc storage (not shown) as part of a start up procedure.

Figure 6:
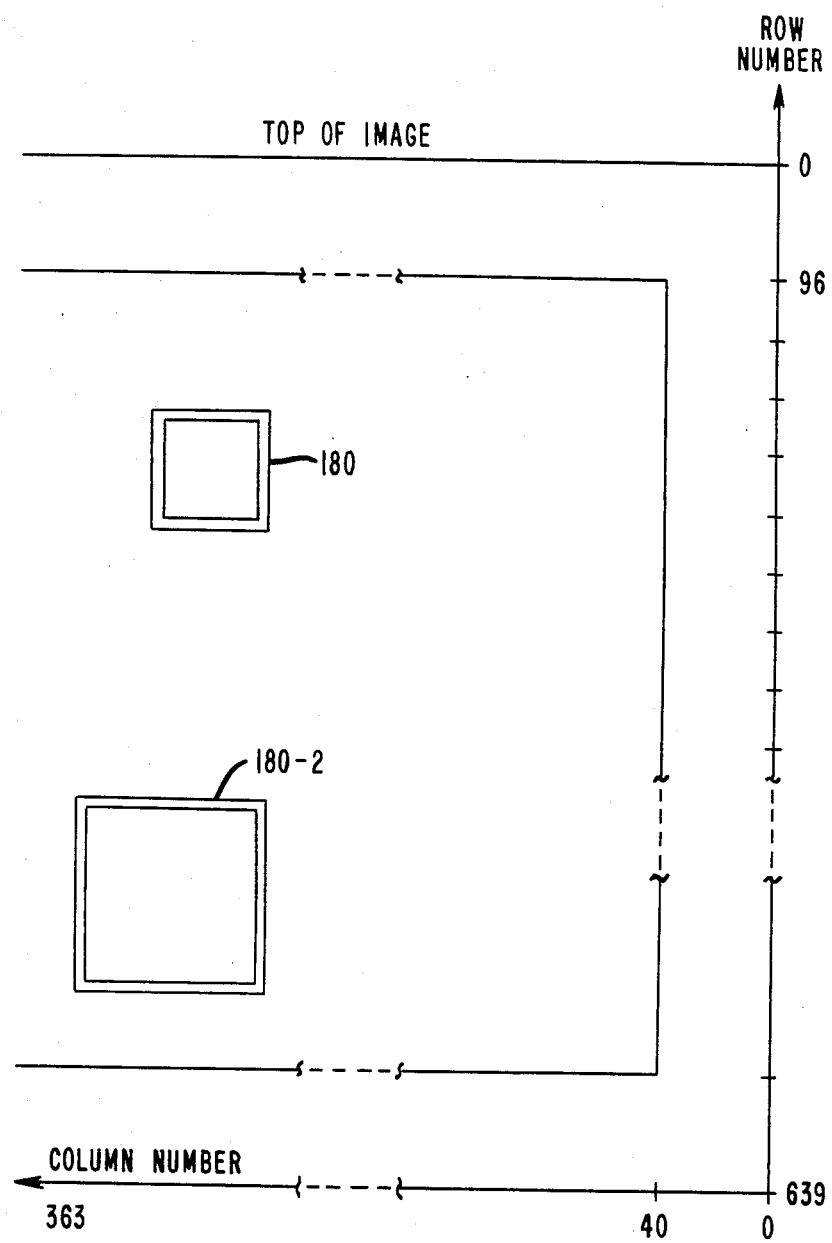
FIG. 6 is a diagram showing row and column numbers which are associated with the image of a document.

It should be recalled that the data coming from the thresholder 80 comprises binary ones and binary zeros, which in the embodiment described, correspond to black and white pixels, respectively. There are 640 pixels in each scan, ranging from row 0 through row 639 as shown in FIG. 6, and there are 364 scans, ranging from column number 0 through column number 363 which are utilized to cover the area of a document 24 which usually contains the courtesy amount 52 thereon. Naturally, these parameters are merely illustrative and can be changed to suit particular applications.

With regard to locating the key characters (asterisks and dollar signs), it was discovered that the asterisks are generally smaller than other characters which appear in the courtesy amount 52. In the embodiment described, none of the asterisks encountered was found to be greater than 17 pixels in height when the scanning densrty is 154 pixels per inch. This fact is utilized to divide the courtesy amount locating method into two basic operations. The first operation relates to identifying asterisks and the second operation relates to identifying dollar signs. Any character which has a height of over 20 pixels is examined by the second operation mentioned because it is, most likely, a dollar sign, and correspondingly, any character which is 20 pixels or less is examined by the first operation because it is, most likely, an asterisk. In the embodiment described, the asterisks are classed into regular, special, and asterisks with holes, and the dollar signs are classed into straight dollar signs and slanted dollar signs; this aspect will be described in detail hereinafter.

The general steps in the process of locating the courtesy amount 52 on a document 24 as previously described are:

1. Cleaning or smoothing the data coming from the thresholder 80.
2. Finding the edges of a character (utilizing minimum and maximum rows and columns).
3. Determining type of asterisk.
4. Determining type of dollar sign.

Figure 7A:
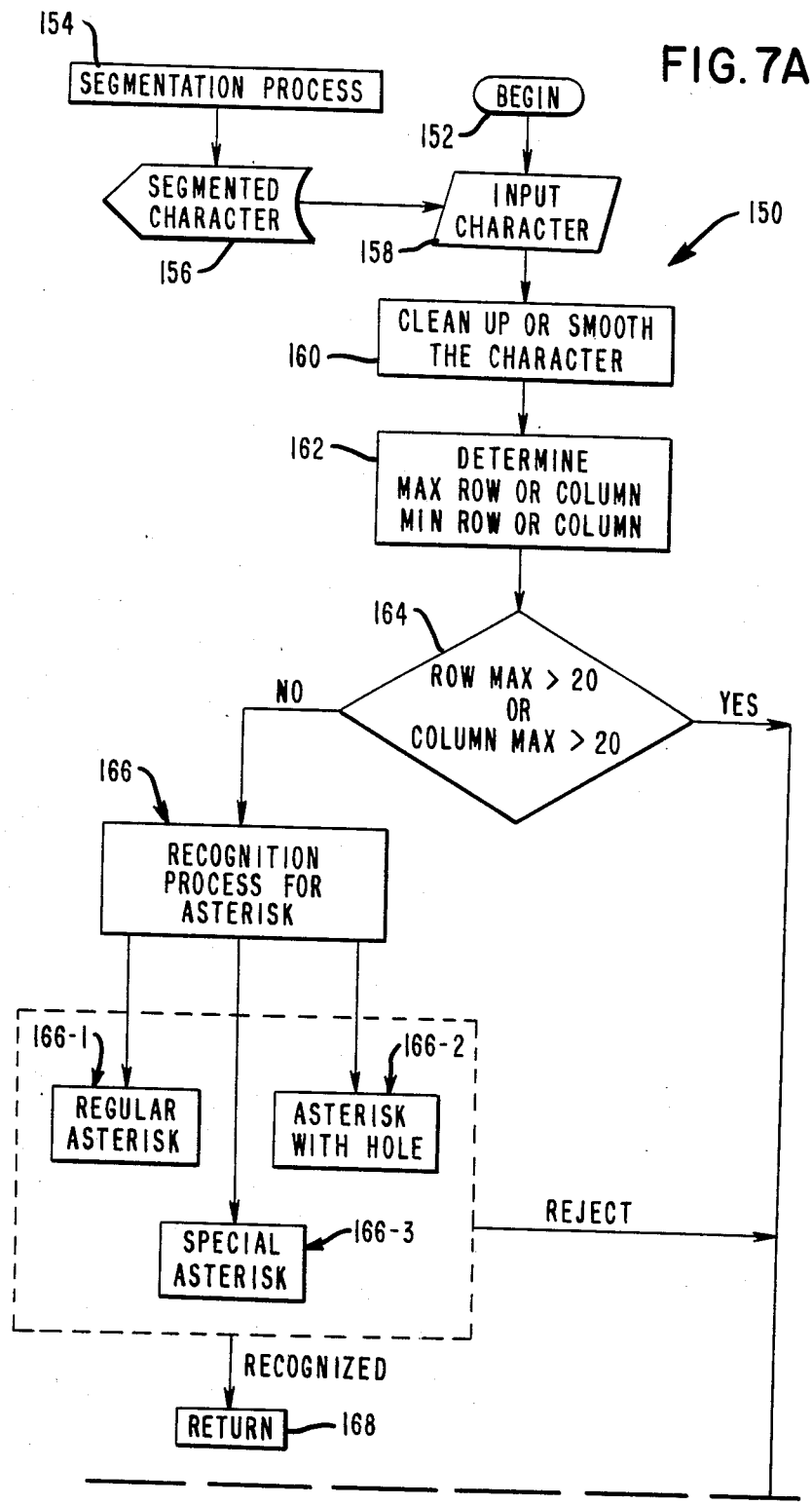
FIGS. 7A and 7B combined represent a flow chart showing a method of searching the image data associated with a document to locate an asterisk or dollar sign and thereby facilitate the location of a courtesy amount on the document.
Figure 7B:
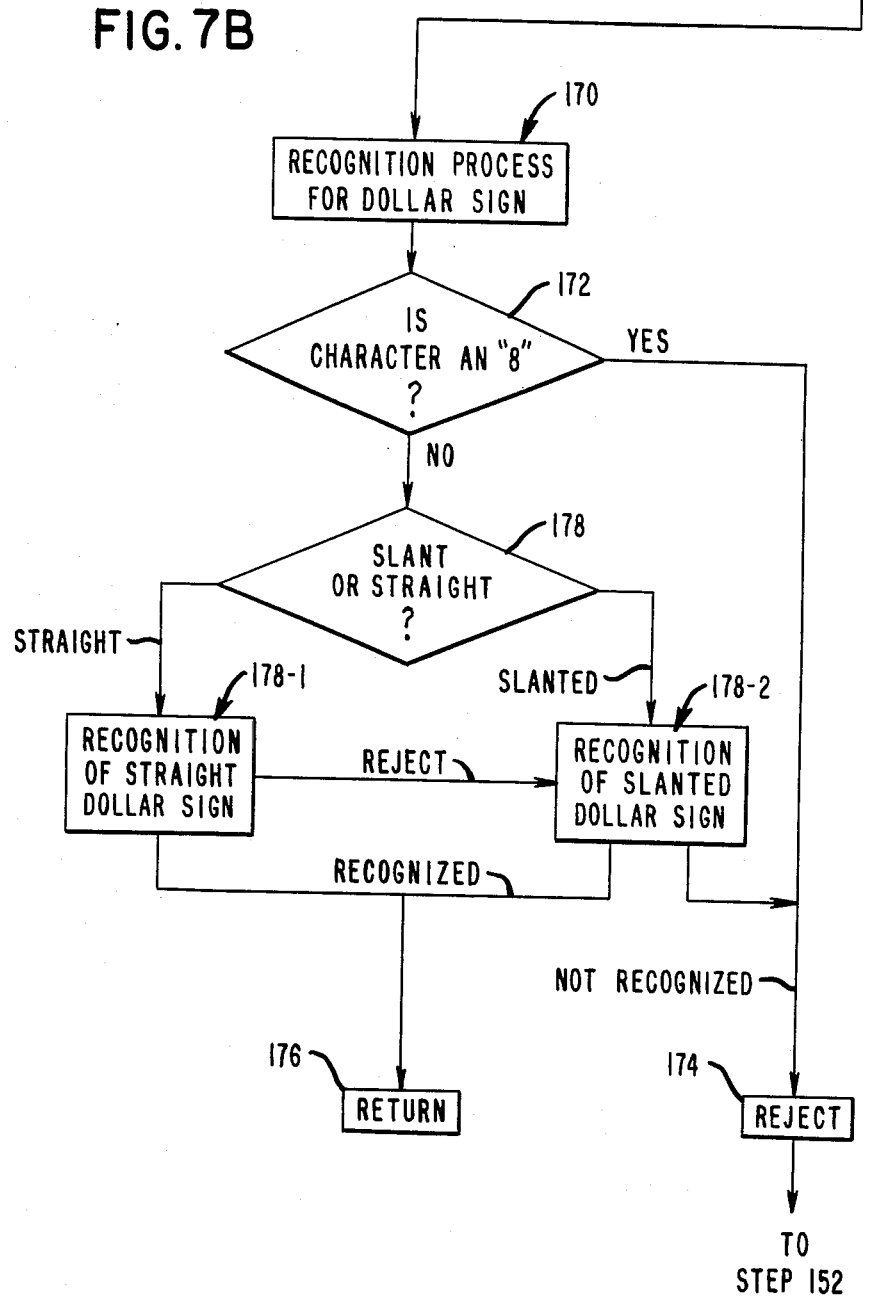

These same general steps are shown in more detail in the flow chart shown in FIGS. 7A and 7B. The steps shown in FIGS. 7A and 7B are implemented by the amount finding processor 132 (FIG. 5) in conjunction with programs stored in the ROM 140 or RAM 138 as previously explained.

With reference to FIGS. 7A and 7B, the process (designated generally as 150) of locating the courtesy amount 52 begins at step 152. The image data coming from the thresholder 80 is subjected to a segmentation process 154 prior to beginning the process which is part of this invention. Because a dollar sign or an asterisk is located to the left of the courtesy amount 52, the image data for a document 24 is examined by the processor 132, starting from the left of the image data as viewed in FIG. 6. The segmentation process 154 is conventional, and it looks for clusters of black pixels which are surrounded by a frame of white pixels as a basis for finding a segmented character 156. The segmented character 156 becomes the input character 158 as shown.

At step 160 in FIG. 7A, the input character 158 is "cleaned or smoothed" to eliminate certain black pixels which represent "noise" signals as will be described hereinafter. At step 162, the input character 158 is examined to determine how far it extends in both column and row directions. For example, the height of a character may extend from a minimum row number of 200 to a maximum row number of 219, and similarly, the width of the character may extend from column numbers 330 to 350 with reference to FIG. 6.

Step 164 in FIG. 7A represents a decisionmaking step. As stated earlier herein, if a character has a certain size as measured in the row and column directions, it is most likely an asterisk, and if it has a size larger than this certain size, it is most likely a dollar sign when considering these two characters. In the embodiment described, a character size of twenty or fewer pixels means that the input character 158 is most likely an asterisk, and therefore, it is subjected to the recognition process 166 for an asterisk. If the size of the input character 158 is greater than 20 pixels, it is most likely a dollar sign, and therefore, it is subjected to the recognition process 170 (FIG. 7B) for a dollar sign. These recognition processes 166 and 170 will be described in detail hereinafter.

For the moment, it is sufficient to state that the recognition process 166 shown in FIG. 7A includes three separate routines, namely routine 166-1 for a regular asterisk, routine 166-2 for an asterisk with a hole, and routine 166-3 for a special asterisk. If the input character 158 is identified as an asterisk from any one of these three routines 166-1, 166-2, or 166-3, it means that the location of the courtesy amount can be developed from the row and column numbers of the asterisk so identified, and accordingly, the process 150 ends with the return step 168.

If the input character 158 is not recognized as an asterisk by one of the routines 166-1, 166-2, or 166-3 in FIG. 7A, then a reject from any one of these routines 166-1, 166-2, or 166-3 causes the process 150 to advance to the recognition process 170 (FIG. 7B).

One of the first steps of the recognition process 170 (FIG. 7B) is to employ evaluation techniques (to be described) to determine whether or not the input character 158 is a numeral eight as done in step 172. This is done because the dollar sign ($) and the numeral 8 have certain characteristics in common. If the input character 158 is a numeral 8, the input character 8 is rejected at step 174 and the process 150 is returned to step 152 from which the process 150 is repeated for a different input character 158. To repeat, the process 150 is designed to find an asterisk or a dollar sign and thereby locate the image data for the courtesy amount.

If the input character 158 is not identified as a numeral "8" at step 172 (FIG. 7B), the process 150 proceeds to step 178 where a decision is made as to whether the suspected dollar sign is of the straight or slanted variety. If the suspected dollar sign is considered a straight variety, the process 150 proceeds to step 178-1 where recognition is attempted. If the input character 158 is recognized as a straight dollar sign, the process 150 returns to step 176 to proceed to employ character recognition techniques with the image data associated with the straight dollar sign which has just been identified. If the input character 158 is not identified as a straight dollar sign at step 178-1, the process 150 proceeds to step 178-2 where the input character 158 is subjected, again, to evaluation techniques to determine whether or not it is a slanted dollar sign. If the input character 158 is recognized as a slanted dollar sign, then the process 150 of finding the courtesy amount is complete at return step 176. If the input character 158 is not recognized as a slanted dollar sign at step 178-2, the process 150 proceeds to reject step 174 from which a new input character 158 is selected to repeat the process 150.

The input character 158 in FIG. 7A, at the start of the process 150, represents data for the left-most character being taken out of the RAM 138 (FIG. 5). The coordinates for the left-most character (given by row and column numbers as shown in FIG. 6) are provided for input character 158. In this regard, the row and column numbers for the upper left and lower right corners (as viewed in FIG. 6) of a quadrilateral including the input character 158 are stored in a separate portion of the RAM 138 (FIG. 5). An examining frame 180 (shown only diagrammatically in FIG. 6) is used to examine the central pixel in a 3×3 matrix of pixels.

Figures 8, 9:
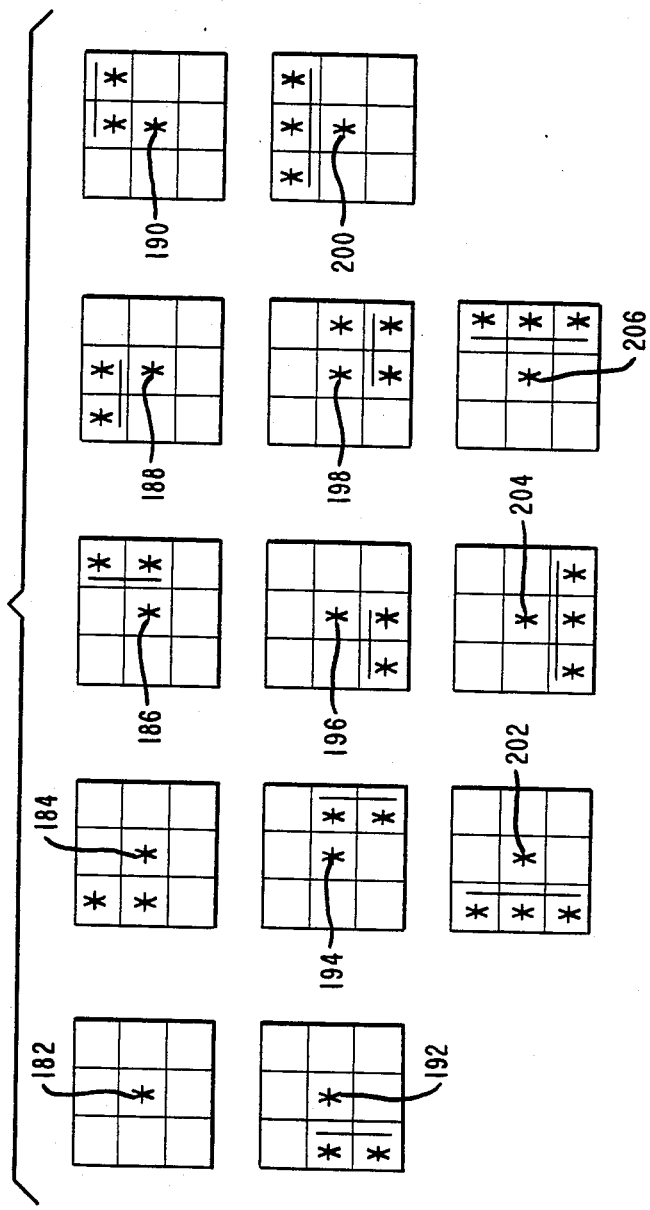
FIG. 8 shows an array of different pixel situations presented in a cleaning operation.
FIG. 9 is a diagrammatic showing of a 3×3 matrix of pixels used to depict a situation in the cleaning and smoothing operation shown in FIG. 7A.

FIG. 8 shows an array of different situations presented in the cleaning operation shown by step 160 in FIG. 7A. In each one of the situations shown in FIG. 8, there is a central black pixel like 182, 184, 186, 188, 190, 192, 194, 196, 198, 200, 202, 204 and 206 which is removed from each associated matrix by the cleaning operation. The central black pixel is removed in each of the examining frames shown in FIG. 8 because it most likely represents noise. When an examining frame 180 presents the 3×3 matrix of pixels shown in FIG. 9 in which the center pixel 208 is white or a binary zero and the surrounding pixels like 210, 212, 214, and 216 are black or binary ones, then a black pixel is added to the center pixel 208. This is done because, in all probability, the center pixel 208 should be black when it is surrounded by black pixels as shown in FIG. 9. In FIGS. 8 and 9, the pixel under consideration is always the center pixel in a 3×3 matrix of pixels. The general movement of the examining frame 180 is to proceed from the upper left hand corner of an input character 158 and to proceed scan by scan (or column number) towards the right (as viewed in FIG. 6) until the end of the input character is reached. Thereafter, the examining frame 180 is moved down one row position (as viewed in FIG. 6), and the examining frame 180 is again moved from the left side of the input character 158 towards the right side thereof. This process is repeated until the entire input character 158 is examined and cleaned.

Figure 10:
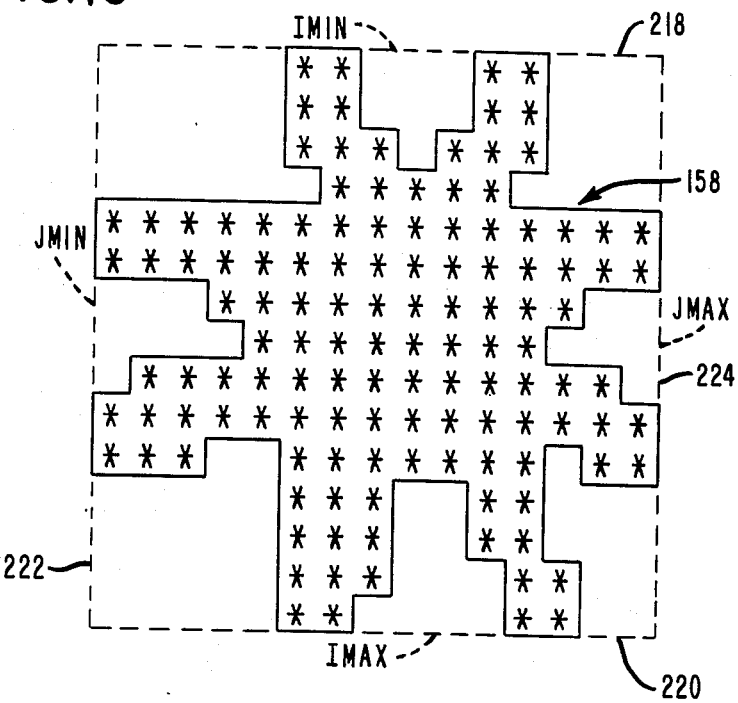
FIG. 10 is a diagrammatic showing of a matrix of pixels associated with an input character to show the extremities or parameters of the character.

The step 162 shown in FIG. 7A is used to determine the outer parameters or boundaries of an input character 158. With regard to examining data, the associated scanning of data is done from top to bottom and from left to right as viewed in FIG. 6. In this regard, the outer parameters of the input character 158 are shown in FIG. 10. The outer parameters or minimum and maximum points of a character are needed also so as to minimize the number of operations in character recognition. It should be recalled that when a new document 24 approaches the sensor 40 along the document track 28 as shown in FIG. 2A, a new document signal is generated in the sensor 40 and is used to indicate the start of data for a document 24 being imaged. This new document signal is used by the processor 132 (FIG. 5) to initialize the first counter 144 which counts the number of pixels in a column. When the count of 639 is reached on counter 144, this fact is used to increment the counter 146 which is used to count the number of scans, which scans are analogous to the column numbers shown in FIG. 6. When the window 180 (FIG. 6) proceeds downwardly as described, the first row encountered which contains black pixels is the IMIN row 218 shown in FIG. 10, and the last row encountered which contains black pixels for that character is the IMAX row 220. The IMIN and IMAX rows 218 and 220 are obtained from counter 144. When proceeding from left to right with examining frame 180, the first column encountered which contains black pixels is the JMIN column 222, and the last column encountered which contains black pixels for that input character 158 is JMAX. By knowing the IMIN and IMAX values obtained from counter 144, the height of an input character 158 can be obtained by subtraction. Similarly, by knowing the JMIN and JMAX values obtained from counter 146, the width of an input character 158 can be obtained. A conventional software routine located in the ROM 140 or the RAM 138 (FIG. 5) may be used to obtain the IMIN, IMAX, JMIN, and JMAX values as described.

As stated earlier herein for the embodiment described, it was found that all the asterisks encountered on the documents 24 were under or less than 17 pixels in height and width. Hence, any input character 158 which is over 20 pixels in height is not regarded as an asterisk; step 164 in FIG. 7A reflects this evaluation.

As stated previously, the recognition process 166 (FIG. 7A) includes three separate routines 166-1, 166-2, and 166-3 which are shown in more detail in FIG. 11. The recognition process 166 (FIG. 11) begins at step 226 where the input character 158 is examined in step 228. By knowing the IMIN, IMAX, JMIN, and JMAX values of an input character 158 as shown in FIG. 10, for example, the center of the input character can be examined. A second examining frame 180-2, shown in exaggerated size in FIG. 6, is, used to examine the center of the input character 158 by considering the number of black pixels which are counted in the frame 180-2 which is large enough to embrace a 5×5 square matrix of pixels. In the embodiment described, a regular asterisk has a total count within the frame 180-2 of 18 or more black pixels.

Figure 12:
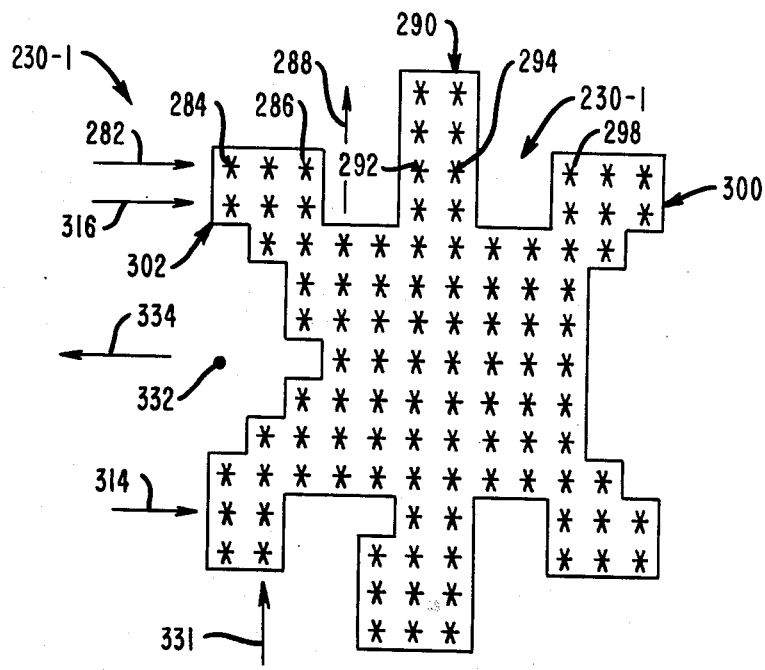
FIG. 12 is an illustration of what is considered a regular asterisk.
Figure 13:
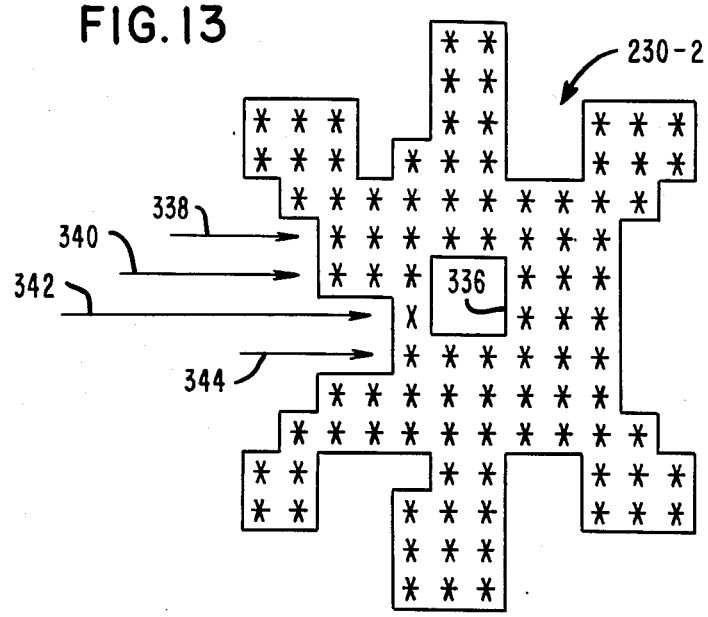
FIG. 13 is an illustration of what is considered an asterisk with hole.
Figure 14:
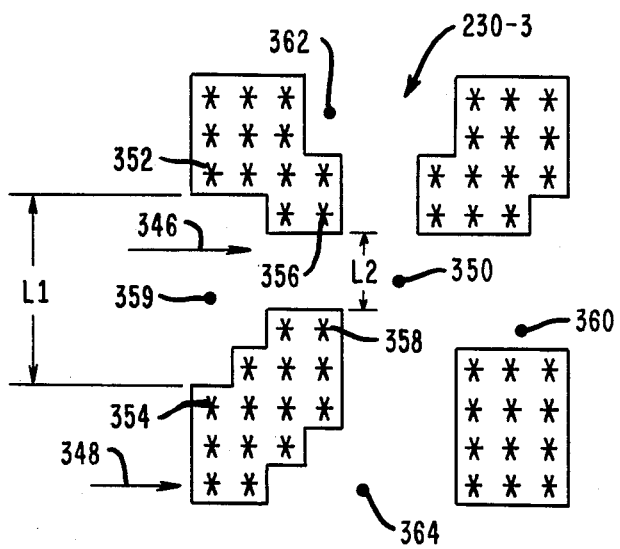
FIG. 14 is an illustration of what is considered a special asterisk.

As used herein, a regular asterisk 230-1 is shown in FIG. 12, an asterisk with hole 230-2 is shown in FIG. 13, and a special asterisk 230-3 is shown in FIG. 14.

Continuing with the routine 166-1 for a regular asterisk 230-1, if the number of black pixels in the frame 180-2 is 18 or greater as examined at step 232 in FIG. 11, the process 166 proceeds to step 234. At step 234, character recognition techniques are employed to determine whether or not the suspected regular asterisk 230-1 is in fact one. If asterisk 230-1 is recognized at step 236, the process 166 exits at step 238, and the location of asterisk 230-1 is used to find the courtesy amount 52 on a document 24 as previously explained. If the input character 158 is not recognized as a regular asterisk 230-1 at step 236, the process 166 proceeds to the recognition process 170 for recognizing a dollar sign, also shown in FIG. 7B.

If the input character 158 is not a regular asterisk 230-1, as determined from step 232 in FIG. 11, the process 166 proceeds to step 240 where the input character 158 is examined to determine whether or not it is an asterisk 230-2 with a hole as shown in FIG. 13.

The routine 166-2 (FIG. 7A) associated with checking for an asterisk 230-2 with hole, examines, at step 240 in FIG. 11, the number of black pixels within the examining frame 180-2 as previously described. If the number of black pixels within the 5×5 matrix of pixels located at the center of the input character 158 is greater than 10 but less than 18, the input character 158 may be an asterisk 230-2 with hole. Additional details associated with routine 166-2 are shown in more detail in FIGS. 15A and 15B; this aspect will be discussed in detail hereinafter.

If from step 242 in FIG. 11 it is determined that the input character 158 is potentially an asterisk 230-2 with a hole, the process 166 proceeds to step 234, where character recognition is effected as previously described. If the input character 158 is not recognized at step 234, the process 166 proceeds to recognition process 170 as previously described.

If from step 242 in FIG. 11 it is determined that the input character 158 is not an asterisk 230-2 with hole, the process 166 proceeds to step 244 where routine 166-3 begins.

Routine 166-3 in FIG. 11 relates to determining whether or not the input character 158 is a special asterisk 230-3 such as that shown in FIG. 14. Basically, the asterisk 230-3 has a gap of white pixels extending in row and column directions, so that there are fewer black pixels at the center thereof when compared to the asterisks 230-1 and 230-2. Utilizing the examining frame 180-2 as previously described, if the associated 5×5 matrix of pixels within the frame 180-2 includes a total number of black pixels which is less than or equal to 10, the input character 158 may be a special asterisk as determined in step 246 (FIG. 11). If the input character 158 is suspected as being a special asterisk 230-3, the actual character recognition is effected at step 248, and if the character is recognized as a special asterisk 230-3 at step 250, the process 166 exits at step 238-1. If the input character 158 is not recognized as a special asterisk 230-3 at step 250, the process 166 proceeds to step 170. The character recognition techniques employed at step 248 will be described in detail hereinafter. For the moment, it should be emphasized that if an input character 158 is not recognized as one of the asterisks mentioned with regard to the process 166 shown in FIG. 11, the process 166 ends and the associated input character 158 is then subjected to examination by the recognition process 170 shown on FIGS. 11 and 7B. It should be recalled that the recognition process for asterisk 166 and the recognition process for dollar sign 170 comprise different legs or parts of the process 150 shown in FIGS. 7A and 7B for finding the image data associated with courtesy amount 52.

Returning to FIGS. 7A and 7B, it should be recalled that if an input character 158 is not an asterisk as determined by routines 166-1, 166-2, or 166-3, or if the input character 158 has a row max or a column max figure greater than 20 pixels as determined at step 164, then the process 150 progresses to the recognition process for dollar sign 170.

One of the first steps in the recognition process 170 (FIG. 7B) is to determine, at step 172, whether or not the input character 158 is a machine printed character "8." The process represented by step 172 in FIG. 7B is shown in more detail in FIG. 19; this aspect will be discussed in detail hereinafter. If a character 8 is ascertained at step 172, the process 170 shifts to reject step 174 (FIG. 7B). At step 174, a dollar sign has not been recognized; this means that another character has to be evaluated. Therefore, the process 150 reverts to step 152 (FIG. 7A) where a new character 158 is subjected to the evaluation procedure associated with process 150.

Figure 17:
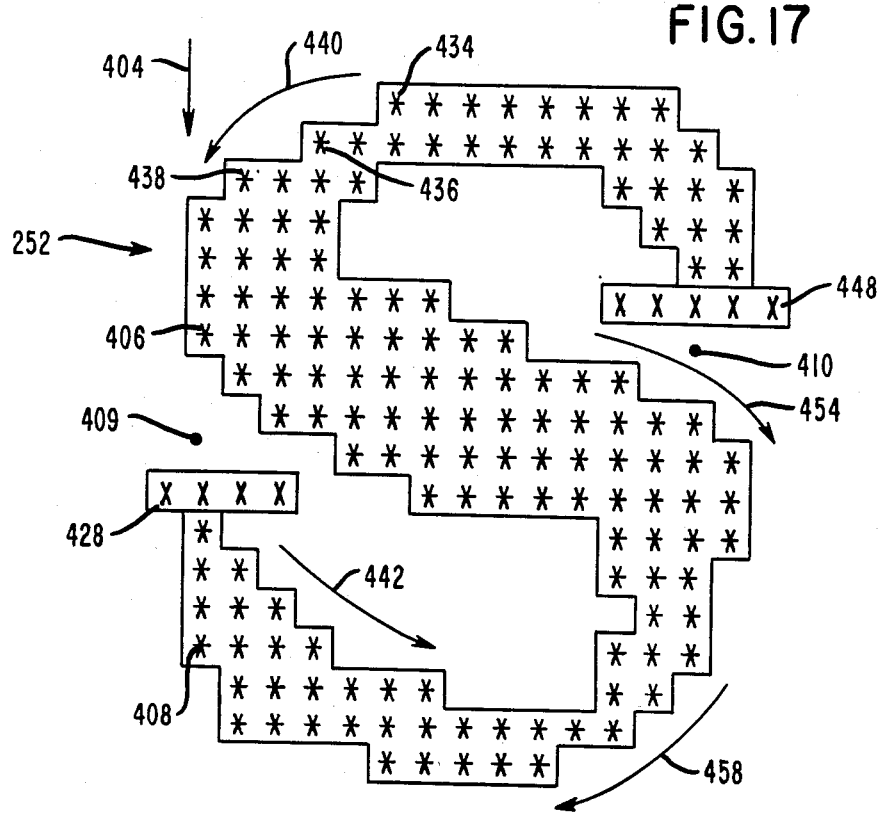
FIG. 17 is a diagrammatic showing of the image data associated with a "straight dollar sign"
Figure 18:
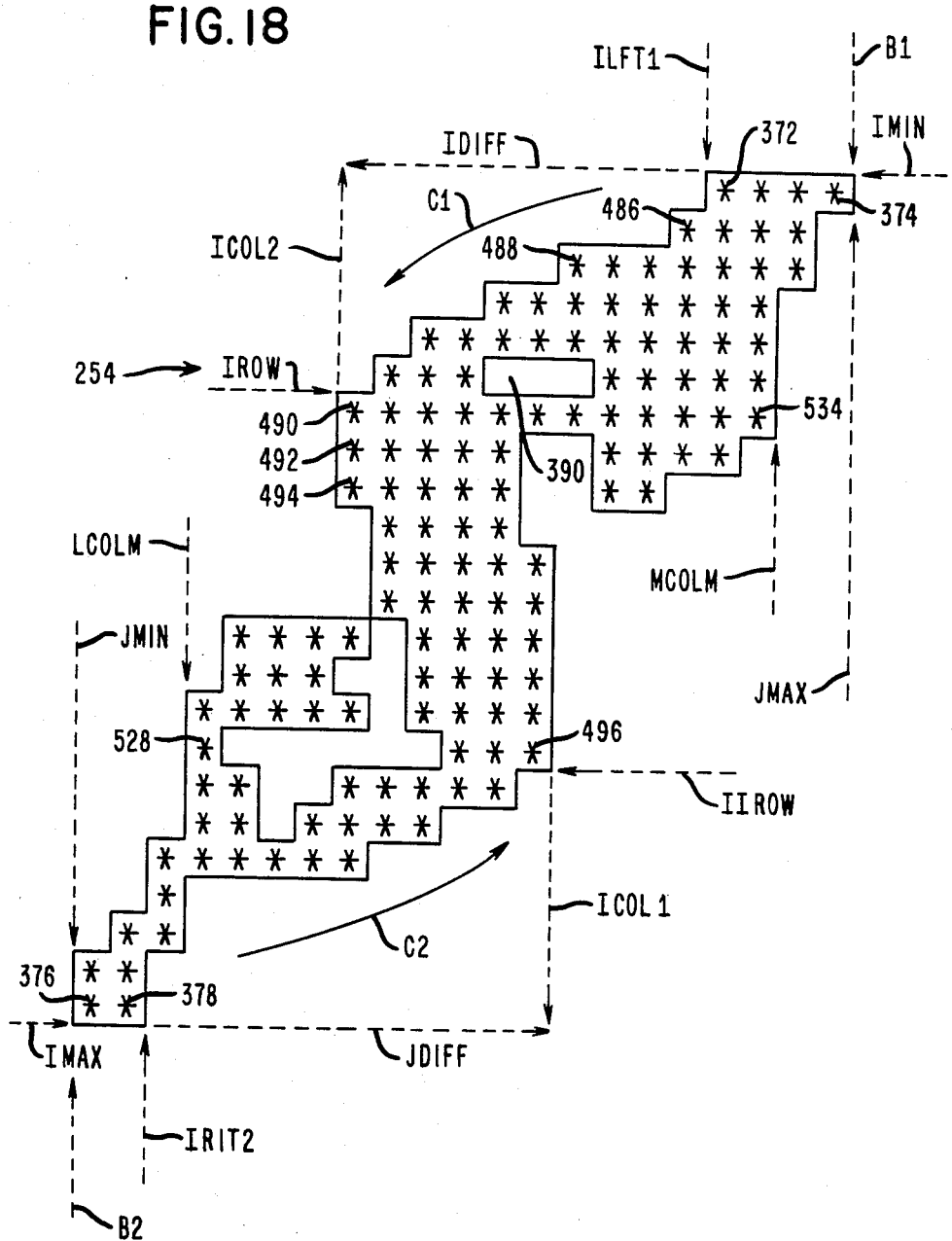
FIG. 18 is a diagrammatic showing of the image data associated with a "slanted dollar sign"

If an input character 158 is not recognized as a machine-printed character 8 at step 172 in FIG. 7B, it means that the input character 158 may be a dollar sign, and therefore, the process 170 progresses to step 178. At step 178, the input character 158 is evaluated to determine whether or not it is a straight variety or one which is slanted. From step 178, a straight variety of dollar sign is evaluated at step 178-1, and similarly, a slanted dollar sign is evaluated at step 178-2. The image data associated with a straight dollar sign 252 is shown in FIG. 17, and correspondingly, the image data associated with a slanted dollar sign 254 is shown in FIG. 18. As previously stated, if a straight dollar sign 252 is recognized at step 178-1 (FIG. 7B), the process 170 returns to step 176; this means that the remaining image data associated with this straight dollar sign 252 is data associated with the courtesy amount 52 on a document 24. Character recognition techniques may then be performed on the data associated with the recognized straight dollar sign 252 by the recognition processor 134 shown in FIG. 5. Similarly, if a slanted dollar sign 254 is recognized at step 178-2, character recognition techniques may then be performed on the data associated with the recognized slanted dollar sign 254 by the recognition processor 134. If a suspected, straight dollar sign 252 is not recognized as such at step 178-1 in FIG. 7, the process 170 transfers to step 178-2 where the "suspected straight dollar sign 252" from step 178-1 is examined to determine whether or not it is a slanted dollar sign 254. If this input character 158 from step 178-1 is not recognized as a slanted dollar sign 254 at step 178-2, the process 170 transfers to reject step 174 from which the process 150 begins again on a new input character 158 at step 152 (FIG. 7A).

Figure 19:
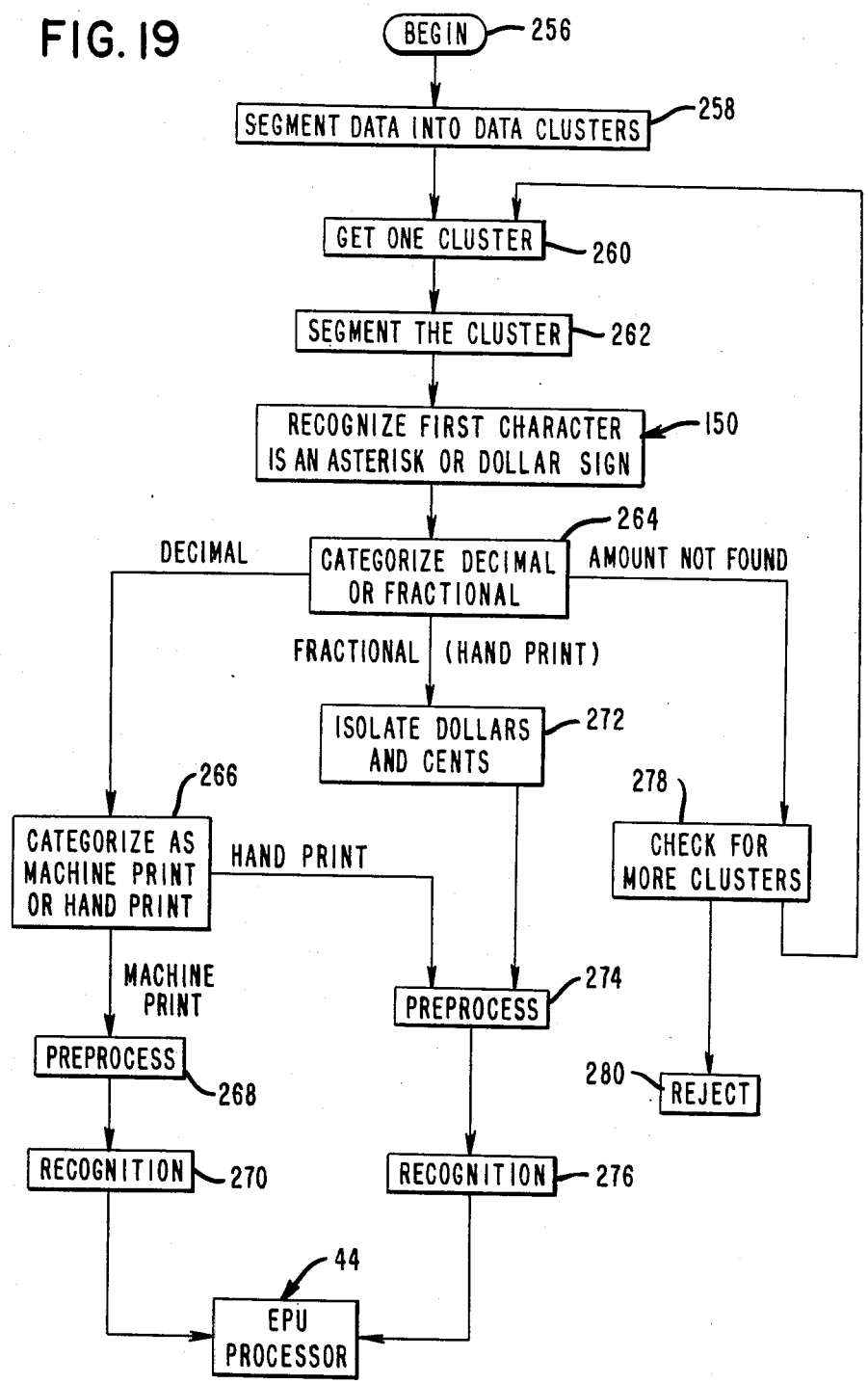
FIG. 19 is a flow chart showing a general routine associated with the C.A.R. module shown in FIG. 2A.

At this point, it seems appropriate to discuss what happens when an asterisk is recognized at step 168 in FIG. 7A, or a dollar sign is recognized at step 176 in FIG. 7B; this aspect is shown in FIG. 19.

FIG. 19 is a flow chart showing, in general, the operations performed at the C.A.R. module 19 shown in FIG. 2A. For each document 24, the operation begins at step 256 as previously described, and the image data associated with a document 24 is segmented into data clusters at step 258. At step 260, a cluster of data from the RAM 138 (FIG. 5) is obtained by working from left to right and from the top to the bottom of the image data associated with a document 24 as previously explained. The cluster of image data obtained from step 260 is then segmented, conventionally, at step 262 to provide separation between adjacent characters. Thereafter, the process 150, already described with regard to FIGS. 7A and 7B, is performed. Assuming that a dollar sign or asterisk is recognized at process 150, the next step 264 is to categorize the "cents portion" of the courtesy amount 52 as either decimal (like 0.28) or fractional (like 28/100). This is done to enable different routines to effect character recognition. The cluster of image data which is interpreted as "decimal" from step 264 is evaluated at step 266 to determine whether the courtesy amount is machine printed or printed by hand. If it is machine printed, the image data for the courtesy amount 52 is pre-processed at step 268 and character recognition is effected, conventionally, at step 270. Because the fractional designation of cents (like 28/100) associated with a courtesy amount 52 is usually hand printed, the image data associated therewith is processed at step 272 to separate the dollars and cents for processing by routines which relate to processing hand printed data. At step 274 pre-processing is performed, conventionally, on the data from step 272 to facilitate character recognition. The image data categorized as "hand print" from step 266 is also pre-processed at step 274, and conventional character recognition techniques are employed at step 276 on the image data. The characters recognized by the recognition steps 270 and 276 along with the confidence levels for each of the characters read are transferred to the EPU processor 44 as explained previously with regard to FIGS. 2A and 2B. If the decimal or fractional part of a courtesy amount 52 is not found at step 264 in FIG. 19, the next step 278 is to check for additional clusters of image data in the hope of finding the complete courtesy amount; and accordingly, a new search is initiated at step 260. If no additional clusters exist, a reject step 280 from step 278 is provided.

As alluded to earlier herein, there are various routines associated with the several steps like 232, 240 etc. shown in the asterisk recognition process 166 depicted in FIGS. 7A and 11, and there are also additional routines associated with steps 172, 178, for example, of the recognition process 170 for dollar sign shown in FIG. 7B.

The routines 166-1 and 166-2 associated with recognition process for asterisk 166 (FIG. 7A) can be explained best in association with the asterisks 230-1 and 230-2 shown in FIGS. 12 and 13, respectively. Earlier herein, it was stated that the examination of image data is done from left to right and from top to bottom, as viewed in FIG. 12, for example. At this time, the outer parameters such as IMIN and IMAX shown in FIG. 10 already have been determined. The routines 166-1 and 166-2 are essentially the same; however, the routine 166-2 for an asterisk 230-2 with hole, like that shown in FIG. 13, is modified slightly to determine first, whether or not a hole in the asterisk 230-2 exists. It should be recalled that the initial determination as to whether an input character 158 is a regular asterisk 230-1, an asterisk with hole 230-2 or a special asterisk 230-3 was determined by counting the number of black pixels within the outer parameters of the input character 158.

The first step in routine 166-1 is to examine the top-half of the asterisk 230-1 (FIG. 12) to determine the total number of transitions from white pixels to black pixels and from black pixels to white pixels when proceeding along the rows of pixels. The number of transitions is retained for each row, and the maximum number of transitions for a row in the top half of the asterisk 230-1 is recorded. For example, the maximum total number of transitions from white-to-black pixels and from black-to-white pixels for the top half of asterisk 230-1 is six, and the transitions occur along the row indicated by the arrow 282, with the first white-to-black transition occurring at black pixel 284. When scanning from left to right as just described, six transitions mean that the input character 158 has 3 openings like asterisks 230-1 and 230-2. If the maximum number of transitions in a particular row is four, it means that the input character 158 has two openings, and if the maximum number of transitions is two, it means that input character 158 has no openings, but instead it has a vertical bar or segment at its top.

Figure 20:
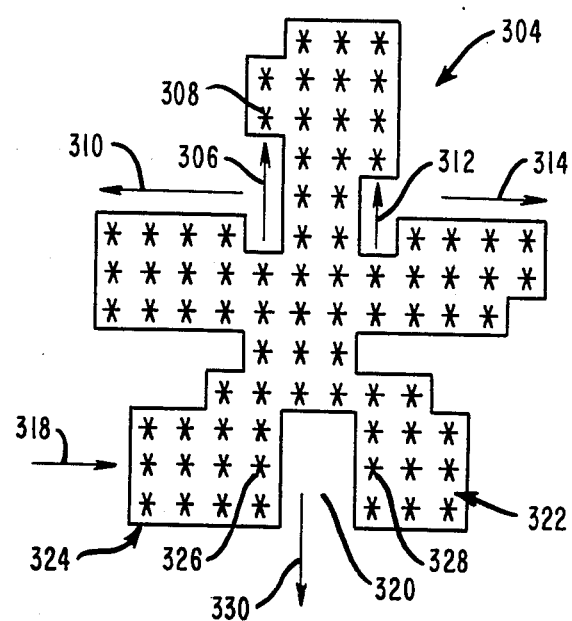
FIG. 20 is an illustration of another asterisk which is considered a regular asterisk.

The second step in routine 166-1 is to determine whether or not the transitions determined from the first step are open at the top, sides, and bottom of the suspected asterisk like 230-1. Checking for openness is effected by looking for the first black-to-white pixel transition which occurred in the row (like that indicated by arrow 282 in FIG. 12) containing the maximum total of transitions in order to identify the particular column number in which the transition occurs. In the example just described, the black pixel involved in the black-to-white transition is black pixel 286, and the particular column is identified by arrow 288 in FIG. 12. It should be recalled that the black and white pixels are identified by the row and column numbers as explained in connection with FIG. 6. The process being described in this paragraph is done to search for a bar like bar 290 in FIG. 12 because the presence of the bar 290 is a clue to identifying the input character 158 as an asterisk like 230-1. This searching is continued along the row shown by arrow 282, and in the example described, there is no transition in the column number to the right of arrow 288, and the first transition thereafter is from a white-to-black pixel associated with the black pixel 292. The next transition along the direction of arrow 282 is a black-to-white transition associated with the black pixel 294, and this fact is expected when an asterisk is anticipated in the recognition process. The white space on the right side of bar 290 is also an identifying characteristic of an asterisk, and thereafter, a white-to-black transition is encountered, including black pixel 298 which forms the beginning of a wing 300. The wing 300, the opposite wing 302, and the black bar 290 therebetween are features which are indicative of an asterisk. What has been described in this paragraph relates to an examination of the top half of an input character 158 like asterisk 230-1 shown in FIG. 12. Searching upwardly along the direction of arrow 288 on both sides of the bar 290 in FIG. 12 and finding white pixels on both sides of the bar 290 identifies the top half of the character as an asterisk. In this regard, FIG. 20 depicts image data for an asterisk 304 which is slightly different from the asterisk 230-1. When searching for white pixels in an upward direction as shown by arrow 306 in FIG. 20, a black pixel like 308 is encountered sometimes; when this occurs, searching for white pixels in the direction of arrow 310 is then effected as far as the left perimeter JMIN of the associated input character 158 as shown in FIG. 10. White pixels along the direction of arrows 306 and 310 in FIG. 20 indicate that the top half of the input character is an asterisk. When searching for white pixels along the direction of arrow 312 in FIG. 20 and a black pixel is encountered, the searching for white pixels continues along the direction of arrow 314. A plurality of white pixels along the direction of arrow 314 indicates "openness" which is a characteristic of an asterisk.

The character recognition technique just described in the previous paragraph for the top half of the asterisk 230-1 shown in FIG. 12 is repeated for the lower half of the asterisk 230-1 because it is symmetrical. For example, for an asterisk like 230-1, there would be six transitions along the row represented by arrow 314 corresponding to the six transitions already described along the row represented by arrow 282. In some situations when searching the lower half of an input character 158, an asterisk like 304 (FIG. 20) is encountered in which the lower half is not symmetrical to the upper half. This is recognized by finding four transitions along the row designated by arrow 318 in FIG. 20. The four transitions along the row indicated by arrow 318 indicate an opening 320 between the wings 322 and 324 of the asterisk 304. Because the pixels or image data for an input character 158 are bounded by the various minimums and maximums shown in FIG. 10, the locations of the column positions which define the opening 320 can be ascertained by the transitions associated with the black pixels 326 and 328 (FIG. 20) for example. By knowing these limits, a search for white pixels can be made along the direction of arrow 330. This search is done along the direction of arrow 330 to make sure that there are no black pixels in the opening 320 as black pixels in this area might mean the lower portion of the numeral 8.

To summarize, the top half of the asterisk 230-1 in FIG. 12 has been examined, and its lower half has been similarly examined, with the procedure for checking the lower half of an asterisk being discussed in relation to the type asterisk 304 shown in FIG. 20.

After the lower half of asterisk 230-1 (FIG. 12) is examined, the same routine employed to search the top and bottom halves is used to search the left half and then the right half of the asterisk 230-1. The same technique is employed in this regard because the pixel data is in matrix form (as viewed in FIG. 10), for example, and the data or pixels to be examined can be examined on a column basis rather than on a row basis as was done with the top and lower halves. When considering the number of transitions along a column represented by arrow 331 for the left side of the asterisk 230-1, there will be four transitions for a regular asterisk as shown in FIG. 12. After four transitions are found, a search for black pixels along the direction of arrow 334 in the opening 332 is made as was done with regard to the lower half of asterisk 304 (FIG. 20) already discussed. If no black pixels are found along the direction of arrow 334 (FIG. 12) it means that the character is not a dollar sign; this fact is true of all the asterisks. The same treatment given for evaluating the left side of asterisk 230-1 is given for the right half thereof.

To summarize, the general test for a regular asterisk 230-1 results in six transitions across the top and lower halves and also results in four transitions along the left and right halves as described.

The asterisk 230-2 with hole shown in FIG. 13 is very similar to the regular asterisk 230-1 already described in relation to FIG. 12, except, of course, asterisk 230-2 has a hole 336 therein The procedure 166-2 shown in FIG. 11, for example, for examining for an asterisk 230-2 with hole is identical to that procedure already described in relation to the regular asterisk 230-1, except for a procedure (to be described) associated with the pixel data near the hole 336. It should be recalled that when searching rows of the asterisk 230-1 from the top towards the bottom (as viewed in FIG. 12) along the direction of arrow 282, a maximum of six transitions occurred, and then a row was reached at which only two transitions occurred. Only two transitions similarly occur along the row indicated by arrow 338 (FIG. 13); however, four transitions occur along the row indicated by arrow 340, four transitions occur along the row indicated by arrow 342, and two transitions occur along the row indicated by arrow 344. Therefore, since a row (arrow 344) contained two transitions, and the prior row (arrow 342) contained four transitions, the routine 166-2 picks the row shown by arrow 342 (FIG. 13) as the center (as measured in a vertical direction) of the anticipated hole 336. This is sufficiently accurate because the boundary of the entire input character is less than 20 pixels in each direction as previously explained, and the scanning has a pixel density of 154 pixels per inch in the embodiment described. Because the boundaries of the matrix of pixels associated with an input character 158 are known, as shown in FIG. 10, for example, the center of the hole 336 as measured in a horizontal direction is obtained by noting the specific pixels at which the associated black-to-white transitions occurred for the left-most boundary of the hole 336. The right-most boundary is correspondingly noted by finding the white-to-black transition, and the midpoint as measured in horizontal direction (as viewed in FIG. 13) is then determined. Having found the center of the anticipated hole 336, the routine 166-2 then imposes a window frame encompassing a 5×5 matrix of pixels over the pixel data having the just-found center of hole 336 as the center of this window frame, and thereafter, the number of black pixels which occurs around the perimeter of this frame is counted. In the embodiment described, if the number of black pixels around the perimeter of this frame is greater than 10 but less than 18, it indicates the probability of a hole like 336 being there. This evaluation is shown as step 242 in FIG. 11. If a hole is present, the routine 166, shown in FIG. 11, continues to step 234 in FIG. 11 wherein the recognition procedures for a regular asterisk are employed; these are the procedures which evaluate the top half, bottom half, left side, and right side as previously explained.

If the evaluation for the hole 336 (FIG. 13) in an anticipated asterisk, as discussed in relation to step 242 in FIG. 11, results in a "no" evaluation at step 242, the routine 166 proceeds to the subroutine 166-3 (at step 246) which is a procedure to check whether or not a suspected asterisk is a special asterisk of the type shown as 230-3 in FIG. 14. The asterisk 230-3 occurs rarely, and the total number of black pixels within the 5×5 window surrounding the center of the hole for this asterisk is less than 10 black pixels at evaluation step 242 in FIG. 11.

The subroutine 166-3 at step 244 in FIG. 11 begins by looking for transitions occurring in the top row of a suspected special asterisk 230-3 in FIG. 14 and proceeding towards the middle half of the character as previously described During the scanning, the routine 166-3 looks for at least two transitions from white to black in a row when scanning from the left side of the input character towards the right side as viewed in FIG. 14; this could indicate an opening at the top of the asterisk like 230-3. Near the midpoint of the asterisk 230-3 at least one row of white pixels will be encountered, as at the row indicated by arrow 346, and this separates the asterisk like 230-3 into upper and lower halves. The bottom row as indicated by arrow 348 is also examined to determine whether or not it contains at least two white-to-black transitions which are also an indication when coupled with other features of the type asterisk shown in FIG. 14. The center point 350 of the asterisk 230-3 is determined as previously explained, i.e., using the boundary points for the input character 158 as shown in FIG. 10; this is determined from both a row and column standpoint. For a suspected asterisk like 230-3 in FIG. 14, there would be all white pixels and no transitions along a row of pixels passing through the center point 350, and similarly, there would be all white pixels and no transitions along a column of pixels also passing through the center point 350.

After having determined the row and column numbers of all white pixels passing through the center point 350, the routine 166-3 (FIG. 11) then proceeds to examine the openings appearing around the perimeter of the asterisk 230-3 (FIG. 14). Starting with the left boundary of the asterisk 230-3, the first black-to-white transition (when proceeding in a downward, vertical direction) is associated with the black pixel 352, and the next transition when proceeding along the associated column is a white-to-black transition which is associated with black pixel 354. Because the outer limits of suspected asterisk 230-3 are known, the number of rows between the black pixels 352 and 354, which will be designated as L-1, gives the length of the opening at that side. The same length determination is made for the length of the opening between the black pixels 356 and 358 to provide a second length L-2. These L-1 and L-2 values are associated with the opening 359. The same technique is applied to determine corresponding length values for the openings 360, 362, and 364. The routine 166-3 (FIG. 11) then evaluates the two length values associated with each of the openings 359, 360, 362, and 364. For example, L-1 is compared with L-2, and if L-1 is greater than L-2, it means that the opening 359 narrows as it approaches the center point 350; this is one of the indicators of the asterisk 230-3. This same evaluation is performed for the associated lengths for the openings 360, 362, and 364, and if at least three of these four openings have their associated outer lengths greater than the associated inner lengths (like L-1 greater than L-2), it means that the input character 158 under evaluation is most likely the special asterisk 230-3 shown in FIG. 14 and is recognized as such at step 250 in FIG. 11. If the input character 158 is not recognized as an asterisk 230-3 at step 250, the routine 166-3 proceeds to process 170 (FIG. 11) which is also shown on FIG. 7B.

If an input character 158 is recognized (via routine 150) as a regular asterisk 230-1 (FIG. 12), or as an asterisk with hole 230-2 (FIG. 13), or as a special asterisk 230-3 (FIG. 14), the routine 166 exits at steps 238, and 238-1 in FIG. 11 (or as combined step 168 in FIG. 7A) to the processing after step 150 shown in FIG. 19 and already described. If the input character 158 is not recognized as an asterisk by routine 166 shown in FIGS. 7A or 11, the input character is subjected to the recognition process for dollar sign 170 alluded to earlier herein in association with FIG. 7B.

Figure 16:
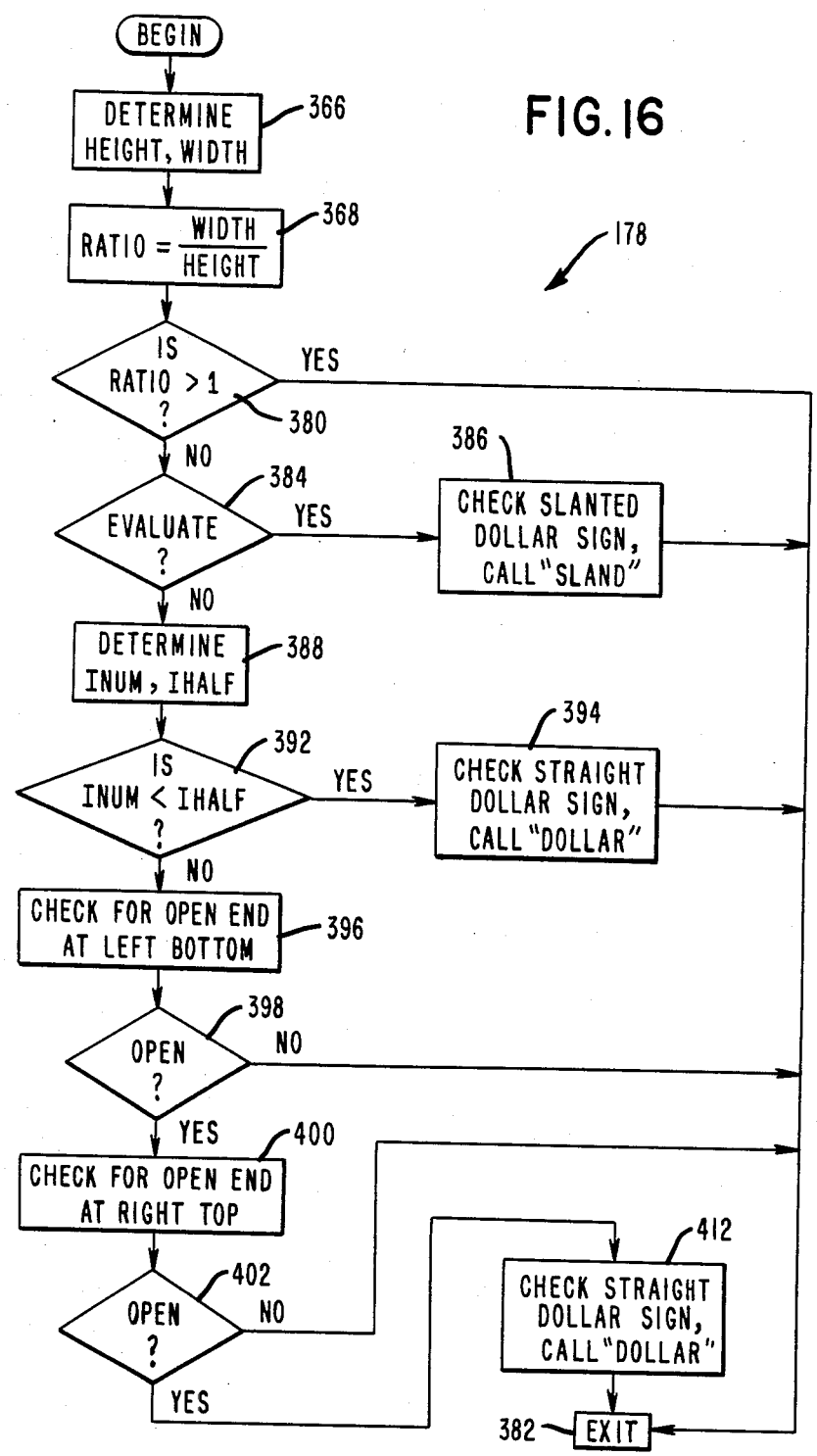
FIG. 16 is a flow chart showing more details of a routine associated with the "recognition process for dollar sign" shown in FIG. 7B.

Referring to the recognition process for dollar sign 170 shown in FIG. 7B, the step 178 shown therein is shown partially in more detail in FIG. 16. The first step 366 is to determine the height and width of an input character and then to determine the ratio of the width to the height in step 368. For example, the IMIN, IMAX, JMIN, and JMAX values of the suspected slanted dollar sign 254 in FIG. 18 are known. These values are loaded into a buffer in RAM 138 in FIG. 5 where they are stored until needed for the various routines to be described hereinafter.

At step 380 (FIG. 16) an evaluation is made, and if the ratio of the width to height for a character is greater than 1, the routine proceeds to the exit step 382.

A width-to-height ratio greater than 1 as obtained from step 380 indicates that the input character 158 is not a dollar sign. This is true because the dollar signs experienced have a width-to-height ratio of less than 1. At this point in the processing, the input character 158, proceeding to step 384 in FIG. 16, could be a dollar sign or a character like 8, 5, 3, or 2, for example.

The input character 158 is examined at step 384 in FIG. 16 from parameters different from those employed in step 380 to decide whether or not it is a slanted dollar sign 254 (FIG. 18) or a straight dollar sign 252 (FIG. 17).

At step 384 in FIG. 16, an evaluation is made of the transitions in the columns in an input character when proceeding from left to right as viewed in FIG. 18, for example. One of the attributes of thresholder 80 in FIG. 2A in reducing the gray levels of data from 64 to 2 as derived from the imaging device 58, is that the center areas of dollar signs tend to get filled in as shown by dollar sign 254 in FIG. 18. The slanted dollar signs like 254, especially, tend to get filled in with black pixels (more so than is shown in FIG. 18). This attribute is used in step 384 as another check to distinguish a slanted dollar sign from a straight dollar sign and from the character 8, for example. If there is just one transition from white to black in each of the columns for a character, the routine proceeds to step 386 in FIG. 16 in which the routine (SLAND) for checking on a slanted dollar sign is called. If there is just one transition at IMIN and IMAX of an input character, the character is most likely like the slanted dollar sign 254 in FIG. 18 instead of being like a character 8, 5, or 2 which has large white open areas therein in the columns of the character. By one transition in each of the columns, it is meant that there are no openings or white pixels within that column once the first white-to-black transition is encountered for that particular column. If there is a gap of white pixels within the body of the character at any one of the columns, the routine proceeds to step 388 in which INUM and IHALF values are determined. The term INUM means the number of closed rows of white pixels, like row 390 in FIG. 18, which are located within the character. The term IHALF means half the height of the input character. At step 392 in FIG. 16, an evaluation is made of the INUM and IHALF values, and if the number of rows having closed white rows like 390 for a character is less than IHALF, the routine 178 proceeds to step 394 which calls a routine (Dollar) to check for a straight dollar sign 252 like that shown in FIG. 17. This means that the input character is most likely a regular dollar sign like 252 (FIG. 17) and is not likely to be a character 8. The routine (Dollar) associated with step 394 will be described hereinafter.

If at step 392, the INUM value is greater than IHALF, the character being evaluated may be an 8 or 5, for example, and therefore, the routine 178 proceeds to step 396.

Steps 396, 398, 400, and 402 in FIG. 16 are basically steps to ascertain whether or not the input character under examination is most likely a character 8, 5 or 2. This check is made because the characters or numerals 8, 5, and 2 have certain portions thereof which resemble the characteristics of a dollar sign.

At step 396 in FIG. 16, a check is made of the left, lower end of an input character to look for an open end. In checking for an open end, the leftmost column as shown by arrow 404 in FIG. 17 is examined for black-to-white pixel transitions. One black-to-white transition is associated with pixel 406, and a second black-to-white transition is associated with pixel 408 (FIG. 17) in the example described. With two black-to-white transitions in a column, it might mean that the left side of the input character is open as, for example, at the opening 409. If no opening 409 is present, the process continues to step 382 (FIG. 16) because, if there is no opening at 409, it means the input character 158 is probably not a straight dollar sign like 252. A similar check is made of the right side of the top half of the input character as shown at step 400 to look for an opening 410 (FIG. 17). If there is no opening 410, i.e., the input character is not open at step 402, it means that it is most likely an "8," for example, and, accordingly, the process proceeds to exit at step 382. If there is an opening 410 at step 402, the process proceeds to step 412 from which the DOLLAR routine is called.

To summarize, those input characters 158 which are obviously not slanted dollar signs (254) or regular dollar signs (252) like those shown in FIGS. 18 and 17, respectively, are eliminated in the process shown in FIG. 16. Those input characters 158 which are suspected slanted dollar signs are examined more extensively in the SLAND routine (from step 386 in FIG. 16), and those input characters which are suspected straight dollar signs are examined more extensively in the DOLLAR routine (from steps 394 and 412).

Figure 21:
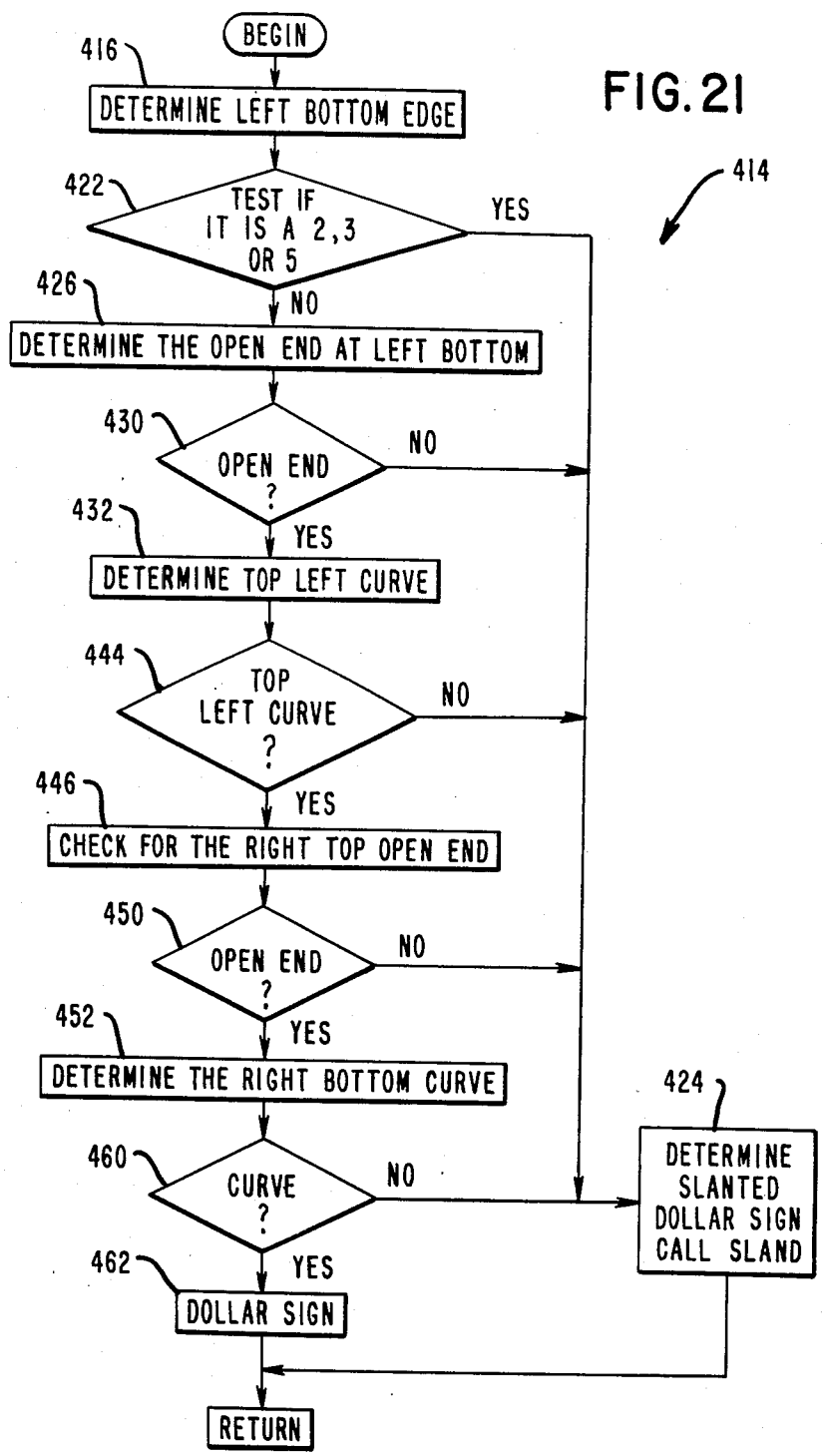
FIG. 21 is a flow chart showing a process associated with identifying a "straight dollar sign"

The DOLLAR routine alluded to is designated generally as 414, and is shown in more detail in FIG. 21. Before proceeding with a detailed discussion of this routine, it should be pointed out that some of the straight dollar signs may or may not have straight lines running through the vertical centers thereof; these straight lines are not considered in the procedures described herein because they become obscured or insignificant during the noise cleaning and thresholding operations alluded to earlier herein. Also, a unique feature among the straight dollar signs like 252 in FIG. 17 is that the extreme left column of pixels like that shown by arrow 404 for the top half of dollar sign 252 and the extreme left column of pixels for the bottom half of dollar sign 252 lie in the same column or within 2 or 3 columns of each other; the same is true of the extreme right column of pixels.

Figure 23:
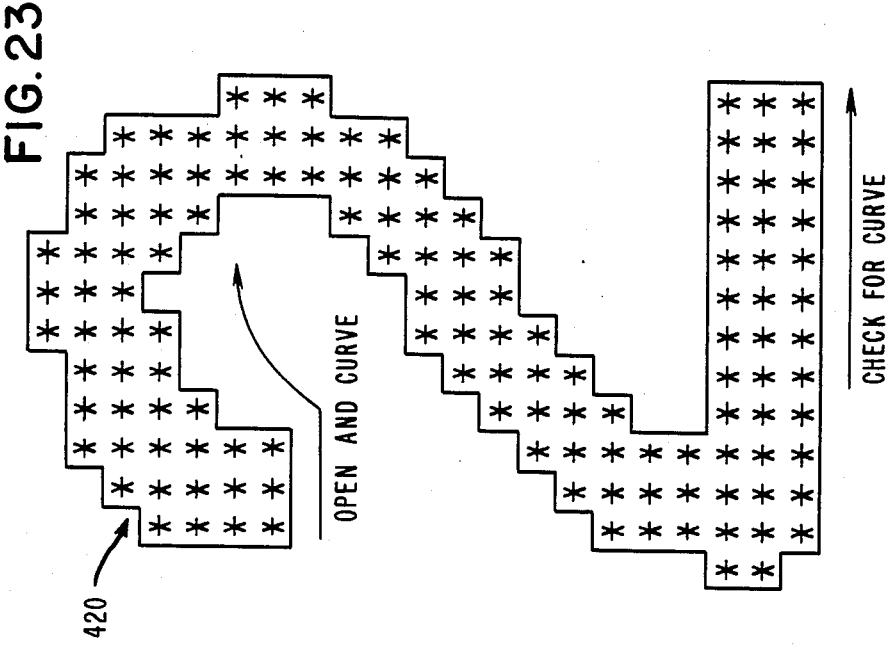
FIG. 23 is a diagrammatic showing of the image data associated with an input character "2"
Figure 22:
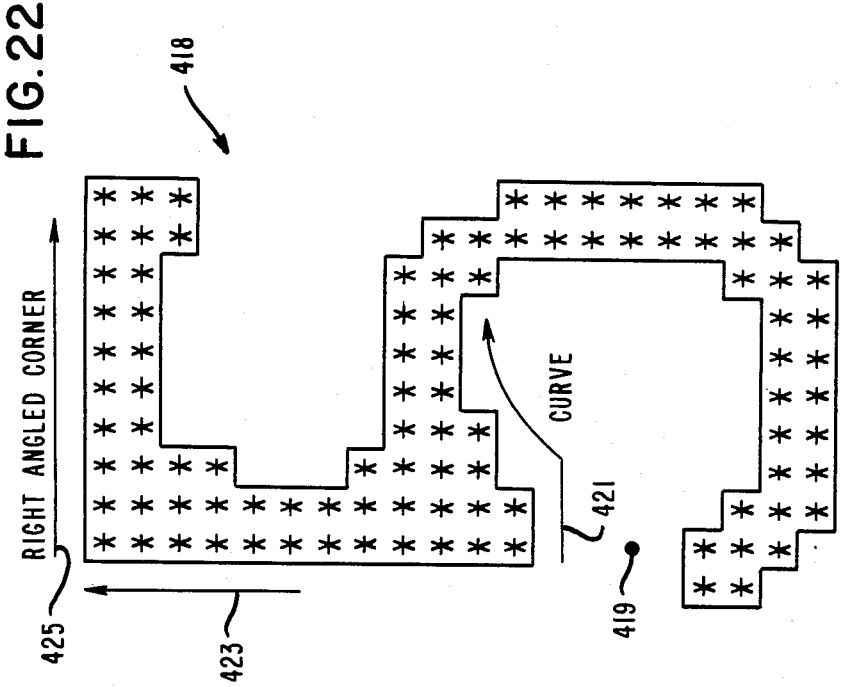
FIG. 22 is a diagrammatic showing of the image data associated with an input character "5"

The first step 416 of the DOLLAR routine 414 (FIG. 21) covers several different operations in which the lower-left, bottom edge of the input character is examined. In this regard, FIG. 22 shows an input character like the number "5" which is designated 418, and FIG. 23 shows an input character like the number "2" which is designated 420. The following tests are included in step 422 to test whether or not the input character is a 2, 3, or 5. Basically, the tests are designed to search for openness shown at 419 and for the curve 421 (FIG. 22). The determination of the curve 421 is similar to the determination of curves C1 and C2 shown in FIG. 18, and this aspect will be discussed in detail hereinafter. Certain right angled corners shown by arrows 423 and 425 in FIG. 22 are indicative of the number "5" as shown. If there is a yes response to the various tests performed at step 422, the DOLLAR routine 414 proceeds to step 424 in FIG. 21 in which the SLAND routine is called; this SLAND routine is one to determine whether or not the input character is a slanted dollar sign.

If at step 422 in FIG. 21, the input character is not a "2," "3," or "5," it may in fact be a straight dollar sign like 252 in FIG. 17, and accordingly, the routine 414 proceeds to step 426 at which the left, lower half of the input character is examined to look for an open end. Step 426 is similar to step 396 in FIG. 16 except that step 426 is more extensive. In addition to that already described in relation to step 396, when an opening like 409 in FIG. 17 is determined, an examination is made to determine how many white pixels exist in the row at the opening like 409. In this regard, if there are at least four white pixels (shown as x's within the rectangle 428 in FIG. 17) in a row, it means the left end is definitely open. If at step 430 in FIG. 21, four white pixels are not found in a row, the routine 414 proceeds to step 424 in which the SLAND routine is called. If at least four white pixels are found at step 430, the routine 414 proceeds to step 432 in which the top, left curve of a suspected, straight dollar sign like 252 in FIG. 17 is examined. Step 432 is accomplished by examining where the first black pixel for an input character is encountered for each row while proceeding from the top of a character towards the bottom. For example, with regard to the first row of black pixels, the first black pixel when proceeding from left to right as viewed in FIG. 17 is pixel 434. Similarly, the first black pixel in the next row is pixel 436, and the first black pixel in the third row is 438. Notice that as one progresses in a direction towards the bottom row, the first black pixels encountered approach the left boundary of the input character to produce a curve 440 as shown in FIG. 17. Curve 440 is characteristic of the top left side of a straight dollar sign like 252. Step 432 in FIG. 21 also includes an evaluation of the progress of the black pixels in subsequent rows in the lower left half of the sign 252 to produce the curve 442 (FIG. 17). If the curves 440 and 442 are present at step 444 in FIG. 21, it means that the input character could be a straight dollar sign like 252, and if these curves 440 and 442 are not present, the routine 414 proceeds to step 424 from which the SLAND routine is called.

From step 444 in FIG. 21, the routine 414 proceeds to step 446 which is similar to step 426 already described except that the associated examination for an opening 410 is done for the right side of the input character like dollar sign 252 shown in FIG. 17. In this regard, if there are four or more white pixels in a row as shown by the x's within the rectangle 448 (FIG. 17), the routine 414 proceeds to step 450; if not, the routine 414 proceeds to step 424 as previously explained.

If there is an opening like 410 shown in FIG. 17, the routine 414 (FIG. 21) proceeds to step 452. At step 452, the progress of black pixels at the ends of rows of pixel data for the right side of the suspected straight dollar sign 252 (FIG. 17) is examined as previously described to ascertain the curves 454 and 458. If such curves as 454 and 458 exist for the input character at step 460, the input character 158 is identified as a straight dollar sign 252 at step 462 in routine 414. This means that the input character 158 has been identified as a straight dollar sign 252 like the one shown in FIG. 17; therefore, the matrix of data which is associated with the straight dollar sign 252 relates to the monetary amount. Step 462 in FIG. 21 is analogous to the broad step 178-1 shown in FIG. 7B. The detail listings for the DOLLAR routine 414 generally described in association with FIG. 21 are included in the Appendix included hereinafter.

Having described the DOLLAR routine 414 for identifying a straight dollar sign like 252 in FIG. 17, it now seems appropriate to describe the SLAND routine mentioned earlier herein for recognizing a slanted dollar sign like 254 shown in FIG. 18. It should be recalled that the SLAND routine fits into step 178-2 in FIG. 7B; FIGS. 7A and 7B relate to the overall method of searching for an asterisk or dollar sign. In general, the SLAND routine will test an input character 158 to determine whether or not it is a slanted dollar sign like 254 (FIG. 18) after it is determined that it is not an asterisk and after it is determined that it is not a straight dollar sign like 252 (FIG. 17) by the DOLLAR routine 414 (FIG. 21).

Figure 24A:
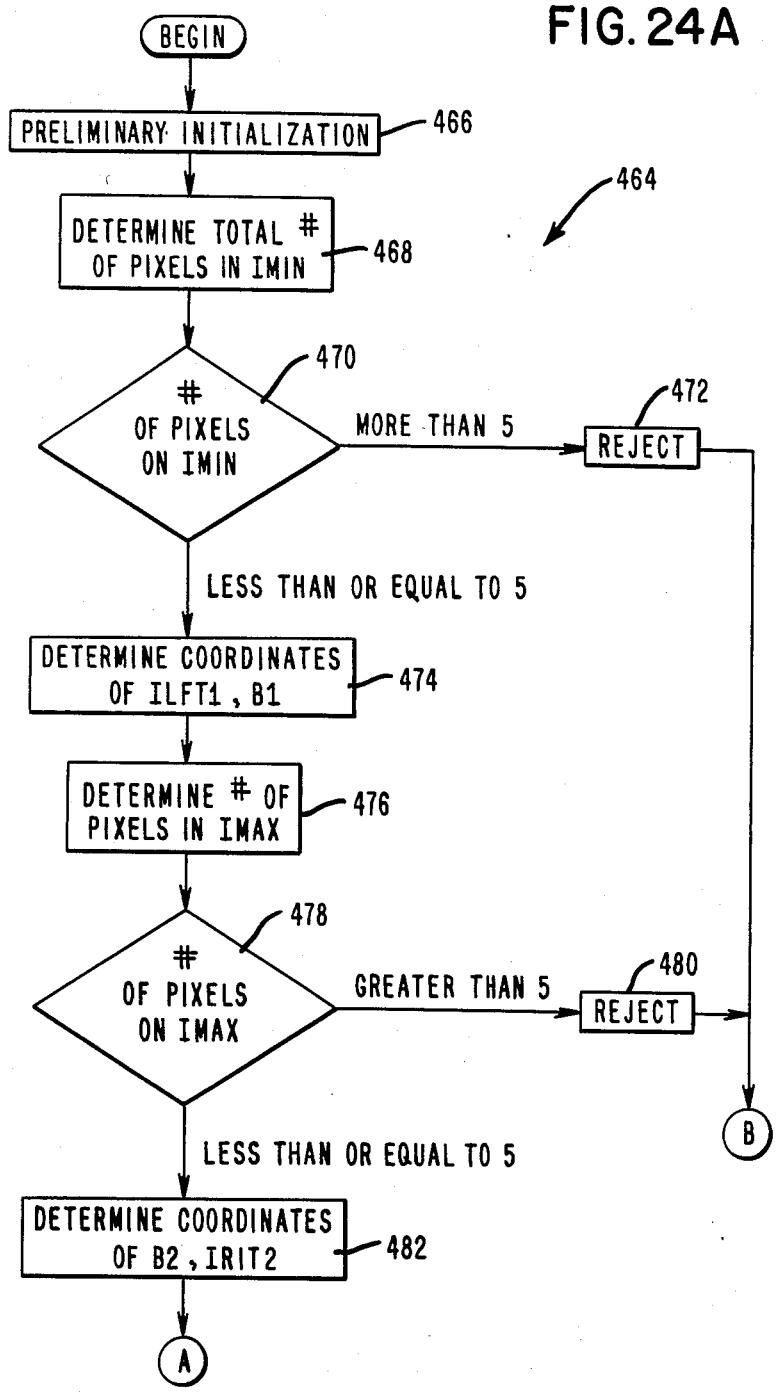
FIGS. 24A, 24B, and 24C, taken together, represent a flow chart showing the SLAND routine for recognizing a slanted dollar sign.
Figure 24B:
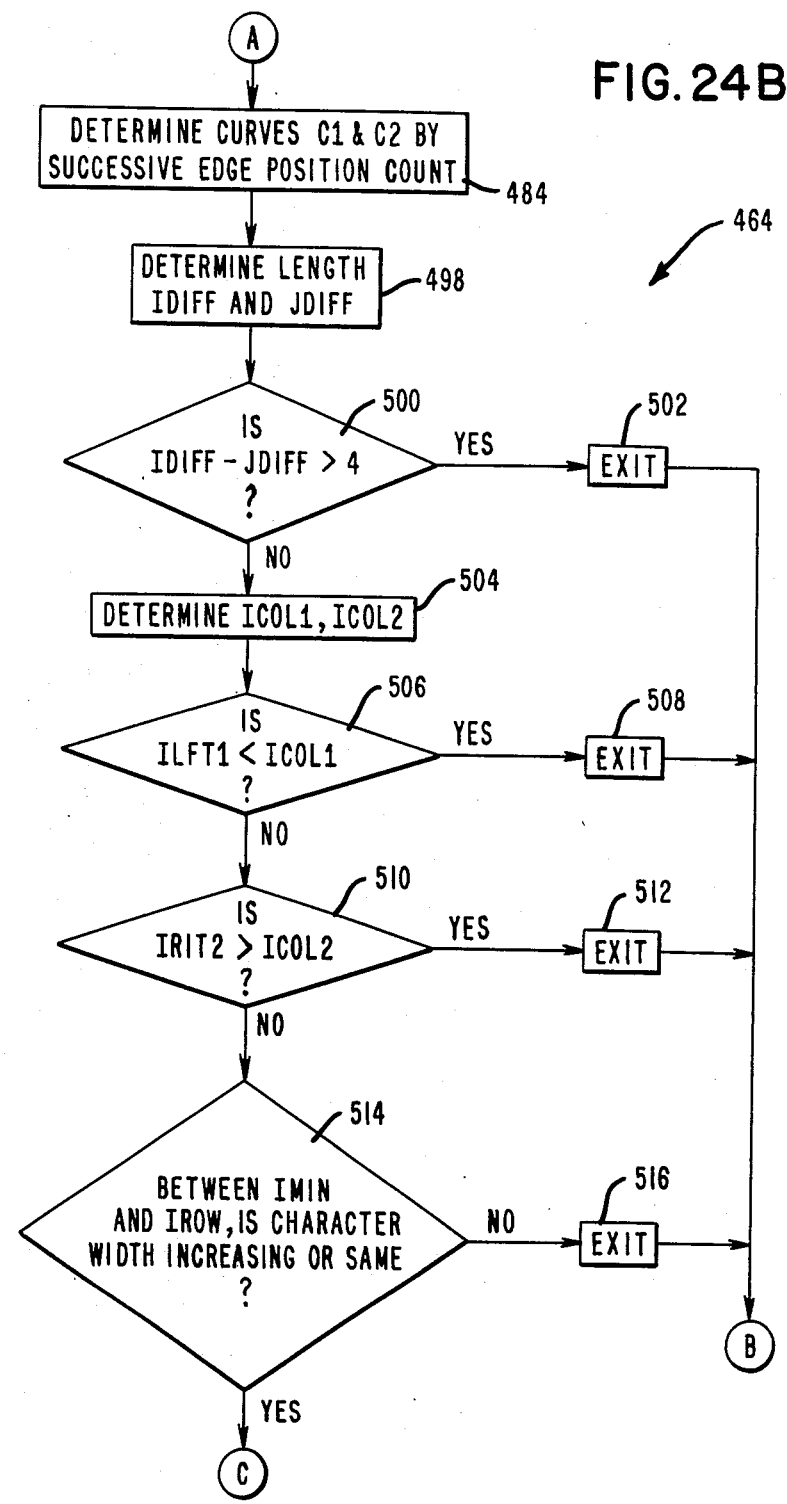
Figure 24C:
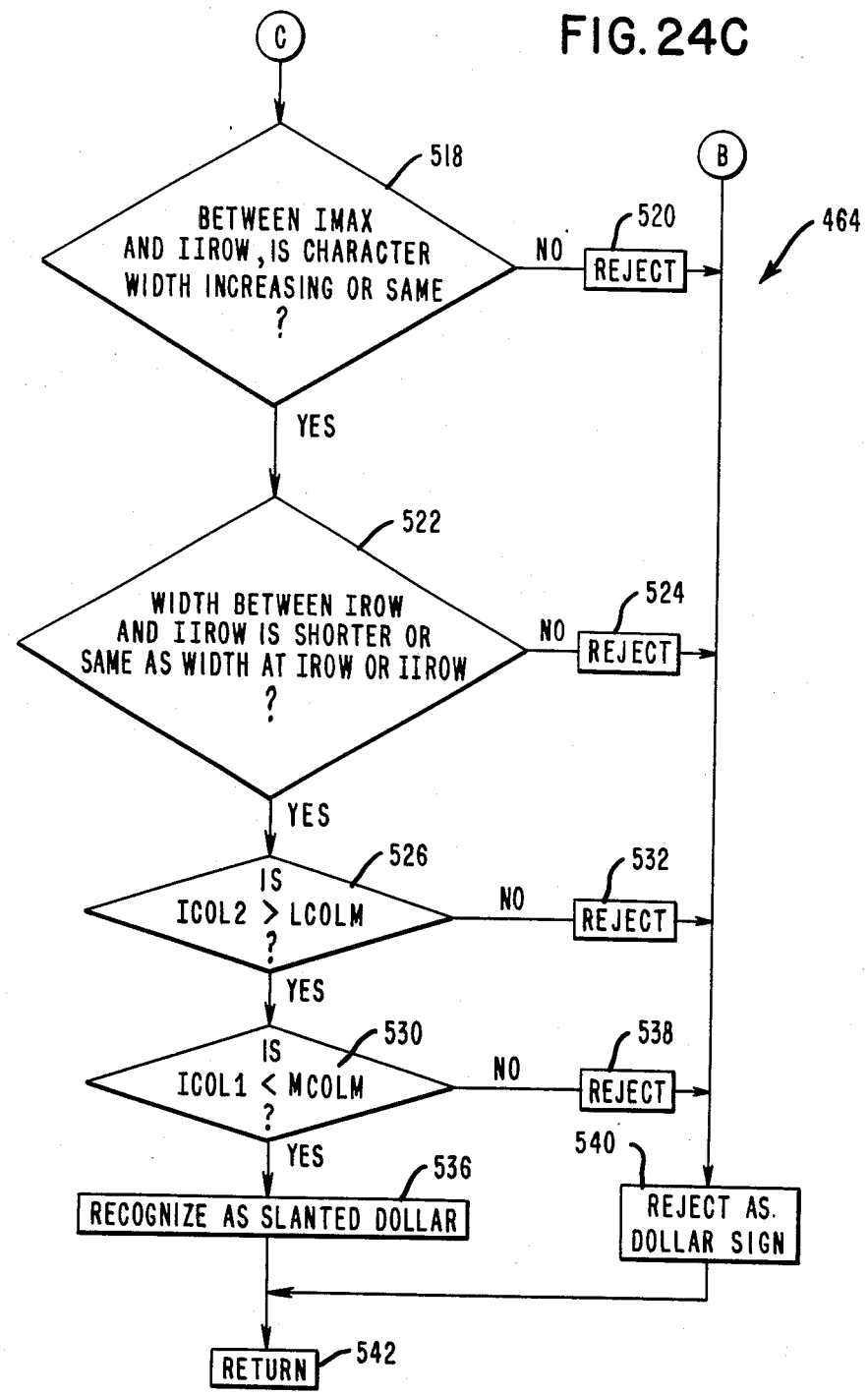

FIGS. 24A, 24B, and 24C are flow charts representing portions of the SLAND routine designated generally as 464. The first step 466 in the SLAND routine 466 is one of preliminary initialization. Basically, step 466 relates to obtaining the parameters of an input character 158, and reference should be made in this regard to the slanted dollar sign 254 shown in FIG. 18. Before discussing the routine 466, it appears appropriate to review these parameters:

IMIN equals the top-most row of the input character 158 which row contains at least one black pixel;

IMAX equals the bottom-most row of the input character 158 which row contains at least one black pixel;

JMIN equals the left-most column of the input character 158 which column contains at least one black pixel;

JMAX equals the right-most column of the input character 158 which column contains at least one black pixel;

ICOL1 equals the column position where the reverse curve C2 (FIG. 18) starts; and ICOL2 equals the column position where the reverse curve C1 starts.

Additional definitions will be made as the discussion of the SLAND routine 464 proceeds. It should be recalled that the IMIN, IMAX, etc. values are obtained once for each input character 158 and are stored in a buffer in the RAM 138 in the amount finding processor 132 (FIG. 5) from which they are accessed when needed for the various routines discussed herein.

After the parameters of the input character 158 are obtained in step 466 (FIG. 24A), the SLAND routine 464 proceeds to step 468 in which the number of black pixels in the IMIN row (FIG. 18) is determined. For example, at step 468, the coordinates for the column positions of the first and last black pixels in the IMIN row are determined when proceeding from a left-to-right direction, as viewed in FIG. 18, in the embodiment described. For example, the first white-to-black transition in the IMIN row is associated with black pixel 372 and the last black-to-white transition is associated with the black pixel 374. The difference between the coordinates of the black pixels 372 and 374 provides the number of black pixels in the IMIN row. The coordinates associated with black pixels 372 and 374 are also marked as ILFT1 and B1, respectively, in FIG. 18; these coordinates are utilized in certain evaluations to be described later herein.

The number of black pixels in the IMIN row in evaluated at step 470 in FIG. 24A. If the number of black pixels in the IMIN row is greater than five, the input character 158 is rejected at step 472 as not being a slanted dollar sign 454. The figure "five" used in step 470 was determined from experience for the particular embodiment described.

If the number of black pixels in the IMIN row for an input character 158 is five or fewer at evaluation step 470 (FIG. 24A), the SLAND routine 464 proceeds to step 474. At step 474, the coordinates of the ILFT1 and B1 columns (referred to in step 468) are determined and retained for use in evaluations to be later described herein. From step 474, the number of black pixels located in the IMAX row is determined at step 476 by the techniques just described in association with step 468.

If the number of black pixels in the IMAX row for an input character 158 is greater than five at evaluation step 478 (FIG. 24A), the SLAND routine 464 proceeds to reject step 480; this means that the input character 158 is rejected as not being a slanted dollar sign 254 (FIG. 18). The figure "five" used in step 478 was determined from experience for the particular embodiment described.

If the number of black pixels in the IMAX row for an input character 158 is five or fewer at evaluation step 478 (FIG. 24A), the SLAND routine 464 proceeds to step 482. At step 482, the coordinates of the first and last black pixels 376 and 378 in the IMAX row are determined as previously described in association with step 474, and the coordinates of these pixels are marked as B2 and IRIT2, respectively in FIG. 18. From step 482, the SLAND routine 464 proceeds to step 484 in FIG. 24B.

At step 484 (FIG. 24B), the curves C1 and C2 shown in FIG. 18 are determined by a technique which is referred to as "successive edge position count". This technique is one which starts out at the IMIN row and works down towards the bottom of the input character (as viewed in FIG. 18) as follows. The first white-to-black transition encountered in the IMIN row involves black pixel 372 as previously explained. The first white-to-black transition encountered in the row below the IMIN row involves the black pixel 486; and similarly, the first white-to-black transition encountered in the next, lower row involves black pixel 488. This technique of examining the first white-to-black transition in the next row continues as long as black pixels are found closer to the JMIN value. Eventually, a situation is reached in which the black pixels like pixels 490, 492 and 494 do not progress to the left and may be aligned in a vertical row as shown. The curve C1 is thus determined by the black pixels extending from black pixel 372 to black pixel 490, and these two black pixels represent the limits of curve C1. The technique employed for finding curve C2 in FIG. 18 is exactly the same as that employed for finding curve C1 except the technique begins at the bottom or IMAX row for an input character and progresses upwardly (as viewed in FIG. 18) and towards the right or JMAX value for the input character. In this regard, the curve C2 is thus determined by the black pixels extending from black pixel 378 to black pixel 496, with these two black pixels representing the limits of curve C2.

From step 484, the SLAND routine 464 proceeds to step 498 in FIG. 24B. At step 498, two terms "IDIFF" and "JDIFF" are determined. The term IDIFF represents the column difference between the black pixels 372 and 490 already discussed in relation to curve C1. Similarly, the term JDIFF represents the column difference between the black pixels 378 and 496 already discussed in relation to curve C2. The IDIFF and JDIFF values obtained in step 498 are evaluated at step 500 according to the following criteria. If the absolute value of IDIFF minus JDIFF is greater than four, the routine 464 exits at step 502; this means that the suspected slanted dollar sign is not a slanted dollar sign and a new input character 158 is then examined as previously described. The value of four utilized in step 500 is determined from experience for the embodiment described.

If the absolute value of IDIFF minus JDIFF is less than four, the SLAND routine 464 (FIG. 24B) proceeds to step 504. At step 504, two values, namely ICOL1 and ICOL2 are determined. The term ICOL1 is shown in FIG. 18 and it represents the vertical line or column position at which the curve C2 stops "growing" or extending towards the column represented by JMAX, and it includes the black pixel 496. Similarly, the term ICOL2 represents the column position at which the curve C1 stops extending towards the column represented by JMIN, and includes the black pixels 490, 492, and 494. At step 506, an evaluation is made between ILFT1 and ICOL1. The term ILFT1 (FIG. 18) refers to the first black pixel 372 encountered in the IMIN row. If ILFT1 is less than ICOL1, the routine 464 exits at step 508. In effect, what is being considered here is evident from FIG. 18; i.e., in order to have a slanted dollar sign, the column containing black pixel 372 must be closer to the right or JMAX column than the column containing the black pixel 496. If ILFT1 is greater than ICOL1, it means that the suspected input character could be a slanted dollar sign like 254, and additional evaluations are subsequently made in order to further evaluate it.

From step 506 (FIG. 24B), the SLAND routine 464 proceeds to step 510 where the terms IRIT2 and ICOL2, shown in FIG. 18, are compared. The term IRIT2 represents the right-most, black pixel 378 on IMAX and ICOL2 represents the column including black pixels 490, 492, and 494. If IRIT2 is greater than ICOL2 at step 510, the routine 464 exits at step 512 because the suspected input character is not a slanted dollar sign like 254. If IRIT2 is less than ICOL2, it means that IRIT2 is closer to JMIN (FIG. 18) which means that the input character is like 254, and the routine proceeds to step 514 for further evaluation.

At step 514 in the SLAND routine 464 (FIG. 24B), the terms IMIN and IROW (shown in FIG. 18) are evaluated. The term IROW represents the row position (proceeding from IMIN towards IMAX) at which the curve C1 stops increasing; as stated previously, this is represented by the column including black pixel 490. Another way of defining IROW is that it is the row position where the curve C1 starts to reverse its direction. The term IROW represents the row position including black pixel 490. At step 514, the character width between IMIN and IROW is evaluated. If the character width for the top half of the input character as shown by curve C1, for example, is not increasing, the routine 464 exits at step 516 because this means it is not a slanted dollar sign like 254. If at step 514, the character width is increasing or the same, the input character may be a slanted dollar sign like 254. To review, the term "character width increasing" means that when proceeding from IMIN towards IMAX, the first black pixels encountered in subsequent rows get closer to JMIN, as shown by the trend of curve C1. From step 514 in FIG. 24B, the routine 464 proceeds to step 518 in FIG. 24C.

Step 518 in FIG. 24C is analogous to step 514 (FIG. 24B) except that it applies to the bottom half of the input character like the slanted dollar sign 254 shown in FIG. 18. At step 518, the IMAX and IIROW terms are evaluated. The term IIROW is a row position at which the curve C2 no longer increases. If the input character width is not increasing at step 518, the input character is not a slanted dollar sign like 254, and accordingly, the routine 464 rejects the input character at step 520. If the width of the input character increases or stays the same between IMAX and IIROW, the routine 464 proceeds to step 522 for further evaluation as it may be a slanted dollar sign. At step 522, the width of that portion of the input character between the rows IROW and IIROW is compared with the width of the input character along the row IROW and along the row IIROW. If the width of the input character between rows IROW and IIROW is greater than the width along the rows IROW and IIROW, the input character is rejected at step 524 because it is not a slanted dollar sign. If the width of the input character as measured between the rows IROW and IIROW is equal to or less than the width of the input character along the rows IROW or IIROW, the input character may be a slanted dollar sign, and the routine 464 proceeds to step 526 for further evaluation.

At step 526 (FIG. 24C), the SLAND routine 464 evaluates the ICOL2 and LCOLM values shown with regard to the slanted dollar sign 252 shown in FIG. 18. The term LCOLM is defined as the minimum column (the one closest to JMIN) which includes a black pixel, like pixel 528 which is included in the IIROW. At step 426, if ICOL2 (FIG. 18) is greater than LCOLM (when compared to JMIN), then the input character could be a slanted dollar sign like 254, and the routine 464 proceeds to step 530. If ICOL2 is less than LCOLM, the configuration is such to preclude its being a slanted dollar sign, and accordingly, the input character is rejected at step 532.

With regard to step 530 of the SLAND routine 464 shown in FIG. 24C, the term MCOLM used therein is defined as the maximum column position (towards JMAX) of the row (FIG. 18) where the reverse bend of curve C1 starts. Stated another way, it would be the column closest to JMAX which includes a black pixel like 534 which is included in the IROW which includes the black pixel 490. If ICOL1 (FIG. 18) is less than MCOLM, it means that the input character 158 is recognized as a slanted dollar sign like 254 at step 536. If ICOL1 is not less than MCOLM, the input character is rejected at step 538. From the various reject steps like 520, 524, and 538, the input character is rejected as a slanted dollar sign at step 540. When an input character 158 is recognized as a slanted dollar sign at step 536, the routine 464 returns to the processing mentioned earlier herein via a return step 542. It should be pointed out that all the various evaluations made at steps like steps 470 and 478 in FIG. 24A, like steps 500, 506, 510 and 514 in FIG. 24B, and like steps 518, 522, 526, and 530 in FIG. 24C must be favorable in order to have an input character 158 being recognized as a slanted dollar sign like 254 in FIG. 18. Once recognized, the slanted dollar sign 254 is used to access the associated matrix of pixel data which includes the monetary amount.

Figure 15A:
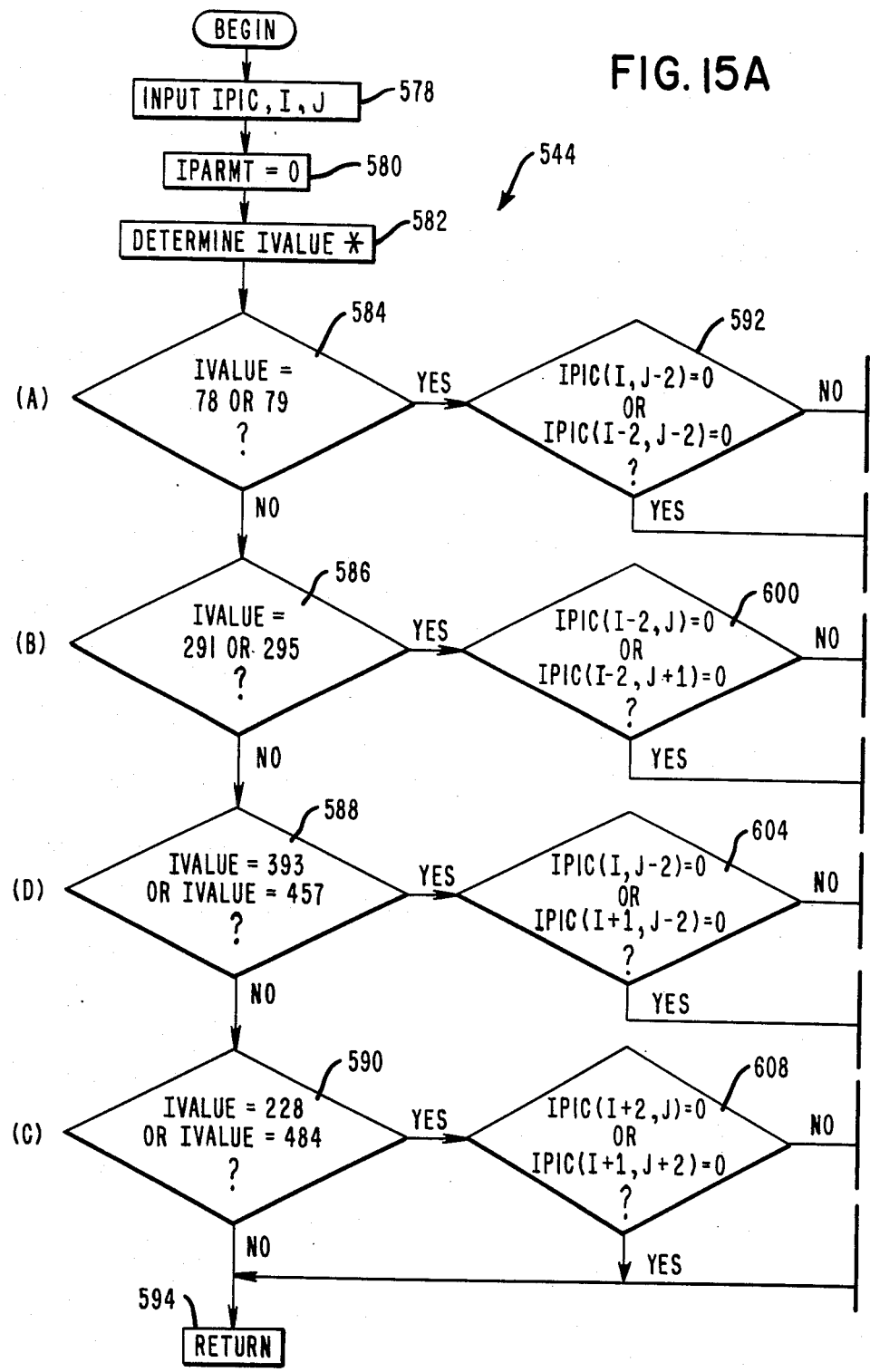
FIG. 15A and FIG. 15B taken together represent a flow diagram showing the various steps in the process for determining an asterisk with hole which is part of the "recognition process for asterisk" shown in FIG. 7A.
Figure 15B:
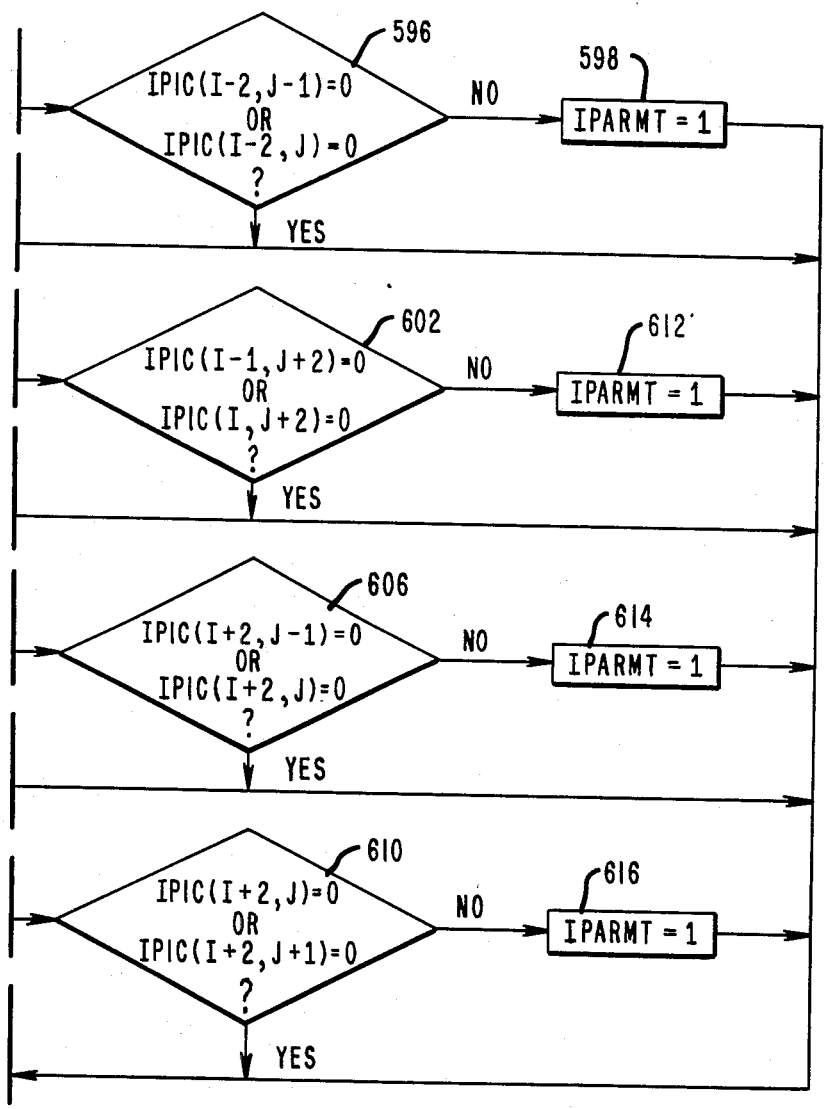

The routine 166-2, associated with an "asterisk with hole" and alluded to earlier herein with regard to FIGS. 7A and 11, includes a subroutine shown in more detail in FIGS. 15A and 15B; this subroutine is referred to as subroutine IHOLE and is designated generally as 544. The subroutine 544 essentially determines whether or not a hole exists at the center of an input character 158. In the embodiment described, a $3 \times 3$ pixel window is evaluated, with a white pixel representing a binary zero and a black pixel representing a binary one as previously described. However, before discussing subroutine 544, it appears beneficial to discuss certain situations which exist with regard to the $3 \times 3$ window frame.

Figure 25:
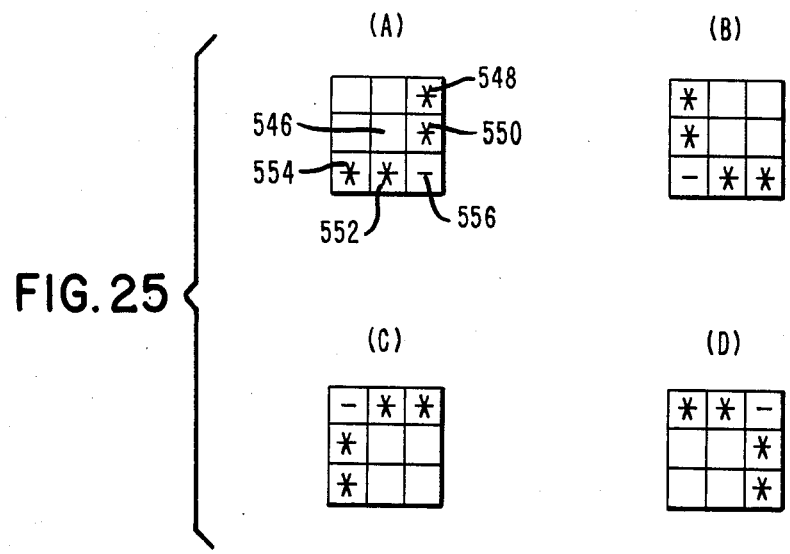
FIG. 25 is a representation of different pixel situations presented when examining for a "hole" in an input character.
Figure 26:
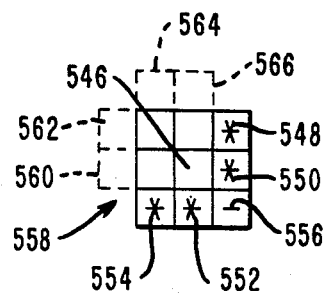
FIG. 26 is a representation of the pixel situation (A) shown in FIG. 25 which is used to show examination areas.

In this regard, FIG. 25 shows a collection of situations designated as A, B, C, and D, in which each situation represents a $3 \times 3$ window frame with the center pixel in each situation being a white pixel. For example, in FIG. 25(A), the center pixel 546 is a white pixel and black pixels exist at 548, 550, 552, and 554. Notice that each one of the situations A, B, C, and D in FIG. 25 represents a potential "corner" of a hole. The dash 556 means that the pixel located thereat could be white or black. FIG. 26 shows a window frame 558 which is identical to the window frame shown in FIG. 25(A) except the window frame 558 shows the areas where the pixels will be evaluated further to determine whether or not a hole exists with regard to the center pixel 546; these areas where the pixels are evaluated are shown as squares (in dashed outline) and are numbered as squares 560, 562, 564, and 566. In other words, if black pixels exist in squares 560, 562, 564, and 566, a hole is present, and if white pixels exist in these squares, a hole does not exist with regard to the center pixel 546.

The situations designated as A, B, C, and D in FIG. 25 represent certain situations associated with subroutine 544 (FIGS. 15A and 15B); however, before discussing the subroutine, it appears appropriate to discuss how certain values used in the subroutine 544 are obtained. Basically, these values, termed IVALUE in FIG. 15A, are obtained by assigning values to black pixel locations within the $3 \times 3$ window frame mentioned.

Figure 27:
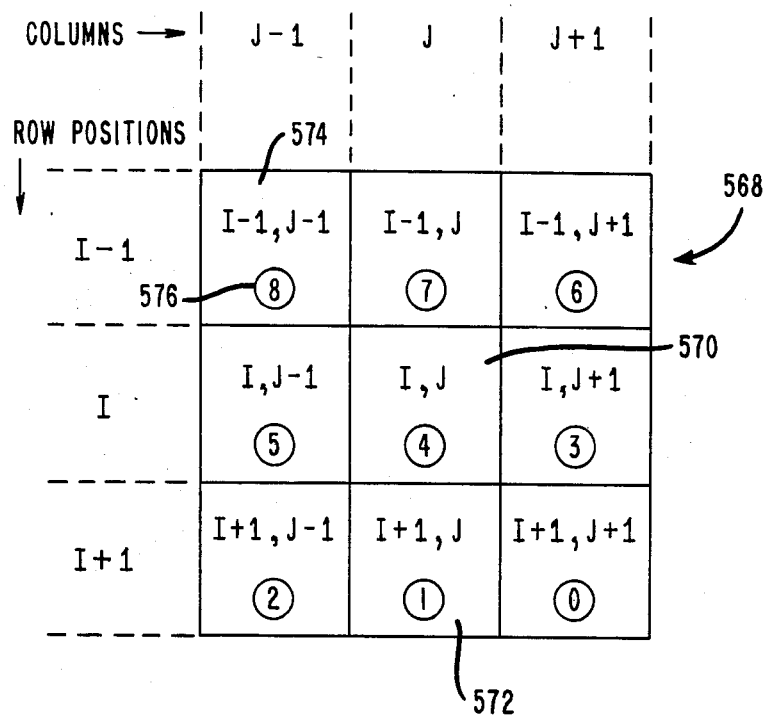
FIG. 27 is a diagrammatic view showing the assignment of values to different pixel arrangements within an examining frame.

The term IVALUE is determined in conjunction with window frame 568 shown in FIG. 27. Any central pixel like 546 in FIG. 25(A), for example, which is under consideration, is designated as IPIC and its location coordinates are designated as "J" for its column position and "I" for its row position as shown in FIG. 27. In other words, the center pixel is located in the square designated 570 in FIG. 27 and it has its column location designated as "J" and its row location designated as "I." The column to the right of the "J" column is designated as "J+1," and the column to the left of the "J" column is designated "J−1." Correspondingly, rows above and below the "I" row are designated as "I−1" and "I+1," respectively. Naturally, different designations could be utilized depending upon how the data is stored and processed; however, the principle of operation employed remains the same. With a 3×3 matrix window frame 568, it is possible to have a total of 512 combinations of black and white pixels. In order to identify each one of these combinations, nine bits of binary data are required. The identification of combinations is effected by assigning a binary weight to each of the squares within the frame 568. For example, square 572 is assigned a binary weight of one, square 570 is assigned a binary weight of four, and square 574 is assigned a binary weight of eight, with the binary weights being enclosed in a circle like circle 576 for binary eight within the square 574.

Having defined the coordinates "J" and "I" for the squares within a window frame 568 shown in FIG. 27, and having binary weights assigned to each of the squares within the frame 568, the value of a specific combination of black and white pixels within the frame 568 is given by the following formula:

$$\begin{aligned}\text{IVALUE} = &\ \text{IPIC}(I-1,J-1)*2**8 + \text{IPIC}(I-1,J)*2**7 \\ &+ \text{IPIC}(I-1,J+1)*2**6 + \text{IPIC}(I,J-1)*2**5 \\ &+ \text{IPIC}(I,J)*2**4 + \text{IPIC}(I,J+1)*2**3 \\ &+ \text{IPIC}(I+1,J-1)*2**2 + \text{IPIC}(I+1,J)*2 \\ &+ \text{IPIC}(I+1,J+1).\end{aligned}$$

For example, if the only black pixel which existed in the frame 568 were located in the square 572 in FIG. 27, the IVALUE for that frame would be equal to 2 because square 572 (which contains the black pixel) is assigned a binary weight of one. Similarly, the IVALUE for the situation shown in FIG. 25(A) is equal to 78. If a black pixel were present in the square in which dash 556 is located, the IVALUE for FIG. 25(A) would be 79. Having discussed the various binary weights assigned to pixels in the examining window frame 568 (FIG. 27) and how the various IVALUE's were determined, it now seems appropriate to discuss the subroutine 544 shown in FIGS. 15A and 15B.

The first step 578 in subroutine 544 (FIG. 15A) relates to inputting a discrete input character 158. The pixel under examination in a window frame 180 is equal to IPIC, and the I and J values relate to the row and column values, respectively, of the center of the window frame 180. After the input character 158 is inputted, a flag, IPARMT, is set equal to zero in step 580. If a "hole" is found in an input character 158 by the operations to be described, this flag IPARMT is set to a "one." The term IPARMT refers to the parameters of the pixels outside the 3×3 window.

The next step 582 in the routine 544 (FIG. 15A) is to determine the IVALUE of the pixels within a window frame like 180 shown in FIG. 6. The IVALUE is calculated for the pixels within a window frame 180, and then the window frame is moved to include a new group of pixels. In the embodiment described, the window frame 180 starts at the top left side of an input character 158 and progresses (a column at a time) towards the right side of the image data (as viewed in FIG. 6) and thereafter, the frame 180 is moved down one row, returned to the left side (FIG. 6) and progresses again, toward the right side of the image data. The IVALUE is calculated, as previously described, each time the window frame 180 is moved. The IVALUE, which is determined for each window frame 180, is evaluated at the steps marked 584, 586, 588, and 590. Any IVALUE less than 78 is disregarded because the associated window frame 180 does not contain a sufficient number of black pixels to define a hole. Notice that in steps 584, 586, 588, and 590 specific values are being looked for; these values represent the specific situations A, B, D, and C, respectively, shown in FIG. 25. These situations A, B, C, and D represent "corners" of black pixels which provide a clue to locating a hole within the input character 158 as discussed previously in relation to FIG. 26.

If an IVALUE of 78 or 79 is found at step 584, the subroutine 544 proceeds to step 592 (FIG. 15A) for additional evaluations. At step 592, the equation IPIC(I,J−2)=0 is evaluated; this evaluation relates to the pixel located in the dashed square 560 in FIG. 26, with the I and J designations being discussed earlier in relation to FIG. 27. A second evaluation at step 592 relates to the equation IPIC(I−1,J−2)=0; this evaluation relates to the pixel located in the dashed square 562 in FIG. 26. If an evaluation of either of these equations at step 592 produces a "yes" response, the subroutine 544 proceeds to return step 594. If a "no" response is obtained at step 592, it means that a black pixel is found in the dashed square 560 or 562 in FIG. 26. Accordingly, the subroutine 544 proceeds to step 596 (FIG. 15B) at which the following evaluations are made. At step 596, the equation IPIC(I−2,J−1)=0 is evaluated; this evaluation relates to the pixel located in the dashed square 564 in FIG. 26, with the I and J designations being discussed previously in relation to FIG. 27. A second evaluation at step 596 relates to the equation IPIC(I−2,J)=0; this evaluation relates to the pixel located in the dashed square 566 in FIG. 26. If an evaluation of either of these equations used in step 596 produces a "yes" response, it means that white pixels are present and no hole exists in the input character 158, and the subroutine 544 exists to return step 594. If a "no" response is obtained at step 596, it means that a black pixel is present in dashed square 564 or 566 in FIG. 26. Because black pixels were found to exist at steps 592 and 596, in the example described, it means that a hole exists, and therefore the flag IPARMT is set to a binary one at step 598, indicating that a hole is present. From step 598, the input character 158 is recognized as an asterisk with hole, and the subroutine 544 returns the processing to step 168 in FIG. 7A or step 242 in FIG. 11 where processing is continued as previously described. The equations within the evaluation steps 600 and 602 relate to examining the pixels outside of the 3×3 matrix shown by situation B in FIG. 25 in the same manner as that already described in relation to FIGS. 25A and 26. Similarly, the equations within the evaluation steps 604 and 606 (FIGS. 15A and 15B) relate to examining the pixels outside the 3×3 matrix shown by situation D in FIG. 25, and the equations within the evaluation steps 608 and 610 are similarly associated with situation C shown in FIG. 25. When black pixels are found at steps 602, 606, and 610, the flag IPARMT is set equal to a binary one at steps 612, 614, and 616, respectively, which are analogous to step 598.

After an asterisk or a dollar sign is recognized by the process 150 shown in FIG. 19, it means that the image data associated with the courtesy amount 52 (FIG. 32) is nearby as previously explained. This image data associated with the courtesy amount 52 is forwarded from the amount finding processor 132 (FIG. 5) via its interface 148 to the recognition processor 134 via its associated interface 618. The recognition processor 134 is conventional, is operated conventionally, and has a ROM 620, RAM 622, microprocessor (MP) 624, interface 626 and interface and control logic 628 to interconnect the various elements shown. The function of the recognition processor 134 is to receive the image data for the courtesy amount 52 and employ conventional recognition techniques to recognize the courtesy amount 52 and to provide a confidence level for each of the characters read as discussed in relation to the CAR module 19 shown in FIGS. 1 and 2A. The functions of the recognition processor 134 are not part of this invention, and consequently, they need not be discussed in any further detail.

This application also includes an appendix in which detail program listings are found relative to various operations associated with this invention. The source codes are written in Fortran language and can be run on a PDP 1160 processor, with this processor being currently available from Digital Equipment Corporation in the U.S.A.

The following Chart #1 correlates various steps in the figures in this application with a page of the appendix. The pages of the appendix will be designated as page A1, A2, etc.

CHART #1

| OPERATION | SUB-ROUTINE | APPENDIX PAGE | RELATED FIGS. & STEPS |
|---|---|---|---|
| 1. Main routine that calls other subroutines. | — | A1–A3 | FIG. 7A, Steps 154, 156 |
| 2. General Operation (Applicable to any dollar sign or asterisk recognition) | | | |
| (a) Cleaning or smoothing operation | ICLEAN | A18 | FIG. 7A, Step 160 |
| (b) 3 × 3 Pixel orientation | ITERM2 INIT2 | A16, A17 | FIG. 8, 9 |
| (c) Maximum row row or column determination | IRANGE | A24 | FIG. 7A Steps 162–164 |
| 3. Recognition of Asterisks | | | |
| (a) Regular asterisk | ASTRK | A19–A24 | FIG. 11 Steps 166-1, 234 |
| (b) Asterisk with hole | IHOLE ASTRK | A25 | FIG. 11, Steps 166-2, 234 |
| (c) Special asterisk | SPEST | A26–A30 | FIG. 11, Step 246 |
| 4. Recognition of dollar signs | | | |
| (a) Check machine printed eight | CHKMET | A4–A6 | FIG. 16 |
| (b) Recognition straight dollar sign | DOLLAR | A7–A11 | FIG. 21 |
| (c) Recognition slanted dollar sign | SLAND | A12–A15 | FIGS. 24A, 24B, 24C |

```
      IMPLICIT INTEGER*2 (A-Z)
      INCLUDE 'LB:[1,1]DBDEF.IN.FTN/NOLIST'
C
C
C     THIS FILE WILL RETRIVE THE IMAGE FROM THE
C     STORED FILE AND CALLS SUBROUTINE ASTRK TO
C     RECOGNIZE AN ASTERIK OR A DOLLAR SIGN
C
C
C     DATA ARA AND DEFINITIONS
C
      INTEGER*2 IHEAD(40),IREC(5),IBITS(16)
      BYTE IPIC(50,50),SRCFL(30),LSRCFL(30)
      DATA IBITS/128,64,32,16,8,4,2,1,"100000,16384,8192,4096,
     3           2048,1024,512,256/
C
C     INITIALIZE LOGICAL UNIT
C
      SRCLUN=4
      INLUN=5
      OUTLUN=7
C
C     GET FILE SPECIFICATION FOR READ AND WRITE
C
5     WRITE(OUTLUN,105)
105   FORMAT($,' ENTER FILE SPEC OF FIRST DATA FILE  ')
      READ (INLUN,115) C1,SRCFL
      IF(C1.LT.30)SRCFL(C1+1)=0
      IF(C1.EQ.0)GO TO 5
      WRITE(OUTLUN,106)
106   FORMAT($,' ENTER FILE SPEC OF LAST DATA FILE  ')
      READ(INLUN,115)C2,LSRCFL
115   FORMAT(Q,30A)
```

```
            IF(Q2.GT.0)GO TO 117
            DO 116 I=1,Q1
              LSRCFL(I)=SRCFL(I)
116         CONTINUE
            Q2=Q1
117         IF(Q2.LT.30)LSRCFL(Q2+1)=0
C
C------------------------------------------------------------
C   OPEN DATA FILE
C
120         OPEN (UNIT=SRCLUN,NAME=SRCFL,TYPE='OLD',ERR=135,
     2          ACCESS='SEQUENTIAL',FORM='UNFORMATTED',
     3          SHARED,READONLY)
C
            READ (SRCLUN)IHEAD
            GO TO 155
135         WRITE(OUTLUN,145)SRCFL
145         FORMAT(1X,' OPEN ERROR ON FILE ',30A)
            GO TO 310
C
C   CLEAR THE BUFFER
C
155         DO 158 I=1,50
              DO 157 J=1,50
                IPIC(I,J)=0
157         CONTINUE
158         CONTINUE
C
C   LOAD DATA INTO BUFFER
C
            DO 10 J=IHEAD(FZNSL),1,-1
              READ (SRCLUN)(IREC(K),K=1,IHEAD(FZDRL)/2)
            IF(IHEAD(FZBPP).EQ.1)GO TO 175
            WRITE(OUTLUN,165) IHEAD(FZBPP)
165         FORMAT(1X,'UNSUPPORTED BITS PER PIXEL= 'I3)
            CLOSE(UNIT=SRCLUN)
            GO TO 1000
C------------------------------------------------------------
C
C   UNPACK BINARY DATA
C
175         I=1
            DO 30 I2=1,IHEAD(FZDRL)/2
              DO 20 I3=1,16
                NBITS=IREC(I2).AND. IBITS(I3)
                IF(NBITS.NE.0)IPIC(I,J)=1
                I=I+1
20            CONTINUE
30          CONTINUE
10          CONTINUE
C
            CLOSE(UNIT=SRCLUN)
C
C------------------------------------------------------------
C   FIND MIN. AND MAXIMUM ROW AND COLUMNS
C
            IMIN=500
            JMIN=500
            IMAX=0
            JMAX=0
C
            DO 50 I=1,IHEAD(FZPSL)
              DO 40 J=1,IHEAD(FZNSL)
                IF(IPIC(I,J).EQ.0)GO TO 40
                IF(I.LT.IMIN)IMIN=I
```

```
               IF(J.LT.JMIN)JMIN=J
               IF(I.GT.IMAX)IMAX=I
               IF(J.GT.JMAX)JMAX=J
40         CONTINUE
50      CONTINUE
C
C    STORE DATA FROM MIN-1 TO MAX+1
C
        NROWS=0
        DO 90 I=IMIN-1,IMAX+1
        NROWS=NROWS+1
        NCOLS=0
C
        DO 80 J=JMIN-1,JMAX+1
        NCOLS=NCOLS+1
        IPIC(NROWS,NCOLS)=IPIC(I,J)
80      CONTINUE
90      CONTINUE
C
C
        WRITE(1,999)
999     FORMAT(5X,//)
C
C    CHECK IF THE LAST DATA FILE HASBEEN PROCESSED
C
310     J=0
        DO 315 I=1,30
           IF(SRCFL(I).NE.LSRCFL(I))J=1
315     CONTINUE
           IF(J.EQ.0)GO TO 1000
           CALL NXTNAM(SRCFL)
           GO TO 100

1000    CONTINUE
C
        STOP
        END
C----------------------------------------------------------------
C
        SUBROUTINE NXTNAM(NAM)
        BYTE NAM(20)
C
C    SEARCH FOR SEPARATOR BETWEEN NAME AND EXTENSION
C
        DO 10 I=1,20
           IF(NAM(I).EQ.0)GO TO 30
           IF(NAM(I).EQ.46)GO TO 20
10      CONTINUE
C
C    UPDATE NUMERIC PORTION OF THE NAME
C
20      I=I-1
           IF(NAM(I).LT.48 .OR. NAM(I).GT.57)GO TO 30
           NAM(I)=NAM(I)+1
           IF(NAM(I).EQ.58)NAM(I)=48
           IF(NAM(I).EQ.48)GO TO 20
30      RETURN
        END
        SUBROUTINE CHKMET(IPIC,NROWS,NCOLS,IFEATR,IFLAG)
        BYTE IPIC(50,50),IFFATR(10),ITOP(20),IBOT(20),ILFT(20),IRIT(20)
C----------------------------------------------------------------
C    THIS SUBROUTINE WILL SMOOTH OUT THE ORIGINAL CHARACTER AND
C    WILL CHECK FOR A PRINTED EIGHT. IF THE CURENT CHARACTER
C    IS IDENTIFIED AS AN EIGHT THIS SUBROUTINE WILL EXIT OTHERWISE
C    THIS SUBROUTINE WILL CALL SUBROUTINE 'DOLLAR' TO CHECK FOR
```

```
C     STRAIGHT DOLLAR SIGN. IF THE TEST FOR STRAIGHT DOLLAR SIGN FAILS
C     THE SUBROUTINE DOLLAR WILL CALL SUBROUTINE SLAND TO TEST FOR SLANTED
C     DOLLAR SIGNS
C
C     SUBROUTINE FUNCTION
C
C        SUBROUTINE DOLLAR
C                             WILL TRY TO RECOGNIZE AN OPEN DOLLAR SIGN
C
C        SUBROUTINE SLAND
C                             WILL TRY TO RECOGNIZE A SLANTED DOLLAR SIGNS
C
          DO 10 I=1,20
             ITOP(I)=0
             IBOT(I)=0
             ILFT(I)=0
             IRIT(I)=0
10        CONTINUE
C  RETRIVE THE MINIMUM AND MAXIMUM ROWS AND COLUMNS OF THE EDGES
C
          IMIN=IFEATR(1)
          IMAX=IFEATR(2)
          JMIN=IFEATR(3)
          JMAX=IFEATR(4)
          J12=IFEATR(5)
          I12=IFEATR(6)
          J14=IFEATR(7)
          I14=IFEATR(8)
          J34=IFEATR(9)
          I34=IFEATR(10)
          HIT=(IMAX-IMIN+1)*1.0
          WIDT=(JMAX-JMIN+1)*1.0
          RATIO=WIDT/HIT
          IF(RATIO.GT.1)GO TO 1260
          IF(IFLAG.EQ.0)GO TO 1250
C     CHECK FOR A PRINTED 8 LIKE STRUCTURE
C
          INUM=0
          DO 200 I=IMIN,IMAX
          NUMTRN=0
             DO 150 J=1,NCOLS-1
                IF(IPIC(I,J).EQ.0 .AND. IPIC(I,J+1).NE.0)NUMTRN=NUMTRN+1
                IF(NUMTRN.EQ.0)GO TO 150
                IF(IPIC(I,J).EQ.0 .AND. IPIC(I,J+1).NE.0)ILFT(NUMTRN)=J+1
                IF(IPIC(I,J).NE.0 .AND. IPIC(I,J+1).EQ.0)IRIT(NUMTRN)=J
150          CONTINUE
C
             IF(NUMTRN.NE.2)GO TO 200
             IF((ILFT(2)-IRIT(1)).GE.3)INUM=INUM+1
200       CONTINUE
C
          IHALF=(IMAX-IMIN+1)/2
          IF(INUM.GE.IHALF)GO TO 300
          GO TO 1150
C
300       DO 400 J=JMIN,JMIN+4
          NUM=0
             DO 350 I=1,NROWS-1
                IF(IPIC(I,J).EQ.0 .AND. IPIC(I+1,J).NE.0)NUM=NUM+1
                IF(NUM.EQ.0)GO TO 350
                IF(IPIC(I,J).EQ.0 .AND. IPIC(I+1,J).NE.0)ITOP(NUM)=I+1
                IF(IPIC(I,J).NE.0 .AND. IPIC(I+1,J).EQ.0)IBOT(NUM)=I
350          CONTINUE
C
             IF(NUM.GE.2)GO TO 420
400       CONTINUE
          GO TO 1262
```

```
C
420     JJ=J
        IBEG=IBOT(NUM-1)
        IEND=ITOP(NUM)
C
        DO 600 L=IBEG+1,IEND-1
        NUM=0
           DO 500 M=1,JJ+4
              IF(IPIC(L,M).NE.0)NUM=NUM+1
500        CONTINUE
         IF(NUM.EQ.0)GO TO 650
600     CONTINUE
        GO TO 1264
C
C     CHECK THE RIGHT TOP EDGE OF THE CHARACTER
C
650     DO 800 J=JMAX,JMAX-4,-1
        NUMTRN=0
           DO 750 I=1,NROWS-1
             IF(IPIC(I,J).EQ.0 .AND. IPIC(I+1,J).NE.0)NUMTRN=NUMTRN+1
             IF(NUMTRN.EQ.0)GO TO 750
             IF(IPIC(I,J).EQ.0 .AND. IPIC(I+1,J).NE.0)ITOP(NUMTRN)=I+1
             IF(IPIC(I,J).NE.0 .AND. IPIC(I+1,J).EQ.0)IBOT(NUMTRN)=I
750        CONTINUE
           IF(NUMTRN.GE.2)GO TO 820
800     CONTINUE
        GO TO 1266
C
820     ISTART=IBOT(1)
        IIEND=ITOP(2)
        JSTART=J
C     CHECK FOR WHITE PIXELS
C
        DO 1000 L=ISTART+1,IIEND-1
        NUM=0
           DO 900 M=JSTART-4,NCOLS
             IF(IPIC(L,M).NE.0)NUM=NUM+1
900        CONTINUE
         IF(NUM.EQ.0)GO TO 1150
1000    CONTINUE
        GO TO 1268
C     CALL SUBROUTINE DOLLAR TO CHECK FOR STRAIGHT DOLLAR SIGN
C
1150    CALL DOLLAR(IPIC,NROWS,NCOLS,IFEATR)
        GO TO 1300
C
C     CHECK SUBROUTINE SLANT TO CHECK FOR SLANTED DOLLAR SIGN
C
1250    CALL SLANT(IPIC,NROWS,NCOLS,IFEATR)
        GO TO 1300
1260    WRITE(1,1261)
1261    FORMAT(5X,'ERROR...1')
        GO TO 1300
1262    WRITE(1,1263)
1263    FORMAT(5X,'ERROR...2')
        GO TO 1300
1264    WRITE(1,1265)
1265    FORMAT(5X,'ERROR...3')
        GO TO 1300
1266    WRITE(1,1267)
1267    FORMAT(5X,'ERROR...4')
        GO TO 1300
1268    WRITE(1,1269)
1269    FORMAT(5X,'ERROR...5')
1300    RETURN
        END
```

```
      SUBROUTINE DOLLAR(IPIC,NROWS,NCOLS,IFEATR)
      BYTE IPIC(50,50),ITOP(10),IBOT(10),ILFT(20),IRIT(20),IFEATR(10)
      LOGICAL ICHECK
C
C     THIS SUBROUTINE IDENTIFIES THE STRAIGHT DOLLAR SIGN (NOT SLANTED)
C
C     INITIALIZE THE PARAMETERS
C
      DO 10 I=1,10
         ITOP(I)=0
         IBOT(I)=0
10    CONTINUE
C
      DO 15 I=1,20
         ILFT(I)=0
         IRIT(I)=0
15    CONTINUE
C
      IMIN=IFEATR(1)
      IMAX=IFEATR(2)
      JMIN=IFEATR(3)
      JMAX=IFEATR(4)
      J12=IFEATR(5)
      I12=IFEATR(6)
      J14=IFEATR(7)
      I14=IFEATR(8)
      J34=IFEATR(9)
      I34=IFEATR(10)
C     CHECK FOR THE BOTTOM LEFT EDGE OF THE CHARACTER
      DO 200 J=JMIN,JMIN+4
         NUM=0
         DO 150 I=1,NROWS-1
         IF(IPIC(I,J).EQ.0.AND.IPIC(I+1,J).NE.0)NUM=NUM+1
         IF(NUM.EQ.0)GO TO 150
         IF(IPIC(I,J).EQ.0 .AND.IPIC(I+1,J).NE.0)ITOP(NUM)=I+1
         IF(IPIC(I,J).NE.0 .AND. IPIC(I+1,J).EQ.0)IBOT(NUM)=I
150      CONTINUE
         GO TO 200
160      DO 170 L=1,NUM-1
         IF(IBOT(L).LT.I34 .AND. ITOP(L+1).GE.I12)GO TO 220
170      CONTINUE
200   CONTINUE
C
      GO TO 614
C
220   JJ=J
      JSTART=J
      ISTART=ITOP(L+1)
      IISTRT=ITOP(L+1)
      II=IBOT(L)
C     CHECK IF IT IS A FIVE LIKE OR 2 LIKE CHARACTER
C
      NUMLST=1
      ICHECK=.FALSE.
      DO 230 I=II-1,II+3
         NUMTRN=0
         DO 225 J=1,NCOLS-1
         IF(IPIC(I,J).EQ.0 .AND. IPIC(I,J+1).NE.0)NUMTRN=NUMTRN+1
         IF(IPIC(I,J).EQ.0 .AND. IPIC(I,J+1).NE.0)ILFT(NUMTRN)=J+1
         IF(IPIC(I,J).NE.0 .AND. IPIC(I,J+1).EQ.0)IRIT(NUMTRN)=J
225      CONTINUE
         IF(NUMTRN.EQ.1)ICHECK=.TRUE.
         IF(.NOT. ICHECK)GO TO 228
         IF(NUMTRN.NE.1 .OR. NUMLST.NE.2)GO TO 228
         GO TO 235
228      NUMLST=NUMTRN
```

```
              ILFT1=ILFT(1)
              ILFT2=ILFT(2)
              IRIT1=IRIT(1)
              IRIT2=IRIT(2)
230       CONTINUE
          GO TO 240
C
235       IDIST=ILFT(1)-ILFT1
          IF(ILFT(1).GT.IRIT1)GO TO 648
C
C     CHECK FOR WHITE PIXEL TO THE BOTTOM LEFT OF THE CHARACTER
C
240       DO 250 M=JJ-3,JJ
             DO 245 L=II+1,ISTART-1
                IF(M.LT.1)GO TO 250
                IF(IPIC(L,M).NE.0)GO TO 260
245          CONTINUE
250       CONTINUE
          GO TO 280
C
260       JSTART=M
          ISTART=L
          DO 270 MM=1,M+1
             IF(IPIC(L-1,MM).NE.0)GO TO 618
270       CONTINUE
C
280       DO 290 L=NCOLS,J14,-1
             IF(IPIC(ISTART,L).NE.0)GO TO 295
290       CONTINUE
C
295       JEND=L
          JDIFF=JEND-JSTART
C
C     CHECK FOR THE TOP LEFT HAND CURVE
C
          K=0
          DO 350 I=IMIN,...
             ...
             NUMTRN=0
             ICHECK=.FALSE.
             DO 325 J=1,JMAX
                IF(IPIC(I,J).EQ.0 .AND. IPIC(I,J+1).NE.0)NUMTRN=NUMTRN+1
                IF(NUMTRN.NE.1)GO TO 325
                IF(ICHECK)GO TO 325
                K=K+1
                ILFT(K)=J+1
                ICHECK=.TRUE.
                IF(K.LT.2)GO TO 325
                MMM=(ILFT(K)-ILFT(K-1))
                IF(MMM.GT.3)GO TO 622
325          CONTINUE
350       CONTINUE
C
          ILINE=ILFT(2)-ILFT(K)
          IF((ILINE.LE.1) .AND. (IDIST.GT.5))GO TO 640
C
C     CHECK FOR THE UPWARD HOOK AT THE LEFT BOTTOM OF THE CHARACTER
C
          ICOUNT=0
          NUMLST=1
          DO 360 I=IISTPT,IMAX
             NUMTRN=0
             DO 355 J=1,NCOLS-1
                IF(IPIC(I,J).EQ.0 .AND. IPIC(I,J+1).NE.0)NUMTRN=NUMTRN+1
                IF(NUMTRN.EQ.0)GO TO 355
                IF(IPIC(I,J).EQ.0 .AND. IPIC(I,J+1).NE.0)ILFT(NUMTRN)=J+1
                IF(IPIC(I,J).NE.0 .AND. IPIC(I,J+1).EQ.0)IRIT(NUMTRN)=J
```

```
355     CONTINUE
C
        IF(NUMLST.EQ.2 .AND. NUMTRN.EQ.1)GO TO 365
        IF(NUMTRN.EQ.2)ICOUNT=ICOUNT+1
        IF(NUMTRN.NE.2 .OR. NUMIST.NE.2)GO TO 358
        IF(IRIT(1).GE.(ILFT2-2))GO TO 365
        IF(IRIT1.GE.(ILFT(2)-2))GO TO 365
358     NUMLST=NUMTRN
        ILFT1=ILFT(1)
        IRIT1=IRIT(1)
        ILFT2=ILFT(2)
        IRIT2=IRIT(2)
360     CONTINUE
C    CHECK THE RIGHT EDGE OF THE CHARACTER
C
365     DO 370 L=1,10
           ITOP(L)=0
           IBOT(L)=0
370     CONTINUE
C
        DO 380 L=1,20
           ILFT(L)=0
           IRIT(L)=0
380     CONTINUE
C
        DO 400 J=JMAX,JMAX-3,-1
        NUM=0
           DO 390 I=1,NROWS-1
           IF(IPIC(I,J).EQ.0 .AND. IPIC(I+1,J).NE.0)NUM=NUM+1
           IF(NUM.EQ.0)GO TO 390
           IF(IPIC(I,J).EQ.0 .AND. IPIC(I+1,J).NE.0)ITOP(NUM)=I+1
           IF(IPIC(I,J).NE.0 .AND. IPIC(I+1,J).EQ.0)IBOT(NUM)=I
390        CONTINUE
           IF(NUM.GE.2)GO TO 450
400     CONTINUE
        GO TO 626
450     JJ=J
        IBIG=IBOT(1)
        II=ITOP(2)
        IF((IBOT(2)-ITOP(2)).GT.3)GO TO 455
        DO 452 I=JJ-2,NCOLS-1
           IF(IPIC(IBOT(2)+1,I).NE.0)GO TO 455
452     CONTINUE
        GO TO 628
455     IF(IBOT(1).GT.II2)GO TO 628
        IF(II.GT.I34 .AND. II.GE.(IMAX-2))GO TO 646
        DO 460 L=1,NCOLS
           IF(IPIC(IBIG,L).NE.0)GO TO 480
460     CONTINUE
        GO TO 628
480     IIIFF=JJ-L
        IF(IIIFF.GT.(JIIFF+2))GO TO 638
C
C    CHECK FOR WHITE PIXELS TO THE RIGHT OF THE TOP RIGHT EDGE
C
        LL=0
        DO 500 M=JJ,JJ+3
           DO 490 L=IBOT(1)+1,ITOP(2)-1
              IF(M.GT.NCOLS)GO TO 500
              IF(IPIC(L,M).NE.0)GO TO 488
              GO TO 490
488           LL=L
490        CONTINUE
500     CONTINUE
C
        IF(LL.EQ.0)GO TO 515
        DO 510 M=JJ,JJ+3
```

```
              IF(IPIC(LL+1,M).NE.0)GO TO 634
510     CONTINUE
C    CHECK FOR A DOWNWARD HOOK AT THE RIGHT TOP OF THE CHARACTER
C
515     NUMLST=1
        JCOUNT=0
        DO 550 I=IMIN+1,IBEG+1
        NUMTRN=0
          DO 540 J=NCOLS,1,-1
            IF(IPIC(I,J).EQ.0 .AND. IPIC(I,J-1).NE.0)NUMTRN=NUMTRN+1
            IF(NUMTRN.EQ.0)GO TO 540
            IF(IPIC(I,J).EQ.0 .AND. IPIC(I,J-1).NE.0)IRIT(NUMTRN)=J-1
            IF(IPIC(I,J).NE.0 .AND. IPIC(I,J-1).EQ.0)ILFT(NUMTRN)=J
540       CONTINUE
C
          IF(NUMLST.EQ.2 .AND. NUMTRN.EQ.1)GO TO 599
          IF(NUMTRN.EQ.2)JCOUNT=JCOUNT+1
          IF(NUMTRN.NE.2 .OR. NUMLST.NE.2)GO TO 545
          IF(IRIT2.GT.(ILFT(1)-2))GO TO 599
          IF(IRIT(2).GT.(ILFT1-2))GO TO 599
545       NUMLST=NUMTRN
          IRIT1=IRIT(1)
          IRIT2=IRIT(2)
          ILFT1=ILFT(1)
          ILFT2=ILFT(2)
550     CONTINUE
C
599     IF(ILINE.LE.1 .AND. (ICOUNT-JCOUNT).GE.3)GO TO 642
C
        WRITE(1,605)
605     FORMAT(5X,'$$$$$')
        GO TO 650
614     WRITE(1,615)
615     FORMAT(5X,'ERR..3')
        GO TO 645
618     WRITE(1,619)
619     FORMAT(5X,'ERR...5')
        GO TO 645
620     WRITE(1,621)
621     FORMAT(5X,'ERR...6')
        GO TO 645
622     WRITE(1,623)
623     FORMAT(5X,'ERR...7')
        GO TO 645
624     WRITE(1,625)
625     FORMAT(5X,'ERR...8')
        GO TO 645
626     WRITE(1,627)
627     FORMAT(5X,'ERR..9')
        GO TO 645
628     WRITE(1,629)
629     FORMAT(5X,'ERR..10')
        GO TO 645
630     WRITE(1,631)
631     FORMAT(5X,'ERR...11')
        GO TO 645
632     WRITE(1,633)
633     FORMAT(5X,'ERR...12')
        GO TO 645
634     WRITE(1,637)
637     FORMAT(5X,'ERR...13')
        GO TO 645
C
638     WRITE(1,639)
639     FORMAT(5X,'ERR...14')
        GO TO 645
640     WRITE(1,641)
```

```
641         FORMAT(5X,'ERR...15')
            GO TO 645
642         WRITE(1,643)
643         FORMAT(5X,'ERR...16')
645         CALL SLANT(IPIC,NROWS,NCOLS,IFEATR)
            GO TO 650
646         WRITE(1,647)
647         FORMAT(5X,'ERR...17')
            GO TO 650
648         WRITE(1,649)
649         FORMAT(5X,'ERR...18')
650         RETURN
            END
            SUBROUTINE SLANT(IPIC,NROWS,NCOLS,IFEATR)
            BYTE IPIC(50,50),ILFT(20),IRIT(20),ITOP(20),IBOT(20),INDEX1(20),
           2 INDEX2(20),IFEATR(8)
C
C     THIS SUBROUTINE WILL TRY TO RECOGNIZE SLANTED DOLLAR SIGNS
C
            DO 10 I=1,20
               ILFT(I)=0
               IRIT(I)=0
               INDEX1(I)=0
               INDEX2(I)=0
               ITOP(I)=0
               IBOT(I)=0
10          CONTINUE
C
            IMIN=IFEATR(1)
            IMAX=IFEATR(2)
            JMIN=IFEATR(3)
            JMAX=IFEATR(4)
            J12=IFEATR(5)
            I12=IFEATR(6)
C
C     CHECK TOTAL NO. OF PIXELS AND CO ORDINATES OF IMIN
C
            NUMBLK=0
            NUM=0
            DO 50 J=1,NCOLS-1
               IF(IPIC(IMIN,J).NE.0)NUMBLK=NUMBLK+1
               IF(IPIC(IMIN,J).EQ.0 .AND. IPIC(IMIN,J+1).NE.0)NUM=NUM+1
               IF(NUM.EQ.0)GO TO 50
               IF(IPIC(IMIN,J).EQ.0 .AND. IPIC(IMIN,J+1).NE.0)ILFT(NUM)=J+1
               IF(IPIC(IMIN,J).NE.0 .AND. IPIC(IMIN,J+1).EQ.0)IRIT(NUM)=J
50          CONTINUE
C
            IF(NUMBLK.GT.5)GO TO 6001
            IF(IRIT(NUM).LT.(JMAX-3))GO TO 6003
            ILFT1=ILFT(1)
            IRIT1=IRIT(NUM)
C
C     CHECK THE ROW IMAX FOR TOTAL NO. OF PIXELS
C
            NUMBLK=0
            NUM=0
            DO 100 J=1,NCOLS-1
               IF(IPIC(IMAX,J).NE.0)NUMBLK=NUMBLK+1
               IF(IPIC(IMAX,J).EQ.0 .AND. IPIC(IMAX,J+1).NE.0)NUM=NUM+1
               IF(NUM.EQ.0)GO TO 100
               IF(IPIC(IMAX,J).EQ.0 .AND. IPIC(IMAX,J+1).NE.0)ILFT(NUM)=J+1
               IF(IPIC(IMAX,J).NE.0 .AND. IPIC(IMAX,J+1).EQ.0)IRIT(NUM)=J
100         CONTINUE
C
            IF(NUMBLK.GT.5)GO TO 6005
            IF(ILFT(1).GT.(JMIN+4))GO TO 6007
```

```
C
          ILFT2=ILFT(1)
          IRIT2=IRIT(NUM)
C
          K=0
          DO 300 J=JMAX,JMIN,-1
             DO 200 I=2,NROWS
              IF(IPIC(I,J).NE.0)GO TO 250
200          CONTINUE
             GO TO 300
250          K=K+1
             ITOP(K)=I
             IF(K.LT.2)GO TO 300
             IF((ITOP(K)-ITOP(K-1)).GE.5)GO TO 350
300       CONTINUE
          GO TO 6009
350       IROW=ITOP(K-1)
          ICOLM=J+1
          IF(ICOLM.LT.IRIT2)GO TO 6013
          IDIFF=(ILFT1-ICOLM)
C
          KK=0
          DO 500 M=JMIN,JMAX
             DO 400 L=IMAX,2,-1
                IF(IPIC(L,M).NE.0)GO TO 450
400          CONTINUE
             GO TO 500
450          KK=KK+1
             IBOT(KK)=L
             IF(KK.LT.2)GO TO 500
             IF((IBOT(KK-1)-IBOT(KK)).GE.5)GO TO 550
500       CONTINUE
          GO TO 6011
550       IIROW=IBOT(KK-1)
          IICOL=M-1
          JDIFF=(IICOL-IRIT2)
          IF(ILFT1.LT.IICOL)GO TO 6015
          NDIFF=IABS(JDIFF-IDIFF)
          IF(NDIFF.GT.4)GOTO 6017
C
C   CHECK THE CHANGE OF PIXELS AT TOP AND BOTTOM
C
          NUM1=0
          NUM2=0
          K=0
          DO 700 I=IMIN,IROW
          NUMTRN=0
             DO 600 J=1,NCOLS-1
                IF(IPIC(I,J).EQ.0.AND. IPIC(I,J+1).NE.0)NUMTRN=NUMTRN+1
                IF(NUMTRN.EQ.0)GO TO 600
                IF(IPIC(I,J).NE.0 .AND. IPIC(I,J+1).EQ.0)IPIT(NUMTRN)=J
600          CONTINUE
C
             IF(NUMTRN.EQ.0)GO TO 700
             K=K+1
             INDEX1(K)=(IPIT(NUMTRN)-ILFT(1))
             IF(K.LT.2)GO TO 700
             IF(INDEX1(K).GT.INDEX1(K-1))GO TO 650
             NUM2=NUM2+1
             GO TO 700
650          NUM1=NUM1+1
700       CONTINUE
          IF(NUM1.LE.NUM2)GO TO 6019
C
C   CHECK THE LOWER PART OF THE CHARACTER
C
          K=0
```

```
            NUM3=0
            NUM4=0
C
            DO 900 I=IIPOW,IMAX
            NUMTRN=0
               DO 800 J=1,NCOLS-1
                  IF(IPIC(I,J).EQ.0 .AND. IPIC(I,J+1).NE.0)NUMTRN=NUMTRN+1
                  IF(NUMTRN.EQ.0)GO TO 800
                  IF(IPIC(I,J).EQ.0 .AND. IPIC(I,J+1).NE.0)ILFT(NUMTRN)=J+1
                  IF(IPIC(I,J).NE.0 .AND. IPIC(I,J+1).EQ.0)IRIT(NUMTRN)=J
800            CONTINUE
C
            IF(NUMTRN.EQ.0)GO TO 900
            K=K+1
            INDEX2(K)=(IRIT(NUMTRN)-ILFT(1))
            IF(K.LT.2)GO TO 900
            IF(INDEX2(K).LE.INDEX2(K-1))GO TO 850
            NUM4=NUM4+1
            GO TO 900
850         NUM3=NUM3+1
900         CONTINUE
C
            IF(NUM4.GE.NUM3)GO TO 6021
            DO 1000 J=2,NCOLS-1
               IF(IPIC(IIROW,J).NE.0)GO TO 1050
1000        CONTINUE
C
1050        LCOLM=J
            DO 1200 I=IROW,IIPOW-1
               DO 1100 J=2,NCOLS-1
                  IF(IPIC(I,J).NE.0)GO TO 1150
1100           CONTINUE
1150           IF(J.LT.LCOLM)GO TO 6023
1200        CONTINUE
C
            DO 1300 J=NCOLS,2,-1
               IF(IPIC(IROW,J).NE.0)GO TO 1350
1300        CONTINUE
C
1350        JSIDE=J
            DO 1500 I=IPOW+1,IIROW-1
               DO 1400 J=NCOLS,2,-1
                  IF(IPIC(I,J).NE.0)GO TO 1450
1400           CONTINUE
1450           IF(J.GT.(JSIDE+1))GO TO 6025
1500        CONTINUE
C
            WRITE(1,2000)
            GO TO 6500
C
6001        WRITE(1,6002)
6002        FORMAT(5X,'ERR...1A')
            GO TO 6500
6003        WRITE(1,6004)
6004        FORMAT(5X,'ERR...2A')
            GO TO 6500
6005        WRITE(1,6006)
6006        FORMAT(5X,'ERR...3A')
            GO TO 6500
6007        WRITE(1,6008)
6008        FORMAT(5X,'ERR...4A')
            GO TO 6500
6009        WRITE(1,6010)
6010        FORMAT(5X,'ERR...5A')
            GO TO 6500
6011        WRITE(1,6012)
6012        FORMAT(5X,'ERR...6A')
```

```
6013        WRITE(1,6014)
6014        FORMAT(5X,'ERR...7A')
            GO TO 6500
6015        WRITE(1,6016)
6016        FORMAT(5X,'ERR...8A')
            GO TO 6500
6017        WRITE(1,6018)
6018        FORMAT(5X,'ERR...9A')
            GO TO 6500
6019        WRITE(1,6020)
6020        FORMAT(5X,'ERR...10A')
            GO TO 6500
6021        WRITE(1,6022)
6022        FORMAT(5X,'ERR...11A')
            GO TO 6500
6023        WRITE(1,6024)
6024        FORMAT(5X,'ERR...12A')
            GO TO 6500
6025        WRITE(1,6026)
6026        FORMAT(5X,'ERR...13A')
6500        RETURN
            END
            SUBROUTINE INIT2
            COMMON/IPLC1/ITAB1(512)
            DIMENSION INDEX1(13)
            DATA INDEX1/16,19,22,23,25,52,88,89,208,304,308,400,464/
C
            DO 10 I=1,512
10             ITAB1(I)=0
C
            DO 15 I=1,13
            II=INDEX1(I)+1
            ITAB1(II)=1
15          CONTINUE
C
            RETURN
            END
            SUBROUTINE ITERM2(IPIC,I,J,IPARMT)
            BYTE IPIC(50,50)
            INTEGER*2 IPARMT(1)
            COMMON/IPLC1/ITAB1(512)
C
            DO 15 L=I-1,I+1
              DO 10 M=J-1,J+1
                IF(IPIC(L,M).NE.0)IPIC(L,M)=1
10          CONTINUE
15          CONTINUE
C
            IVALUE=IPIC(I-1,J-1)*2**8+IPIC(I-1,J)*2**7+IPIC(I-1,J+1)*2**6+
        2      IPIC(I,J-1)*2**5+IPIC(I,J)*2**4+IPIC(I,J+1)*2**3+
        3      IPIC(I+1,J-1)*2**2+IPIC(I+1,J)*2+IPIC(I+1,J+1)
C
            IPARMT(1)=ITAB1(IVALUE+1)
            RETURN
            END

SUBROUTINE ICLEAN(IPIC,NROWS,NCOLS)
            BYTE IPIC(50,50)
            INTEGER*2 IPARMT(1)
C
C     THIS SUBROUTINE WILL CLEAN UP THE ORIGINAL CHARACTER SO THAT
C     THERE IS NO BUMP OR GLITCH UP TO 1 PIXEL
C
            CALL INIT2
            DO 100 I=2,NROWS-1
              DO 50 J=2,NCOLS-1
```

```
              IF(IPIC(I,J).EQ.0)GO TO 30
              CALL ITERM2(IPIC,I,J,IPARMT)
              IF(IPARMT(1).EQ.1)IPIC(I,J)=0
              GO TO 50
30         ISUM1=IPIC(I-1,J)+IPIC(I+1,J)
           ISUM2=IPIC(I,J-1)+IPIC(I,J+1)
           NTOTSM=ISUM1+ISUM2
           IF(NTOTSM.EQ.4)IPIC(I,J)=1
50            CONTINUE
100        CONTINUE
C
           CALL PPINT(IPIC,NROWS,NCOLS)
           RETURN
           END
           SUBROUTINE ASTRK(IPIC,NROWS,NCOLS)
           BYTE IPIC(50,50),ILFT(3),IRIT(3),ITOP(3),IBOT(3),IFEATR(10)
           LOGICAL ICHECK,ISKIP
C
C     THIS SUBROUTINE WILL TRY TO DETERMINE AN ASTERISK
C     AS A LOCATION FOR THE AMOUNT FIELD
C     MAIN CRITERIA IS TO FIND NUMBER OF TRANSITIONS SURROUNDING
C     THE CHARACTER AND COUNTING THE NUMBER OF PIXELS AT THE CENTRE
C     OF THE CHARACTER
C
C     CALL SUBROUTINE ICLEAN TO SMOOTH OUT THE CHARACTER
C
           CALL ICLEAN(IPIC,NROWS,NCOLS)
C
C     CALL SUBROUTINE IRANGE TO DETERMINE MINIMUM,MAXIMUM ROW AND COLUMN
C     INDEXES
C
           CALL IRANGE(IPIC,NROWS,NCOLS,IFEATR,IFLAG)
C
           DO 10 L=1,3
           IRIT(L)=0
           ILFT(L)=0
           ITOP(L)=0
           IBOT(L)=0
10         CONTINUE
C
C     DETERMINE THE CENTRE OF THE CHARACTER
C
           IMID=IFEATR(6)
           JMID=IFEATR(5)
           IMAX=IFEATR(2)
           JMAX=IFEATR(4)
           IF(IMAX.GT.20 .OR. JMAX.GT.20)GO TO 3500
C
C     CHECK NUMBER OF BLACK PIXELS AT THE CENTRE OF THE CHARACTER
C
           NUMBLK=0
           DO 100 I=IMID-2,IMID+2
           DO 50 J=JMID-2,JMID+2
             IF(I.LT.1 .OR. I.GT.NROWS)GO TO 3000
             IF(J.LT.1 .OR. J.GT.NCOLS)GO TO 3001
             IF(IPIC(I,J).NE.0)NUMBLK=NUMBLK+1
50         CONTINUE
100        CONTINUE
C
           WRITE(1,101)IMID,JMID,NUMBLK
101        FORMAT(5X,'IMID=',I2,'JMID=',I2,'NUMBLK=',I2,/)
           IF(NUMBLK.GE.19)GO TO 140
           IF(NUMBLK.GE.10)GO TO 120
           IF(IPIC(IMID,JMID).NE.0)GO TO 3003
           CALL SPEST(IPIC,NROWS,NCOLS,IFEATR,IPARMT)
           IF(IPARMT.EQ.1)GO TO 3100
           GO TO 3003
```

```
C
C   CHECK FOR HOLE AT THE MIDDLE OF THE CHARACTER
C
120     IF(IPIC(IMID,JMID).NE.0)GO TO 3003
        CALL IHOLE(IPIC,IMID,JMID,IPARMT)
        IF(IPARMT.EQ.0)GO TO 3003
C CHECK THE TOP OF THE CHARACTER
140     NUMLST=1
        ICHECK=.FALSE.
        ISKIP=.FALSE.
        DO 200 I=2,IMID
        NUMTRN=0
            DO 150 J=1,NCOLS-1
            IF(IPIC(I,J).EQ.0 .AND. IPIC(I,J+1).NE.0)NUMTRN=NUMTRN+1
            IF(NUMTRN.EQ.0 .OR. NUMTRN.GT.3)GO TO 150
            IF(IPIC(I,J).EQ.0 .AND. IPIC(I,J+1).NE.0)ILFT(NUMTRN)=J+1
            IF(IPIC(I,J).NE.0 .AND. IPIC(I,J+1).EQ.0)IRIT(NUMTRN)=J
150         CONTINUE
C
            IF(NUMTRN.EQ.1 .AND. (NUMLST.EQ.2 .OR.NUMLST.EQ.3))GO TO 250
            IF(NUMTRN.EQ.2 .AND. NUMLST.EQ.3)GO TO 250
            IRIT1=IRIT(1)
            ILFT2=ILFT(2)
            IF(NUMTRN.NE.3)GO TO 160
            ICHECK=.TRUE.
            IRIT2=IRIT(2)
            ILFT3=ILFT(3)
160         NUMLST=NUMTRN
200     CONTINUE
        ISKIP=.TRUE.
        GO TO 700
C   CHECK FOR WHITE PIXELS ON TOP OF THE CHARACTER
C
250     IROW=I-1
        DO 400 J=IRIT1+1,ILFT2-1
            DO 350 I=2,IROW
            IF(IPIC(I,J).NE.0)GO TO 400
350         CONTINUE
            GO TO 450
400     CONTINUE
C
        DO 425 L=2,IRIT1
            IF(IPIC(IROW-1,L).NE.0)GO TO 430
425     CONTINUE
        GO TO 450
C
430     DO 440 L=ILFT2,NCOLS-1
            IF(IPIC(IROW-1,L).NE.0)GO TO 3006
440     CONTINUE
C
450     IF(.NOT. ICHECK)GO TO 700
        DO 600 J=IRIT2+1,ILFT3-1
            DO 550 I=2,IROW
            IF(IPIC(I,J).NE.0)GO TO 600
550         CONTINUE
            GO TO 700
600     CONTINUE
C
        DO 650 L=ILFT3,NCOLS-1
            IF(IPIC(IROW-1,L).NE.0)GO TO 3007
650     CONTINUE
C   CHECK THE BOTTOM OF THE CHARACTER
C
700     DO 725 L=1,3
        ILFT(L)=0
        IRIT(L)=0
725     CONTINUE
```

```
C
          NUMLST=1
          ICHECK=.FALSE.
          DO 800 I=NROWS-1,IMID,-1
             NUMTRN=0
             DO 750 J=1,NCOLS-1
                IF(IPIC(I,J).EQ.0 .AND. IPIC(I,J+1).NE.0)NUMTRN=NUMTRN+1
                IF(NUMTRN.EQ.0 .OR. NUMTRN.GT.3)GO TO 750
                IF((IPIC(I,J).EQ.0).AND.IPIC(I,J+1).NE.0)ILFT(NUMTRN)=J+1
                IF(IPIC(I,J).NE.0 .AND. IPIC(I,J+1).EQ.0)IRIT(NUMTRN)=J
750          CONTINUE
             IF(NUMTRN.EQ.1.AND.(NUMLST.EQ.2 .OR. NUMLST.EQ.3))GO TO 850
             IF(NUMTRN.EQ.2 .AND. NUMLST.EQ.3)GO TO 850
             IRIT1=IRIT(1)
             ILFT2=ILFT(2)
             IF(NUMTRN.NE.3)GO TO 760
             ICHECK=.TRUE.
             IRIT2=IRIT(2)
             ILFT3=ILFT(3)
760          NUMLST=NUMTRN
800       CONTINUE
C
          IF(ISKIP)GO TO 3009
          GO TO 1300
C    CHECK FOR WHITE PIXELS AT THE BOTTOM OF THE CHARACTER
C
850       IROW=I+1
          DO 1000 J=IRIT1+1,ILFT2-1
             NUMBLK=0
             DO 950 I=IROW,NROWS-1
                IF(IPIC(I,J).NE.0)NUMBLK=NUMBLK+1
950          CONTINUE
             IF(NUMBLK.EQ.0)GO TO 1100
1000      CONTINUE
          GO TO 3010
C
1100      IF(.NOT. ICHECK)GO TO 1300
          DO 1200 J=IRIT2+1,ILFT3-1
             NUMBLK=0
             DO 1150 I=IROW,NROWS-1
                IF(IPIC(I,J).NE.0)NUMBLK=NUMBLK+1
1150         CONTINUE
             IF(NUMBLK.EQ.0)GO TO 1300
1200      CONTINUE
          GO TO 3011
C    CHECK THE LEFT EDGE OF THE CHARACTER
C
1300      NUMLST=1
          ICHECK=.FALSE.
          NUMTRN=0
          DO 1350 I=1,NROWS-1
             IF(IPIC(I,J).EQ.0 .AND. IPIC(I+1,J).NE.0)NUMTRN=NUMTRN+1
             IF(NUMTRN.EQ.0 .OR. NUMTRN.GT.3)GO TO 1350
             IF(IPIC(I,J).EQ.0 .AND. IPIC(I+1,J).NE.0)ITOP(NUMTRN)=I+1
             IF(IPIC(I,J).NE.0 .AND. IPIC(I+1,J).EQ.0)IBOT(NUMTRN)=I
1350      CONTINUE
C
          IF(NUMTRN.EQ.1.AND.(NUMLST.EQ.2 .OR. NUMLST.EQ.3))GO TO 1500
          IF(NUMTRN.EQ.2 .AND. NUMLST.EQ.3)GO TO 1500
          IBOT1=IBOT(1)
          ITOP2=ITOP(2)
          IF(NUMTRN.NE.3)GO TO 1360
          ICHECK=.TRUE.
          IBOT2=IBOT(2)
          ITOP3=ITOP(3)
1360      NUMLST=NUMTRN
```

```
1400      CONTINUE
          GO TO 2000
C    CHECK FOR THE WHITE PIXEL TO THE LEFT OF THE CHARACTER
1500      JCOL=J-1
          DO 1700 I=IBOT1+1,ITOP2-1
            DO 1650 J=2,JCOL
              IF(IPIC(I,J).NE.0)GO TO 1700
1650        CONTINUE
          GO TO 1800
1700      CONTINUE
C
          ISUM1=0
          ISUM2=0
          DO 1750 L=2,JCOL-1
            IF(IPIC(IBOT1,L).NE.0)ISUM1=ISUM1+1
            IF(IPIC(ITOP2,L).NE.0)ISUM2=ISUM2+1
1750      CONTINUE
          IF(ISUM1.EQ.0 .OR. ISUM2.EQ.0)GO TO 1800
          GO TO 3014
C
1800      IF(.NOT. ICHECK)GO TO 2000
          DO 1900 I=IBOT2+1,ITOP3-1
            DO 1850 J=2,JCOL
              IF(IPIC(I,J).NE.0)GO TO 1900
1850        CONTINUE
          GO TO 2000
1900      CONTINUE
          ISUM1=0
          ISUM2=0
C
          DO 1950 L=2,JCOL-1
            IF(IPIC(IBOT2,L).NE.0)ISUM1=ISUM1+1
            IF(IPIC(ITOP3,L).NE.0)ISUM2=ISUM2+1
1950      CONTINUE
          IF(ISUM1.EQ.0 .OR. ISUM2.EQ.0)GO TO 2000
          GO TO 3015
C
C    CHECK THE RIGHT EDGE OF THE CHARACTER
C
2000      DO 2100 L=1,3
            ITOP(L)=0
            IBOT(L)=0
2100      CONTINUE
C
          NUMLST=1
          ICHECK=.FALSE.
          DO 2300 J=NCOLS,JMIT,-1
            NUMTRN=0
            DO 2250 I=1,NROWS-1
              IF(IPIC(I,J).EQ.0 .AND. IPIC(I+1,J).NE.0)NUMTRN=NUMTRN+1
              IF(NUMTRN.EQ.0 .OR. NUMTRN.GT.3)GO TO 2250
              IF(IPIC(I,J).EQ.0 .AND. IPIC(I+1,J).NE.0)ITOP(NUMTRN)=I+1
              IF(IPIC(I,J).NE.0 .AND. IPIC(I+1,J).EQ.0)IBOT(NUMTRN)=I
2250        CONTINUE
            IF(NUMTRN.EQ.1 .AND.(NUMLST.EQ.2 .OR.NUMLST.EQ.3))GO TO 2500
            IF(NUMTRN.EQ.2 .AND. NUMLST.EQ.3)GO TO 2500
            IBOT1=IBOT(1)
            ITOP2=ITOP(2)
            IF(NUMTRN.NE.3)GO TO 2260
            ICHECK=.TRUE.
            IBOT2=IBOT(2)
            ITOP3=ITOP(3)
2260        NUMLST=NUMTRN
2300      CONTINUE
          GO TO 3100
2500      JCOL=J+1
          DO 2600 I=IBOT1+1,ITOP2-1
            DO 2550 J=JCOL,NCOLS-1
```

```
              IF(IPIC(I,J).NE.0)GO TO 2600
2550        CONTINUE
            GO TO 2700
2600      CONTINUE
        ISUM1=0
        ISUM2=0
C
        DO 2650 L=JCOL+1,NCOLS-1
            IF(IPIC(IBOT1,L).NE.0)ISUM1=ISUM1+1
            IF(IPIC(ITOP2,L).NE.0)ISUM2=ISUM2+1
2650    CONTINUE
C
        IF(ISUM1.EQ.0 .OR. ISUM2.EQ.0)GO TO 2700
            GO TO 3018
2700        IF(.NOT.ICHECK)GO TO 3100
C
        DO 2900 I=IBOT2+1,ITOP3-1
            DO 2850 J=JCOL,NCOLS-1
                IF(IPIC(I,J).NE.0)GO TO 2900
2850            CONTINUE
                GO TO 3100
2900        CONTINUE
C
        ISUM1=0
        ISUM2=0
        DO 2950 L=JCOL+1,NCOLS-1
            IF(IPIC(IBOT2,L).NE.0)ISUM1=ISUM1+1
            IF(IPIC(ITOP3,L).NE.0)ISUM2=ISUM2+1
2950    CONTINUE
C
        IF(ISUM1.EQ.0 .OR. ISUM2.EQ.0)GO TO 3100
3000    WRITE(1,3050)
3050    FORMAT(5X,'ERROR..1'.'
        GO TO 3500
3001    WRITE(1,3051)
3051    FORMAT(5X,'ERROR...2')
3002    WRITE(1,3052)
3052    FORMAT(5X,'ERROR...3')
        GO TO 3500
3003    WRITE(1,3053)
3053    FORMAT(5X,'ERROR...4')
        GO TO 3500
3006    WRITE(1,3056)
3056    FORMAT(5X,'ERROR...7')
        GO TO 3500
3007    WRITE(1,3057)
3057    FORMAT(5X,'ERROR...8')
        GO TO 3500
3009    WRITE(1,3059)
3059    FORMAT(5X,'ERROR...10')
        GO TO 3500
3010    WRITE(1,3060)
3060    FORMAT(5X,'ERROR...11')
        GO TO 3500
3011    WRITE(1,3061)
3061    FORMAT(5X,'ERROR...12')
        GO TO 3500
3014    WRITE(1,3064)
3064    FORMAT(5X,'ERROR...15')
        GO TO 3500
3015    WRITE(1,3065)
3065    FORMAT(5X,'ERROR...16')
        GO TO 3500
3018    WRITE(1,3068)
3068    FORMAT(5X,'ERROR...19')
        GO TO 3500
3100    WRITE(1,3200)
```

```
3200    FORMAT(5X,'*****',/)
        GO TO 3600
3500    CALL CHKMET(IPIC,NROWS,NCOLS,IFEATR,IFLAG)
3600    RETURN
        END

SUBROUTINE IRANGE(IPIC,NROWS,NCOLS,IFEATR,IFLAG)
        BYTE IPIC(50,50),IFEATR(10)
C
C   THIS SUBROUTINE WILL DETERMINE THE MINIMUM ROW AND COLUMN INDEXES
C   AND MAXIMUM ROW AND COLUMN INDEXES
C   ARRAY IFEATR WILL STORE THE CO ORDINATES FOR DIFFEREN QUADRANTS
C   IFLAG=0 IF NUMBER OF TRANSITION ON EACH ROW IS 1
C   IFLAG=1 IF NUMBER OF TRANSITION IN ANY ROW IS GREATER THAN ZERO
C
C   DETERMINE THE MINIMUM AND MAXIMUM VALUES OF ROW AND COLUMNS
C
        IMAX=0
        JMAX=0
        IMIN=NROWS*NCOLS
        JMIN=NROWS*NCOLS
        IFLAG=0
        DO 100 J=1,NCOLS-1
           DO 75 I=1,NROWS-1
             IF(IPIC(I,J).EQ.0)GO TO 75
             IF(I.LT.IMIN)IMIN=I
             IF(J.LT.JMIN)JMIN=J
             IF(I.GT.IMAX)IMAX=I
             IF(J.GT.JMAX)JMAX=J
             IF(IFLAG.EQ.1)GO TO 75
             IF(IPIC(I,J).NE.0 .AND. IPIC(I+1,J).EQ.0)NUMTRN=NUMTRN+1
75         CONTINUE
           IF(NUMTRN.GE.2)IFLAG=1
100     CONTINUE
        WRITE(1,105),IMAX,JMAX,IMIN,JMIN
105     FORMAT(5X,'IMAX=',I2,2X,'JMAX=',I2,2X,'IMIN=',I2,2X,'JMIN=',I2)
C
        I12=(IMAX+IMIN+1)/2
        I14=(IMIN+I12)/2
        I34=(IMAX+I12)/2
        J12=(JMAX+JMIN+1)/2
        J14=(JMIN+J12)/2
        J34=(JMAX+J12)/2
        IFEATR(1)=IMIN
        IFEATR(2)=IMAX
        IFEATR(3)=JMIN
        IFEATR(4)=JMAX
        IFEATR(5)=J12
        IFEATR(6)=I12
        IFEATR(7)=J14
        IFEATR(8)=I14
        IFEATR(9)=J34
        IFEATR(10)=I34
        RETURN
        END
        SUBROUTINE IHOLE(IPIC,I,J,IPARMT)
        BYTE IPIC(50,50)
C
C   THIS SUBROUTINE WILL DETERMINE A HOLE WITHIN THE ESTERISK
C   THIS HOLE WILL CONSISTS OF 4 WHITE PIXELS
C
C   DETERMINE THE DECIMAL EQUIVLENT NUMBER OF THE CONFIGURATION
C
        IPARMT=0
        IVALUE=IPIC(I-1,J-1)*2**8+IPIC(I-1,J)*2**7+IPIC(I-1,J+1)*2**6+
```

```
    1      IPIC(I,J-1)*2**5+IPIC(I,J)*2**4+IPIC(I,J+1)*2**3+
    2      IPIC(I+1,J-1)*2**2+IPIC(I+1,J)*2+IPIC(I+1,J+1)
C
       IF(IVALUE.EQ.78 .OR. IVALUE.EQ.79)GO TO 50
       IF(IVALUE.EQ.291 .OR. IVALUE.EQ.295)GO TO 100
       IF(IVALUE.EQ.393 .OR. IVALUE.EQ.457)GO TO 200
       IF(IVALUE.EQ.228 .OR. IVALUE.EQ.484)GO TO 300
       GO TO 500
C
50     IF(IPIC(I,J-2).EQ.0 .OR. IPIC(I-1,J-2).EQ.0)GO TO 500
       IF(IPIC(I-2,J-1).EQ.0 .OR. IPIC(I-2,J).EQ.0)GO TO 500
       IPARMT=1
       GO TO 500
C
100    IF(IPIC(I-2,J).EQ.0 .OR. IPIC(I-2,J+1).EQ.0)GO TO 500
       IF(IPIC(I-1,J+2).EQ.0 .OR. IPIC(I,J+2).EQ.0)GO TO 500
       IPARMT=1
       GO TO 500
C
200    IF(IPIC(I,J-2).EQ.0 .OR. IPIC(I+1,J-2).EQ.0)GO TO 500
       IF(IPIC(I+2,J-1).EQ.0 .OR. IPIC(I+2,J).EQ.0)GO TO 500
       IPARMT=1
       GO TO 500
C
300    IF(IPIC(I,J+2).EQ.0 .OR. IPIC(I+1,J+2).EQ.0)GO TO 500
       IF(IPIC(I+2,J).EQ.0 .OR. IPIC(I+2,J+1).EQ.0)GO TO 500
       IPARMT=1
C
500    RETURN
       END
       SUBROUTINE SPEST(IPIC,NROWS,NCOLS,IFEATR,IFLAG)
       BYTE IPIC(50,50),IFEATR(10),ILFT(3),IRIT(3),ITOP(3),IBOT(3)
C
C   THIS SUBROUTINE WILL TRY TO DETERMINE SPECIAL TYPE OF ESTERISK
C   WITH A WIDE GAP OF WHITE PIXELS IN THE MIDDLE
C   THIS SUBROUTINE WILL SET A FLAG IFLAG TO 1 IF THE CHARACTER IS
C   RECOGNIZED AS AN ESTERISK OTHERWISE IFLAG=0
C
C-----------------------------------------------------------------
C
C   DETERMINE THE CO ORDINATES AND MINIMUM ,MAXIMUM POINTS
C
       IMIN=IFEATR(1)
       IMAX=IFEATR(2)
       JMIN=IFEATR(3)
       JMAX=IFEATR(4)
C
       I12=IFEATR(6)
       J12=IFEATR(5)
       J14=IFEATR(7)
       J34=IFEATR(9)
C
       DO 10 L=1,3
         ILFT(L)=0
         IRIT(L)=0
         ITOP(L)=0
         IBOT(L)=0
10     CONTINUE
C
       ICON=0
       IFLAG=0
C
C   CHECK THE LEFT HAND SIDE OF THE CHARACTER
C
       DO 130 J=JMIN,J12
       NUMTRN=0
         DO 50 I=1,NROWS-1
```

```
            DO ???? J=1,NCOLS-1
              IF(IPIC(I,J).EQ.0 .AND. IPIC(I+1,J).NE.0)NUMTRN=NUMTRN+1
              IF(NUMTRN.EQ.0)GO TO 50
              IF(IPIC(I,J).EQ.0 .AND. IPIC(I+1,J).NE.0)ITOP(NUMTRN)=I+1
              IF(IPIC(I,J).NE.0 .AND. IPIC(I+1,J).EQ.0)IBOT(NUMTRN)=I
50         CONTINUE
C
              IF(NUMTRN.NE.2)GO TO 100
              IF((ITOP(2)-IBOT(1)).GE.2)GO TO 150
100        CONTINUE
           GO TO 3000
C
150        IBOT1=IBOT(1)
           ITOP2=ITOP(2)
           ILEN1=(ITOP2-IBOT1)
C
C   CHECK FOR ROW OR ROWS OF WHITE PIXELS
C
           DO 200 L=IBOT1+1,ITOP2-1
             DO 175 M=2,NCOLS-1
               IF(IPIC(L,M).NE.0)GO TO 200
175          CONTINUE
             GO TO 250
200        CONTINUE
           GO TO 3001
C
C   STORE THE ROW INDEX OF THE WHITE GAP
C   AND CHECK THE BOTTOM OF THE CHARACTER
C
250        II1=L
           DO 400 I=IMAX,II2,-1
           NUMTRN=0
             DO 300 J=1,NCOLS-1
               IF(IPIC(I,J).EQ.0 .AND. IPIC(I,J+1).NE.0)NUMTRN=NUMTRN+1
               IF(NUMTRN.EQ.0)GO TO 300
               IF(IPIC(I,J).EQ.0 .AND. IPIC(I,J+1).NE.0)ILFT(NUMTRN)=J+1
               IF(IPIC(I,J).NE.0 .AND. IPIC(I,J+1).EQ.0)IRIT(NUMTRN)=J
300          CONTINUE
C
               IF(NUMTRN.NE.2)GO TO 400
               IF((ILFT(2)-IRIT(1)).GE.2)GO TO 500
400        CONTINUE
           GO TO 3002
C
500        IIRIT1=IRIT(1)
           IILFT2=ILFT(2)
           JLEN1=(IILFT2-IIRIT1)
C
C   CHECK FOR A COLUMN OF WHITE PIXEL
C
           DO 700 M=IIRIT1+1,IILFT2-1
             DO 600 L=IMAX,IMIN,-1
               IF(IPIC(L,M).NE.0)GO TO 700
600          CONTINUE
             GO TO 750
700        CONTINUE
           GO TO 1800
C
C   CHECK THE TOP OF THE CHARACTER
C
750        JJ1=M
           JLEN3=0
           JLEN4=0
           NUMLST=1
           DO 1000 L=IMIN,II1
           NUMTRN=0
             DO 900 M=1,NCOLS-1
```

```
              IF(IPIC(L,M).EQ.0 .AND. IPIC(L,M+1).NE.0)NUMTRN=NUMTRN+1
              IF(NUMTRN.EQ.0)GO TO 900
              IF(IPIC(L,M).EQ.0 .AND. IPIC(L,M+1).NE.0)ILFT(NUMTRN)=M+1
              IF(IPIC(L,M).NE.0 .AND. IPIC(L,M+1).EQ.0)IRIT(NUMTRN)=M
900       CONTINUE
              IF(NUMLST.NE.1 .OR. NUMTRN.NE.2)GO TO 920
              IF(ILFT(2).LT.JJ1)GO TO 920
              JLEN3=(ILFT(2)-IRIT(1))
              GO TO 960
920       IF(NUMLST.NE.2 .OR. ((NUMTRN.NE.0).AND.(NUMTRN.NE.1)))GO TO 960
              JLEN4=(ILFT2-IRIT1)
              GO TO 1100
960       NUMLST=NUMTRN
              IRIT1=IRIT(1)
              ILFT2=ILFT(2)
1000      CONTINUE
              GO TO 3003
1100      IF(JLEN3.GT.JLEN4)ICON=ICON+1
C
C     CHECK THE RIGHT EDGE OF THE CHARACTER
C
              NUMLST=1
              ILEN3=0
              ILEN4=0
              DO 1300 J=JMAX,JJ1,-1
              NUMTRN=0
                DO 1200 I=1,NROWS-1
                  IF(IPIC(I,J).EQ.0 .AND. IPIC(I+1,J).NE.0)NUMTRN=NUMTRN+1
                  IF(NUMTRN.EQ.0)GO TO 1200
                  IF(IPIC(I,J).EQ.0 .AND. IPIC(I+1,J).NE.0)ITOP(NUMTRN)=I+1
                  IF(IPIC(I,J).NE.0 .AND. IPIC(I+1,J).EQ.0)IBOT(NUMTRN)=I
1200          CONTINUE
              IF(NUMLST.NE.1 .OR. NUMTRN.NE.2)GO TO 1220
              IF(ITOP(2).LT.II1)GO TO 1220
              ILEN3=(ITOP(2)-IBOT(1))
              GO TO 1260
1220      IF(NUMLST.NE.2 .OR. ((NUMTRN.NE.0).AND.(NUMTRN.NE.1)))GO TO 1260
              ILEN4=(ITOP2-IBOT1)
              GO TO 1350
1260          NUMLST=NUMTRN
              ITOP2=ITOP(2)
              IBOT1=IBOT(1)
1300      CONTINUE
              GO TO 3004
C
1350      IF(ILEN3.GT.ILEN4)ICON=ICON+1
              IF(ICON.EQ.2)GO TO 2500
C
C     CHECK THE LEFT AND BOTTOM EDGES
C
              DO 1375 L=1,3
                ITOP(L)=0
                IBOT(L)=0
                IRIT(L)=0
                ILFT(L)=0
1375      CONTINUE
C
              DO 1500 M=JJ1-1,JMIN,-1
              NUMTRN=0
                DO 1400 L=1,NROWS-1
                  IF(IPIC(L,M).EQ.0 .AND. IPIC(L+1,M).NE.0)NUMTRN=NUMTRN+1
                  IF(IPIC(L,M).EQ.0 .AND. IPIC(L+1,M).NE.0)ITOP(NUMTRN)=L+1
                  IF(IPIC(L,M).NE.0 .AND. IPIC(L+1,M).EQ.0)IBOT(NUMTRN)=L
1400          CONTINUE
              IF(NUMTRN.EQ.2)GO TO 1550
1500      CONTINUE
```

```
              GO TO 3005
C
1550    ILEN2=(ITOP(2)-IBOT(1))
        IF(ILEN1.GT.ILEN2)ICON=ICON+1
        IF(ICON.GE.2)GO TO 2500
C
C    CHECK THE SHORT OPENING AT THE BOTTOM
C
        DO 1700 L=II1+1,IMAX
        NUMTRN=0
           DO 1600 M=1,NCOLS-1
              IF(IPIC(L,M).EQ.0 .AND. IPIC(L,M+1).NE.0)NUMTRN=NUMTRN+1
              IF(NUMTRN.EQ.0)GO TO 1600
              IF(IPIC(L,M).EQ.0 .AND. IPIC(L,M+1).NE.0)ILFT(NUMTRN)=M+1
              IF(IPIC(L,M).NE.0 .AND. IPIC(L,M+1).EQ.0)IRIT(NUMTRN)=M
1600       CONTINUE
           IF(NUMTRN.EQ.2)GO TO 1750
1700    CONTINUE
        GO TO 3006
1750    JLEN2=(ILFT(2)-IRIT(1))
        IF(JLEN1.GT.JLEN2)ICON=ICON+1
        IF(ICON.GE.2)GO TO 2500
        GO TO 3007
C
C
C    CHECK THE ESTERISK WITH HORIZONTAL GAP ONLY
C
C
1800    DO 1900 L=1,3
        ILFT(L)=0
        IRIT(L)=0
1900    CONTINUE
C
        KCOUNT=0
        LCOUNT=0
        DO 2200 I=IMIN,II1
        NUMTRN=0
           DO 2100 J=1,NCOLS-1
              IF(IPIC(I,J).EQ.0 .AND. IPIC(I,J+1).NE.0)NUMTRN=NUMTRN+1
              IF(NUMTRN.EQ.0)GO TO 2100
              IF(IPIC(I,J).EQ.0 .AND. IPIC(I,J+1).NE.0)ILFT(NUMTRN)=J+1
              IF(IPIC(I,J).NE.0 .AND. IPIC(I,J+1).EQ.0)IRIT(NUMTRN)=J
2100       CONTINUE
           IF(NUMTRN.EQ.0)GO TO 2200
           IF(ILFT(1).GE.J14 .AND. IRIT(NUMTRN).LE.J34)KCOUNT=KCOUNT+1
           IF(ILFT(1).LT.J14 .AND. IRIT(NUMTRN).GT.J34)LCOUNT=LCOUNT+1
2200    CONTINUE
C
        IF(KCOUNT.GE.LCOUNT)GO TO 2500
        GO TO 3008
2500    IFLAG=1
        GO TO 3500
3000    WRITE (1,3011)
3011    FORMAT(5X,'ERS...1')
        GO TO 3500
3001    WRITE(1,3012)
3012    FORMAT(5X,'ERS...2')
        GO TO 3500
3002    WRITE(1,3013)
3013    FORMAT(5X,'ERS...3')
        GO TO 3500
3003    WRITE(1,3014)
3014    FORMAT(5X,'ERS...4')
        GO TO 3500
3004    WRITE(1,3015)
3015    FORMAT(5X,'ERS...5')
```

```
3004    WRITE(1,3015)
3015    FORMAT(5X,'ERS...5')
        GO TO 3500
3005    WRITE(1,3016)
3016    FORMAT(5X,'ERS...6')
        GO TO 3500
3006    WRITE(1,3017)
3017    FORMAT(5X,'ERS...7')
                                GO TO 3500
                        3007    WRITE(1,3018)
                        3018    FORMAT(5X,'ERS...8')
                                GO TO 3500
                        3008    WRITE(1,3019)
                        3019    FORMAT(5X,'ERS...9')
                        3500    RETURN
                                END
```

What is claimed is:

1. A method of locating intelligence data in the form of characters associated with a document in which the intelligence data is associated with a clue character on the document and in which the intelligence data and clue character are presented in the form of a matrix of binary data corresponding to image data associated with at least a portion of said document on which said intelligence data and clue character are located, comprising the steps:

(a) receiving and storing said matrix of binary data in storage;

(b) withdrawing from said storage a portion of said binary data of said matrix corresponding to a character which may be a clue character or a character of said intelligence data, said portion of said binary data being hereinafter referred to as character data; said character data having machine readable topographical features which are indicative of the character associated therewith; and (c) evaluating said machine-readable topographical features of said character data to determine whether or not said character data is indicative of a clue character;

said evaluating step comprising the steps of:

(d) determining the physical size of said character data;

(e) comparing the physical size of said character data with predetermined criteria to determine whether said character data has a physical size which is greater than or smaller than said predetermined criteria, said character data whose physical size is smaller than said predetermined criteria being referred to thereinafter as small character data; and (f) evaluating said machine-readable topographical features of said small character data to determine whether or not said small character data is indicative of a said clue character of a first type;

said character data whose physical size is greater than said predetermined criteria, as determined by said comparing step, being referred to hereinafter as large character data, and said step c further comprising the steps of;

(k) determining the height and width of said large character data;

(l) comparing the height and width of said large character data; and (m) evaluating said machine-readable topographical features of said large character data whose associated width-to-height ratio is less than one to determine whether or not said last-named large character data is indicative of a clue character of a second type;

said clue character of said second type being a dollar sign and said character data being comprised of a matrix of columns and rows of binary data; and said evaluating step m comprising the steps of:

(n) using the number of binary transitions in said columns as being indicative of a dollar sign of a slanted variety; and (o) using the number of closed rows of binary data of a first type which exist in said character data in association with the height of said character data as being indicative of a dollar sign of a straight variety.

2. The method as claimed in claim 1 in which said character data has first and second column boundaries and first and second low boundaries, and in which said evaluating step m further comprises the steps of:

(p) using the number of binary digits of a first type in said first and second row boundaries as being indicative of a dollar sign of a slanted variety;

(q) using the first binary digit of said first type which is encountered when proceeding from said first column boundary towards said second column boundary for each successive said row of binary data when proceeding from said first row boundary towards said second row boundary to develop a curve which said curve is used as being indicative of a dollar sign of a slanted variety.

3. The method as claimed in claim 2 in which said step m further comprises the steps of:

(r) using the first binary digit of said first type which is encountered when proceeding from said second column boundary towards said first column boundary for each successive said row of binary data when proceeding from said second row boundary towards said first row boundary to develop a second curve, which said second curve is used as being indicative of a dollar sign of a slanted variety; and (s) evaluating said first-named curve and said second curve according to predetermined criteria to determine whether or not said character data is indicative of a dollar sign of a slanted variety.

4. A system comprising:

means for producing image data of at least a portion of a document on which monetary amount data in the form of characters is located, said monetary amount data being preceded on said document by an asterisk or a dollar sign, each of which shall be referred to hereinafter as a clue character;

converting means coupled to said imaging means to convert said image data to a matrix of binary data corresponding to said image data;

means for receiving and also storing said matrix of binary data;

means for withdrawing from said receiving and storing means and from a predetermined side of said matrix of binary data a portion of said binary data corresponding to a character which may be a clue character or a character of said monetary amount data, said portion of said binary data being hereinafter referred to as character data; said character data having machine-readable topographical features which are indicative of the character associated therein; and means for evaluating said topographical features of said character data to determine whether or not said character data is indicative of a said clue character;

said evaluating means comprising:

means for determining the physical size of said character data;

means for comparing said physical size of said character data with predetermined criteria to determine whether said character data has a physical size which is greater than or smaller than said predetermined criteria; said character data whose physical size is smaller than said predetermined criteria being referred to hereinafter as small character data; and means for receiving said small character data and for evaluating said machine-readable topographical features of said small character data to determine whether or not said small character data is indicative of an asterisk;

said means for receiving said small character data and for evaluating said machine-readable topographical features of said small character data also including means for locating a hole in the center of said small character data;

said character data whose physical size is greater than said predetermined criteria from said comparing means being referred to hereinafter as large character data;

said evaluating means further comprising;

means for receiving said large character data;

means coupled to said receiving means for determining the height and width of said large character data;

means for comparing said height and width of said large character data to select said large character data which has a width-to-height ratio of less than one; and second evaluating means for evaluating the machine-readable topographical features of said large character data having a width-to-height ratio of less than one to determine whether or not said last-named character data is indicative of a dollar sign.

5. The system as claimed in claim 4 in which said second evaluating means includes:

first identifying means for determining whether or not said large character data is indicative of a slanted dollar sign; and second identifying means for determining whether or not said large character data is indicative of a straight dollar sign.

* * * * *